United States Patent
Wang

(10) Patent No.: US 12,355,944 B2
(45) Date of Patent: Jul. 8, 2025

(54) SPATIAL ANGULAR PARTITIONED WEIGHTED INTRA PREDICTION USING INTRA PREDICTION DIRECTIONAL MODES TO DETERMINE APPLIED WEIGHT

(71) Applicant: GUANGDONG OPPO MOBILE TELECOMMUNICATIONS CORP., LTD., Guangdong (CN)

(72) Inventor: Fan Wang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 7 days.

(21) Appl. No.: 18/324,123

(22) Filed: May 25, 2023

(65) Prior Publication Data
US 2023/0300326 A1    Sep. 21, 2023

Related U.S. Application Data

(63) Continuation of application No. PCT/CN2021/135491, filed on Dec. 3, 2021.

(30) Foreign Application Priority Data

Dec. 3, 2020   (WO) ................ PCT/CN2020/133708

(51) Int. Cl.
*H04N 19/105*    (2014.01)
*H04N 19/11*    (2014.01)
(Continued)

(52) U.S. Cl.
CPC ........... *H04N 19/105* (2014.11); *H04N 19/11* (2014.11); *H04N 19/159* (2014.11);
(Continued)

(58) Field of Classification Search
CPC .... H04N 19/105; H04N 19/11; H04N 19/159; H04N 19/176; H04N 19/46;
(Continued)

(56) References Cited

U.S. PATENT DOCUMENTS 10,575,023 B2    2/2020   Panusopone et al.
10,623,736 B2    4/2020   Phillips et al.
(Continued)

FOREIGN PATENT DOCUMENTS

CN    102972028    3/2013
CN    104247422    12/2014
(Continued)

OTHER PUBLICATIONS

Bross et al., "Versatile Video Coding Editorial Refinements on Draft 10," Joint Video Experts Team (JVET) of ITU-T SG 16 WP 3 and ISO/IEC JTC 1/SC 29, JVET-T2001-v1, Oct. 2020.
(Continued)

*Primary Examiner* — Shahan Ur Rahaman
*Assistant Examiner* — Mohammed S Rahaman
(74) *Attorney, Agent, or Firm* — Hodgson Russ LLP

(57) ABSTRACT

A prediction method is disclosed. A weight derivation mode for a current block is determined. At least one of a first prediction mode or a second prediction mode for the current block is determined according to the weight derivation mode. A weight is determined according to the weight derivation mode. A prediction value is determined based on the first prediction mode, the second prediction mode, and the weight. A prediction list for a current block is determined, the prediction list containing at least one of an intra prediction mode or an inter prediction mode. At least one of a first prediction mode or a second prediction mode for the current block is determined according to the prediction list.

(Continued)

A prediction value is determined based on the first prediction mode and the second prediction mode.

15 Claims, 14 Drawing Sheets

(51) Int. Cl.
*H04N 19/159* (2014.01)
*H04N 19/176* (2014.01)
*H04N 19/46* (2014.01)
*H04N 19/593* (2014.01)

(52) U.S. Cl.
CPC .......... *H04N 19/176* (2014.11); *H04N 19/46* (2014.11); *H04N 19/593* (2014.11)

(58) Field of Classification Search
CPC .............. H04N 19/593; H04N 19/107; H04N 19/119; H04N 19/42; H04N 19/70; H04N 19/52
See application file for complete search history.

(56) References Cited

U.S. PATENT DOCUMENTS

| | | | |
|---|---|---|---|
| 10,785,479 | B2 | 9/2020 | Zhang et al. |
| 11,949,888 | B2* | 4/2024 | Liao ............... H04N 19/503 |
| 2018/0376149 | A1* | 12/2018 | Zhang ............. H04N 19/182 |
| 2020/0221102 | A1 | 7/2020 | Yu et al. |
| 2020/0366900 | A1 | 11/2020 | Jun et al. |
| 2021/0250581 | A1* | 8/2021 | Xu ................. H04N 19/137 |
| 2021/0385485 | A1* | 12/2021 | Liao ............... H04N 19/105 |
| 2022/0124349 | A1* | 4/2022 | Liu ................ H04N 19/46 |
| 2023/0052940 | A1* | 2/2023 | Ma ................. H04N 19/61 |
| 2023/0115074 | A1* | 4/2023 | Xiu ................ H04N 19/70 375/240.02 |
| 2023/0300325 | A1 | 9/2023 | Ahn et al. |
| 2024/0291972 | A1* | 8/2024 | Liao ............... H04N 19/176 |

FOREIGN PATENT DOCUMENTS

| | | |
|---|---|---|
| CN | 108781283 | 11/2018 |
| CN | 110063056 | 7/2019 |
| CN | 111107356 | 5/2020 |
| CN | 111279703 | 6/2020 |
| JP | 2006287315 | 10/2006 |
| JP | 2019216294 | 12/2019 |
| WO | 2020098782 | 5/2020 |
| WO | 2020141816 | 7/2020 |
| WO | 2020185004 | 9/2020 |

OTHER PUBLICATIONS

"AVS3—Part 2: Video," National Standards of the People's Republic of China, Aug. 2020.
Panusopone et al. "Weighted Angular Prediction," Joint Video Exploration Team (JVET) of ITU-T SG 16 WP 3 and ISO/IEC JTC 1/SC 29/WG 11, JVET-F0104, Mar. 2017.
WIPO, International Search Report and Written Opinion for International Application No. PCT/CN2020/139178, Aug. 30, 2021.
Blasi et al., "Non-CE4: CIIP using triangular partitions," Joint Video Experts Team (JVET) of ITU-T SG 16 WP 3 and ISO/IEC JTC 1/SC 29/WG 11, JVET-O 0522, Jul. 2019.
WIPO, International Search Report and Written Opinion for International Application No. PCT/CN2021/135491, Mar. 1, 2022.
Chen et al., "Algorithm description for Versatile Video Coding and Test Model 8 (VTM 8)," Joint Video Experts Team (JVET) of ITU-T SG 16 WP 3 and ISO/IEC JTC I/SC 29/WG 11, JVET-Q2002-v3, Jan. 2020.
EPO, Extended European Search Report for EP Application No. 21900113.8, Oct. 7, 2024.
USPTO, Non-Final Rejection for U.S. Appl. No. 18/205,348, filed Sep. 24, 2024.
Chujoh et al., "Description of video coding technology proposal by Toshiba," Joint Collaborative Team on Video Coding (JCT-VC) of ITU-T SG16 WP3 and ISO/IEC JTC1/SC29/WG11, Document: JCTVC-A117r1, Apr. 2010.
JPO, Office Action for JP Application No. 2023-533982, Jan. 28, 2025.

\* cited by examiner

SPATIAL ANGULAR PARTITIONED WEIGHTED INTRA PREDICTION USING INTRA PREDICTION DIRECTIONAL MODES TO DETERMINE APPLIED WEIGHT

CROSS-REFERENCE TO RELATED APPLICATION(S)

This application is a continuation of International Application No. PCT/CN2021/135491, filed Dec. 3, 2021, which claims priority to International Application No. PCT/CN2020/133708, filed Dec. 3, 2020, the entire disclosures of which are hereby incorporated by reference.

TECHNICAL FIELD

The present disclosure relates to the field of image processing technology, and in particular to prediction methods.

BACKGROUND

In order to capture finer edge directions presented in natural videos, 33 intra luma prediction angular modes defined in High Efficiency Video Coding (HEVC) are extended to 65 modes in Versatile Video Coding (VVC), with two additional non-angular modes, namely Planar mode with index 0 and Direct Current (DC) mode with index 1.

Common intra prediction modes, such as DC, Planar, and Bilinear modes, can only handle prediction of simple textures. Even with increasing number of angular modes, predictions based on these modes are still constrained within a straight line of a certain angle. Therefore, current intra prediction modes can only handle prediction of simple textures. For prediction of more complex textures, smaller partitioned blocks are required, leading to higher complexity. Correspondingly, the storage space and processing time required are significantly increased during coding, hence lower coding efficiency.

SUMMARY

In a first aspect, a prediction method is provided in implementations of the disclosure. The method is applied to a decoder and includes the following. A bitstream is parsed to determine a weight derivation mode for a current block. The bitstream is parsed to obtain a first flag, the first flag indicating whether a first prediction mode and a second prediction mode belong to an intra prediction mode, where at least one of the first prediction mode or the second prediction mode is an intra prediction mode or an inter prediction mode. A type of each of the first prediction mode and the second prediction mode is determined according to the first flag. when at least one of the first prediction mode or the second prediction mode is an intra prediction mode, at least one of the first prediction mode or the second prediction mode is determined based on the weight derivation mode. A weight is determined according to the weight derivation mode. A prediction value is determined based on the first prediction mode, the second prediction mode, and the weight.

In a second aspect, a prediction method is provided in implementations of the disclosure. The method is applied to an encoder and includes the following. A weight derivation mode is determined for a current block. A first flag is obtained, the first flag indicating whether a first prediction mode and a second prediction mode belong to an intra prediction mode, where at least one of the first prediction mode or the second prediction mode is an intra prediction mode or an inter prediction mode. A type of each of the first prediction mode and the second prediction mode is determined according to the first flag. when at least one of the first prediction mode or the second prediction mode is an intra prediction mode, at least one of the first prediction mode or the second prediction mode is determined based on the weight derivation mode. A weight is determined according to the weight derivation mode. A prediction value is determined based on the first prediction mode, the second prediction mode, and the weight.

DETAILED DESCRIPTION

Figure 1:
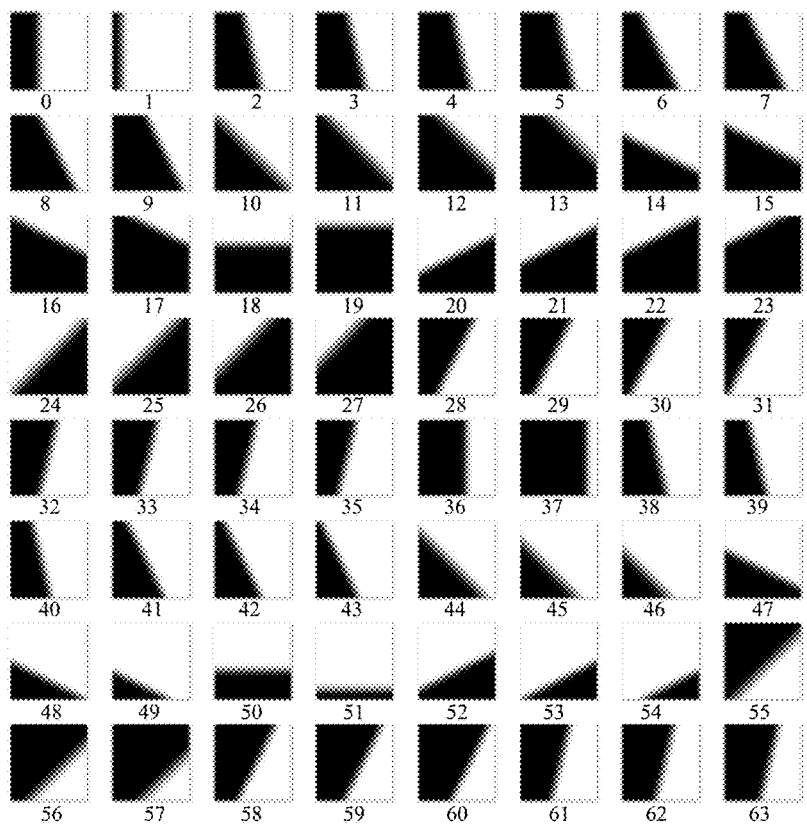
FIG. 1 is a schematic diagram illustrating weight allocation.

Implementations of the disclosure will be described in a clear and complete manner with reference to the accompanying drawings. It should be understood that the specific implementations described herein are only for explaining the relevant disclosure and should not be construed as limiting the scope of the disclosure. Additionally, it should be noted that, for ease of description, only the parts related to the relevant disclosure are illustrated in the drawings.

Currently, universal video coding standards generally use block-based hybrid coding frameworks. Each picture of a video is partitioned into largest coding units (LCUs), which are squares of equal size (e.g., 128×128, 64×64, etc.). Each LCU may also be partitioned into rectangular coding units (CUs) according to certain rules. Furthermore, the CU may be partitioned into smaller prediction units (PUs). In detail, the hybrid coding framework may include modules for such as prediction, transform, quantization, entropy coding, and in-loop filter. The prediction module may include intra prediction and inter prediction, and the inter prediction may include motion estimation and motion compensation. Since there is strong correlation among neighbouring samples in a video picture, using intra prediction in video coding can eliminate spatial redundancy between neighbouring samples. Moreover, since there is also strong similarity between neighbouring pictures in the video, using inter prediction in video coding can eliminate temporal redundancy between neighbouring pictures. Thus coding efficiency can be improved.

The basic process performed by a video codec is as follows. At the encoding side, a picture is partitioned into blocks, and a prediction value of a current block is generated using intra prediction or inter prediction. An original block of the current block is subtracted from the prediction value to obtain a residual block, which is then subjected to transformation and quantization to generate a quantization coefficient matrix that is entropy-encoded and signalled into a bitstream. At the decoding side, the prediction value for the current block is generated using intra prediction or inter prediction, and at the same time, the quantization coefficient matrix is parsed out from the bitstream. The quantization coefficient matrix is inverse-quantized and inverse-transformed to obtain the residual block, which is added to the prediction value to obtain a reconstructed block. Reconstructed blocks form a reconstructed picture, which is loop-filtered based on the picture or blocks to obtain a decoded picture. The encoding side also requires similar operations to obtain the decoded picture. The decoded picture may be used as a reference picture in inter prediction for subsequent pictures. The block partition information and mode information or parameter information (such as for prediction, transformation, quantization, entropy coding, and in-loop filtering) determined at the encoding side, may need to be output to the bitstream if necessary. The decoding side determines the same block partition information and mode information or parameter information such as for prediction, transformation, quantization, entropy coding, and in-loop filtering as the encoding side through parsing and analysis based on available information, ensuring that the decoded picture obtained by the encoding side is the same as that obtained by the decoding side. The decoded picture obtained by the encoding side is typically called the reconstructed picture. During prediction, the current block may be partitioned into PUs, and during transformation, the current block may be partitioned into TUs. The partition for PUs and TUs may be different. The above is the basic process performed by the video codec under the block-based hybrid coding framework. With the development of technologies, some modules or steps in this framework or process may be optimized. The implementations of the disclosure are applicable to the basic process performed by the video codec under the block-based hybrid coding framework, but is not limited to this framework or process.

The current block may be the current coding unit (CU) or the current prediction unit (PU), etc.

Inter prediction uses information from the decoded or reconstructed picture, also known as a reference picture, to predict the current block. Motion information is used to find a reference block in the reference picture and generate a prediction block based on the reference block. The motion information includes a reference picture list, a reference picture index, and a motion vector. The motion vector may be either per integer-sample or per fractional-sample. If the motion vector is per fractional-sample, interpolation filtering is needed in the reference picture to obtain a required fractional-sample block. The integer-sample or fractional-sample block found in the reference picture based on the motion vector is called a reference block. The reference block may be directly used as a prediction block in some techniques, or may be further processed to generate the prediction block in some other techniques. The process of processing the reference block to generate the prediction block may also be understood as using the reference block as a prediction block and then processing the prediction block to generate a new prediction block.

In the video coding standard Versatile Video Coding (VVC) currently under development, there is an inter prediction mode called geometric partitioning mode (GPM). In the video coding standard Audio Video coding Standard (AVS) currently under development, there is an inter prediction mode called angular weighted prediction (AWP) mode. Although these two modes have different names and implementation details, they share common principles.

It should be noted that traditional unidirectional prediction only searches for one reference block of the same size as the current block, while traditional bidirectional prediction uses two reference blocks of the same size as the current block, where a sample value of each sample in the prediction block is an average of samples at corresponding positions in the two reference blocks, that is, all samples in each reference block account for 50%. Bidirectional weighted prediction allows the proportions of the two reference blocks to be different, such as 75% for all samples in the first reference block and 25% for all samples in the second reference block. However, the proportions of all samples in the same reference block are the same. Other optimization methods, such as decoder-side motion vector refinement (DMVR) technology, bi-directional optical flow (BIO), etc., may cause some changes in the reference or prediction samples. In GPM or AWP, two reference blocks of the same size as the current block are also used, but in some sample positions 100% of the sample values at the corresponding positions in first reference block are used, in some sample positions 100% of the sample values at the corresponding positions in the second reference block are used, and in a boundary area, the sample values at the corresponding positions in these two reference blocks are used according to a certain proportion (weight). The specific allocation of these weights is determined by the prediction mode of GPM or AWP. Alternatively, it may be considered that GPM or AWP uses two reference blocks of different sizes from the current block, that is, a required part of each reference block is taken as a reference block. That is, the part with non-zero weights is taken as the reference block, and the part with zero weights is removed.

Figure 2:
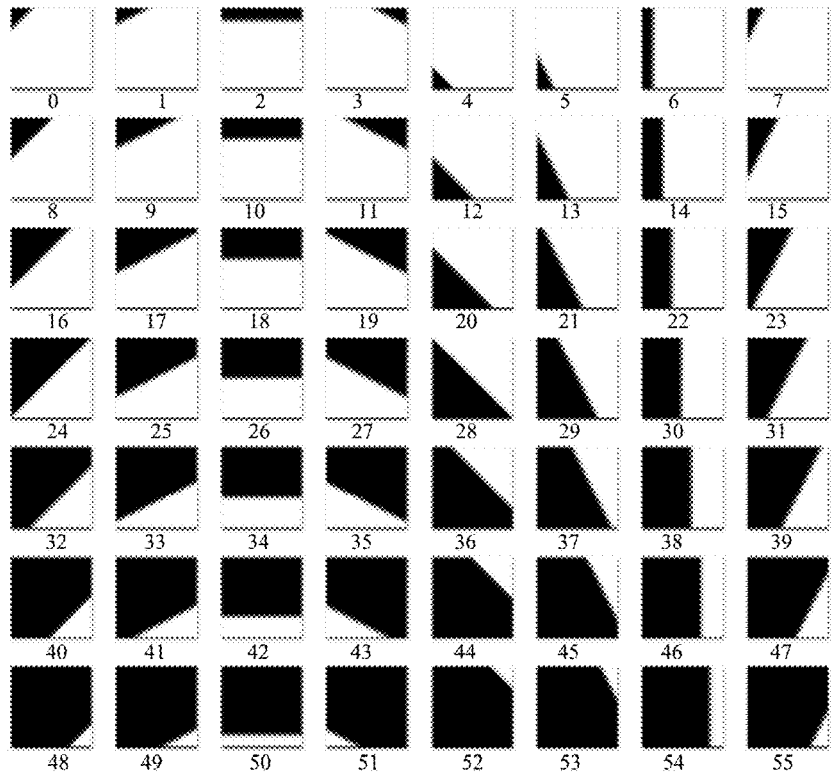
FIG. 2 is a schematic diagram illustrating weight allocation.

As an example, FIG. 1 is a schematic diagram illustrating weight allocation. FIG. 1 is a schematic diagram illustrating weight allocation for multiple partition modes of GPM on a 64×64 current block provided in implementations of the disclosure, where GPM has 64 partition modes. FIG. 2 is a schematic diagram illustrating weight allocation. FIG. 2 illustrates a schematic diagram of weight allocation for multiple partition modes of AWP on a 64×64 current block provided in implementations of the disclosure, where AWP has 56 partition modes. In both FIG. 1 and FIG. 2, for each partition mode, the black area represents a weight value of 0% for the corresponding positions in the first reference block, while the white area represents a weight value of 100% for the corresponding positions in the first reference block. The grey area represents a weight value greater than 0% and less than 100%, represented by the color depth, for the corresponding positions in the first reference block. The weight value for the corresponding position in the second reference block is 100% minus the weight value for the corresponding position in the first reference block.

Methods for deriving the weights are different in GPM and AWP. For GPM, an angle and an offset amount are determined according to each mode, and then a weight matrix for each mode is calculated. For AWP, a one-dimensional weight line is first defined, and then a method similar to intra angular prediction is used to fill the entire matrix with the one-dimensional weight line.

It should be noted that in earlier coding technologies, only rectangular partitioning was available, whether for CU, PU, or TU partitioning. However, GPM or AWP achieves the effect of non-rectangular partitioning for prediction without partitioning. GPM and AWP use a weight mask for two reference blocks, namely the weight map as described above. From the mask, the weights of the two reference blocks in generating the prediction block are determined. It may be simply understood as that some positions of the prediction block come from the first reference block and some positions come from the second reference block, and the blending area is obtained by weighting the corresponding positions of the two reference blocks, which allows a smoother transition. GPM and AWP do not partition the current block into two CUs or PUs according to a partition line. Therefore, after prediction, the current block is processed as a whole during transformation, quantization, inverse transformation, and inverse quantization of the residuals.

In GPM, a weight matrix is used to simulate the geometric shape partitioning, or more precisely, simulate the partitioning of prediction. To implement GPM, in addition to the weight matrix, two prediction values are also needed, each determined by one unidirectional motion information. These two unidirectional motion information come from a motion information candidate list, such as the merge motion information candidate list (mergeCandList). GPM uses two indices in the bitstream to determine the two unidirectional motion information from the mergeCandList.

The motion information used for the current block may be stored. The subsequent coding blocks of the current picture may use the motion information of previously coded blocks, such as the neighboring blocks, based on positional relationship. This utilizes spatial correlation, so this kind of coded motion information is called spatial motion information. The motion information used for each block of the current picture may be stored. The subsequent coding picture may use the motion information of previously coded picture based on reference relationship. This utilizes temporal correlation, so this kind of motion information of coded picture is called temporal motion information. In the method of storing the motion information used for each block in the current picture, a fixed-size matrix such as a 4×4 matrix is usually taken as a minimum unit, and each minimum unit stores a set of motion information separately. As each block is coded, the minimum unit(s) corresponding to the block position may store the motion information of that block. As such, when the spatial motion information or temporal motion information is used, the corresponding motion information of a position may be directly found according to the position. For example, if traditional unidirectional prediction is used for a 16×16 block, all 4×4 minimum units corresponding to the block will store motion information of this unidirectional prediction. If GPM or AWP is used for a block, all minimum units corresponding to the block will store motion information determined according to the mode of GPM or AWP, first motion information, second motion information, and the position of each minimum unit. In one manner, if all 4×4 samples corresponding to a minimum unit come from the first motion information, the minimum unit stores the first motion information. If all 4×4 samples corresponding to a minimum unit come from the second motion information, the minimum unit stores the second motion information. If all 4×4 samples corresponding to a minimum unit come from both the first and second motion information, in AWP, one of the first and second motion information will be selected for storage, and in GPM, two motion information will be combined as bidirectional motion information if the two motion information point to different reference picture lists; otherwise, only the second motion information will be stored.

Figure 3:
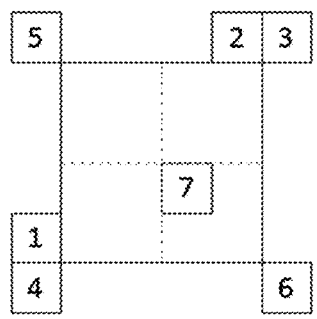
FIG. 3 is a schematic diagram illustrating inter prediction.

Optionally, the aforementioned mergeCandList is constructed based on spatial motion information, temporal motion information, history-based motion information, and some other motion information. For example, for the mergeCandList, positions 1 to 5 in FIG. 3 are used to derive the spatial motion information, and position 6 or 7 in FIG. 3 is used to derive the temporal motion information. For the history-based motion information, motion information of each block is added to a first-in-first-out list when the block is coded, and the addition process may require some checks, such as whether the motion information duplicates existing motion information in the list. In this way, the motion information in the history-based list may be referenced when coding the current block.

In some implementations, the syntax description about GPM is as illustrated in Table 1:

TABLE 1

| | |
|---|---|
| regular_merge_flag[x0][y0] | ae(v) |
| if( regular_merge_flag[x0][y0] == 1 ) { | |
|   if( sps_mmvd_enabled_flag ) | |
|     mmvd_merge_flag[x0][y0] | ae(v) |
|   if( mmvd_merge_flag[x0][y0] == 1 ) { | |
|     if( MaxNumMergeCand > 1 ) | |
|       mmvd_cand_flag[x0][y0] | ae(v) |
|     mmvd_distance_idx[x0][y0] | ae(v) |
|     mmvd_direction_idx[x0][y0] | ae(v) |
|   } else if( MaxNumMergeCand > 1 ) | |
|     merge_idx[x0][y0] | ae(v) |
| } else { | |
|   if( sps_ciip_enabled_flag && sps_gpm_enabled_flag && | |
|   sh_slice_type == B && cu_skip_flag[x0][y0] == 0 && | |
|   cbWidth >= 8 && cbHeight >= 8 && cbWidth < | |
|   (8*cbHeight) && cbHeight < (8*cbWidth) && cbWidth < | |
|   128 && cbHeight < 128 ) | |
|     ciip_flag[x0][y0] | ae(v) |
|   if( ciip_flag[x0][y0] && MaxNumMergeCand > 1 ) | |
|     merge_idx[x0][y0] | ae(v) |
|   if( !ciip_flag[x][y0] ) { | |
|     merge_gpm_partition_idx[x0][y0] | ae(v) |

TABLE 1-continued

```
    merge_gpm_idx0[x0][y0]                          ae(v)
    if( MaxNumGpmMergeCand > 2 )
      merge_gpm_idx1[x0][y0]                        ae(v)
  }
}
```

As illustrated in Table 1, in the merge mode, if regular_merge_flag is not equal to 1, either combined inter-intra prediction (CIIP) or GPM may be used for the current block. If CIP is not used for the current block, then GPM will be used, as indicated by the syntax "if(!ciip_flag[x0][y0])" in Table 1.

As illustrated in the above Table 1, GPM requires the transmission of three information in the bitstream, namely merge_gpm_partition_idx, merge_gpm_idx0, and merge_gpm_idx1, where x0 and y0 are used to determine coordinates (x0, y0) of the top-left luma sample of the current block relative to the top-left luma sample of the picture. merge_gpm_partition_idx is used to determine the shape of the GPM partition, which is a "simulated partition" as described above. merge_gpm_partition_idx represents the weight derivation mode or an index of the weight derivation mode in implementations of the disclosure. merge_gpm_idx0 represents an index of the first motion information in the candidate list, and merge_gpm_idx1 represents an index of the second motion information in the candidate list. merge_gpm_idx1 needs to be transmitted only when the length of the candidate list (MaxNumGpmMergeCand) is greater than 2; otherwise, merge_gpm_idx1 may be determined directly.

In some implementations, the decoding of GPM includes the following process.

Input information for the decoding process includes: the coordinates (xCb, yCb) of the top-left luma position of the current block relative to the top-left luma position of the picture, the width (cbWidth) of the current luma component, the height (cbHeight) of the current luma component, the luma motion vectors mvA and mvB with 1/16 fractional-sample accuracy, the chroma motion vectors mvCA and mvCB, the reference picture indices refIdxA and refIdxB, and the prediction list flags predListFlagA and predListFlagB.

As an example, motion information may be represented by a combination of motion vectors, reference picture indices, and prediction list flags. In some implementations, two reference picture lists are supported, each of which may have multiple reference pictures. In unidirectional prediction, only one reference block in one reference picture in one reference picture list is used for reference, while in bidirectional prediction, two reference blocks each in one reference picture in one of the two reference picture lists are used for reference. GPM uses two unidirectional predictions. In mvA and mvB, mvCA and mvCB, refIdxA and refIdxB, predListFlagA and predListFlagB, "A" may be understood as the first prediction mode, and "B" may be understood as the second prediction mode. Optionally, "X" is used to represent A or B, so that predListFlagX indicates whether the first reference picture list or second reference picture list is used for X, refIdxX indicates the reference picture index in the reference picture list used for X, mvX indicates the luma motion vector used for X, and mvCX indicates the chroma motion vector used for X. It should be noted that motion information described in this disclosure may be considered as represented by a combination of motion vectors, reference picture indices, and prediction list flags.

Output information of the decoding process includes: the prediction luma sample array predSamplesL of size (cbWidth)×(cbHeight); the prediction sample array of Cb chroma component with size (cbWidth/SubWidthC)×(cbHeight/SubHeightC), if necessary; and the prediction sample array of Cr chroma component with size (cbWidth/SubWidthC)×(cbHeight/SubHeightC), if necessary.

In the following, the luma component is taken as an example. The processing of the chroma component is similar to the luma component.

Assume that each of predSamplesLAL and predSamplesLBL, which are the prediction sample arrays obtained based on two prediction modes, has a size of (cbWidth)×(cbHeight). The predSamplesL is derived as follows. predSamplesLAL and predSamplesLBL are determined separately according to the luma motion vectors mvA and mvB, chroma motion vectors mvCA and mvCB, reference picture indices refIdxA and refIdxB, and prediction list flags predListFlagA and predListFlagB. In other words, prediction is performed according to the motion information of the two prediction modes, and the detailed process is not described here. Generally, GPM is a merge mode, so that both the two prediction modes of GPM may be considered as merge modes.

According to merge_gpm_partition_idx[xCb][yCb], the angle index variable angleIdx and the distance index variable distanceIdx of GPM are determined using Table 2.

TABLE 2

Correspondence among angleIdx, distanceIdx and merge_gpm_partition_idx

| merge_gpm_partition_idx | 0 | 1 | 2 | 3 | 4 | 5 | 6 | 7 |
|---|---|---|---|---|---|---|---|---|
| angleIdx | 0 | 0 | 2 | 2 | 2 | 2 | 3 | 3 |
| distanceIdx | 1 | 3 | 0 | 1 | 2 | 3 | 0 | 1 |
| merge_gpm_partition_idx | 8 | 9 | 10 | 11 | 12 | 13 | 14 | 15 |
| angleIdx | 3 | 3 | 4 | 4 | 4 | 4 | 5 | 5 |
| distanceIdx | 2 | 3 | 0 | 1 | 2 | 3 | 0 | 1 |
| merge_gpm_partition_idx | 16 | 17 | 18 | 19 | 20 | 21 | 22 | 23 |
| angleIdx | 5 | 5 | 8 | 8 | 11 | 11 | 11 | 11 |
| distanceIdx | 2 | 3 | 1 | 3 | 0 | 1 | 2 | 3 |
| merge_gpm_partition_idx | 24 | 25 | 26 | 27 | 28 | 29 | 30 | 31 |
| angleIdx | 12 | 12 | 12 | 12 | 13 | 13 | 13 | 13 |
| distanceIdx | 0 | 1 | 2 | 3 | 0 | 1 | 2 | 3 |
| merge_gpm_partition_idx | 32 | 33 | 34 | 35 | 36 | 37 | 38 | 39 |
| angleIdx | 14 | 14 | 14 | 14 | 16 | 16 | 18 | 18 |
| distanceIdx | 0 | 1 | 2 | 3 | 1 | 3 | 1 | 2 |
| merge_gpm_partition_idx | 40 | 41 | 42 | 43 | 44 | 45 | 46 | 47 |
| angleIdx | 18 | 19 | 19 | 19 | 20 | 20 | 20 | 21 |
| distanceIdx | 3 | 1 | 2 | 3 | 1 | 2 | 3 | 1 |
| merge_gpm_partition_idx | 48 | 49 | 50 | 51 | 52 | 53 | 54 | 55 |
| angleIdx | 21 | 21 | 24 | 24 | 27 | 27 | 27 | 28 |
| distanceIdx | 2 | 3 | 1 | 3 | 1 | 2 | 3 | 1 |
| merge_gpm_partition_idx | 56 | 57 | 58 | 59 | 60 | 61 | 62 | 63 |
| angleIdx | 28 | 28 | 29 | 29 | 29 | 30 | 30 | 30 |
| distanceIdx | 2 | 3 | 1 | 2 | 3 | 1 | 2 | 3 |

It should be noted that GPM may be used on the luma component as well as the two chroma components. Therefore, the process of generating the GPM prediction sample array for a component is encapsulated in a sub-process called the "Weighted sample prediction process for geometric partitioning mode". This sub-process is called for all three components, with different parameters for each component. Here, the luma component is taken as an example.

The prediction matrix for the current luma block, predSamplesL[xL][yL](where xL=0 . . . cbWidth−1, yL=0 . . . cbHeight−1), is derived from the weighted sample prediction process of GPM. Optionally, nCbW is set to cbWidth, and nCbH is set to cbHeight. The prediction sample arrays predSamplesLAL and predSamplesLBL generated using the two prediction modes, as well as angleIdx and distanceIdx, are used as inputs.

In some implementations, the weighted sample prediction process for GPM includes the following steps.

Input to this process are: a width nCbW of the current block, a height nCbH of the current block, two (nCbW)×(nCbH) prediction sample arrays predSamplesLA and predSamplesLB, an angle index variable angleIdx of GPM, a distance index variable distanceIdx of GPM, and a colour component index variable cIdx. The luma component is taken as an example, so that cIdx is equal to 0, indicating the luma component.

Output of this process is the (nCbW)×(nCbH) array pbSamples of prediction sample values of GPM.

For example, the variables nW, nH, shift1, offset1, displacementX, displacementY, partFlip and shiftHor are derived as follows:

nW=(cIdx==0)?nCbW:nCbW*SubWidthC;

nH=(cIdx==0)?nCbH:nCbH*SubHeightC;

shift1=Max(5,17−BitDepth), where BitDepth represents a coding bit depth;

offset1=1<<(shift1−1), where "<<" represents shift left;

displacementX=angleIdx;

displacementY=(angleIdx+8)%32;

partFlip=(angleIdx>=13&& angleIdx<=27)?0:1;

shiftHor=(angleIdx %16==8||(angleIdx %16!=0&& nH>=nW))?0:1.

The variables offsetX and offsetY are derived as follows:
If shiftHor is equal to 0, the following applies:

offsetX=(−nW)>>1 offsetY=((−nH)>>1)+(angleIdx<16?(distanceIdx*nH)>>3:−((distanceIdx*nH)>>3))

If shiftHor is equal to 1, the following applies:

offsetX=((−nW)>>1)+(angleIdx<16?(distanceIdx*nW)>>3:−((distanceIdx*nW)>>3))

offsetY=(−nH)>>1.

The variables xL and yL are derived as follows:

xL=(cIdx==0)?x:x*SubWidthC;

yL=(cIdx==0)?y:y*SubHeightC.

The variable wValue specifying the weight of the prediction sample at current position is derived as follows:
wValue is the weight of the prediction sample predSamplesLA[x][y] at (x, y) in the prediction array for the first prediction mode, and (8−wValue) is the weight of the prediction sample predSamplesLB[x][y] at (x, y) in the prediction array for the first prediction mode. The distance matrix disLut is determined according to Table 3.

TABLE 3

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 | weightIdx=(((xL+offsetX)<<1)+1)*disLut[displacementX]+(((yL+offsetY)<<1)+1)*disLut[displacementY];

weightIdxL=partFlip?32+weightIdx:32−weightIdx;

wValue=Clip3(0,8,(weightIdxL+4)>>3).

The prediction sample values pbSamples[x][y] are derived as follows:

pbSamples[x][y]=Clip3(0,(1<<BitDepth)−1,(predSamplesLA[x][y]*wValue+predSamplesLB[x][y]*(8−wValue)+offset1)>>shift1).

It should be noted that for each position in the current block, a weight value is derived and then a GPM prediction value is calculated. In this case, although the weights wValue do not have to be written in matrix form, it may be understood that if each wValue for each position is saved in a matrix, then a weight matrix is formed. The principle of calculating the GPM prediction value by separately calculating the weight for each point and weighting, and the principle of calculating the GPM prediction sample array by calculating all the weights and then uniformly weighting, are the same.

It should be noted that in implementations of this disclosure, GPM or AWP belongs to a type of prediction technique. A flag indicating whether GPM or AWP is used needs to be transmitted in the bitstream, where the flag indicates whether GPM or AWP is used for the current block. If GPM or AWP is used, the encoder needs to transmit the specific mode used, i.e., one of the 64 partition modes of GPM or one of the 56 partition modes of AWP, as well as the index values of two unidirectional motion information, in the bitstream. That is to say, for the current block, the decoder may obtain information about whether GPM or AWP is used by parsing the bitstream. If it is determined that GPM or AWP is used, the decoder may parse out the prediction mode parameters of GPM or AWP and the index values of the two motion information. For example, if the current block is partitioned into two partitions, a first index value corresponding to the first partition and a second index value corresponding to the second partition may be parsed out.

Specifically, for GPM, if GPM is used, the prediction mode parameter of GPM will be transmitted in the bitstream, such as the specific partition mode of GPM. Generally, GPM includes 64 partition modes. For AWP mode, if AWP is used, the prediction mode parameter of AWP will be transmitted in the bitstream, such as the specific partition mode of AWP. Generally, AWP includes 56 partition modes.

In inter prediction mode such as GPM and AWP, two unidirectional motion information are required to search for two reference blocks. At present, this is achieved, at the encoder side, by constructing a unidirectional motion information candidate list using relevant information of the coded part before the current block, selecting unidirectional motion information from the unidirectional motion information candidate list, and signalling indices of these two unidirectional motion information in the unidirectional motion information candidate list into the bitstream. At the decoder side, the same method applies, that is, a unidirectional motion information candidate list is constructed using relevant information of the decoded part before the current block, and this unidirectional motion information candidate list must be identical to the one constructed at the encoder side. As such, the indices of the two unidirectional motion information are parsed out from the bitstream, and these two unidirectional motion information are search out from the unidirectional motion information candidate list as the two unidirectional motion information required for the current block.

In other words, the unidirectional motion information described herein may include motion vector information, which is the value of (x, y), and corresponding reference picture information, which is a reference picture list and a reference picture index in the reference picture list. In one manner, reference picture index values in two reference picture lists are recorded, where index values in one list are valid, such as 0, 1, 2, etc., and index values in the other list are invalid, i.e., −1. The reference picture list with valid reference picture index values is the reference picture list used for the motion information of the current block. The corresponding reference picture may be found in the reference picture list based on the reference picture index value. Each reference picture list has a corresponding motion vector, and the motion vector for the valid reference picture list is valid, while the motion vector for the invalid reference picture list is invalid. The decoder may use the reference picture information in the unidirectional motion information to find the required reference picture, and may find the reference block in the reference picture based on the position of the current block and the motion vector, that is, the value of (x, y), so as to determine the inter prediction value of the current block.

Figure 4A:
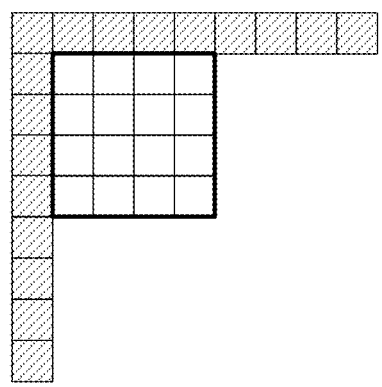
FIG. 4A is a schematic diagram illustrating intra prediction.

In intra prediction, the reconstructed samples that have been coded around the current block are used as reference samples to predict the current block. FIG. 4A is a schematic diagram illustrating intra prediction. As illustrated in FIG. 4A, the current block is 4×4 in size, and samples on the left column and the above row of the current block are used as reference samples for intra prediction of the current block. These reference samples may all be available, i.e., they have all been coded. Alternatively, some of the reference samples may not be available. For example, if the current block is on the leftmost of the picture, the reference samples on the left of the current block are not available. For another example, when coding the current block, the samples on the bottom left of the current block have not yet been coded, so the reference samples on the bottom left are also not available. For cases where reference samples are not available, available reference samples, certain values, or certain methods may be used for filling, or no filling may be performed.

Figure 4B:
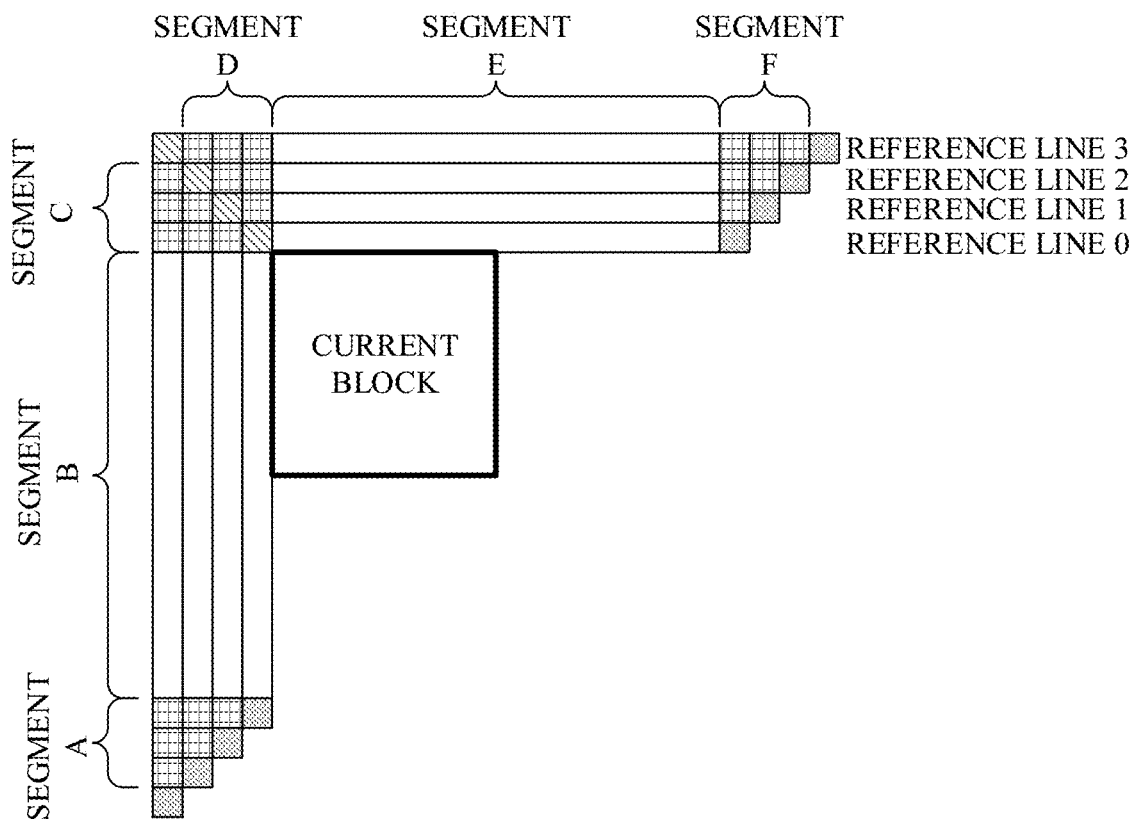
FIG. 4B is a schematic diagram illustrating intra prediction.
Figure 5A:
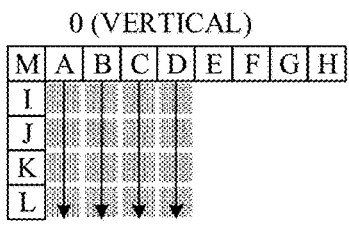
FIGS. 5A-5I are schematic diagrams illustrating intra prediction.
Figure 5B:
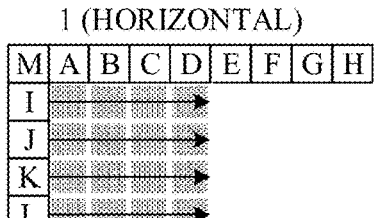
Figure 5C:
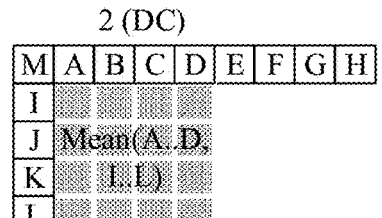
Figure 5D:
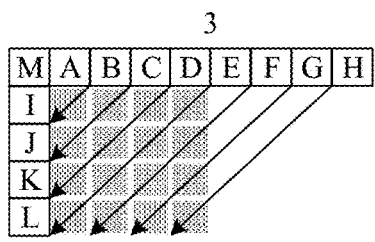
Figure 5E:
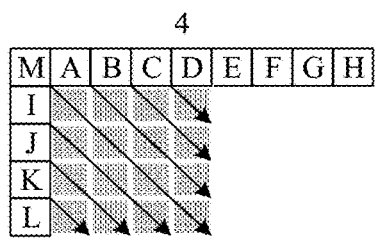
Figure 5F:
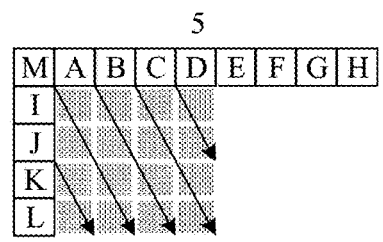
Figure 5G:
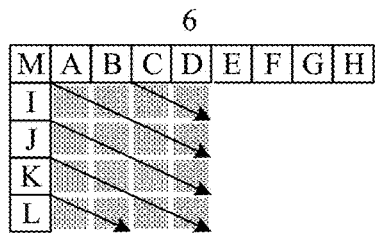
Figure 5H:
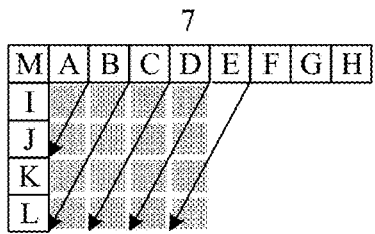
Figure 5I:
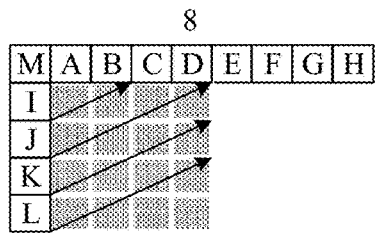

FIG. 4B is a schematic diagram illustrating intra prediction. As illustrated in FIG. 4B, A Multiple Reference Line (MRL) intra prediction method may use more reference samples to improve coding efficiency. For example, four reference rows/columns are used as the reference samples for the current block.

Further, there are multiple prediction modes for intra prediction. FIGS. 5A-5I are schematic diagrams illustrating intra prediction. As illustrated in FIGS. 5A-5I, in H.264, there are nine modes for intra prediction of 4×4 blocks. In mode 0 illustrated in FIG. 5A, samples above the current block are copied to the current block vertically as prediction values. In mode 1 illustrated in FIG. 5B, reference samples on the left of the current block are copied to the current block horizontally as prediction values. In mode 2 direct current (DC) illustrated in FIG. 5C, an average value of eight samples (A-D and I-L) is taken as the prediction values of all samples. In modes 3 to 8 illustrated in FIGS. 5D-5I, reference samples are copied to the corresponding positions of the current block according to a certain angle, and since some positions of the current block may not correspond exactly to the reference sample, a weighted average of reference samples or interpolated factional samples of the reference samples may be required.

Figure 6:
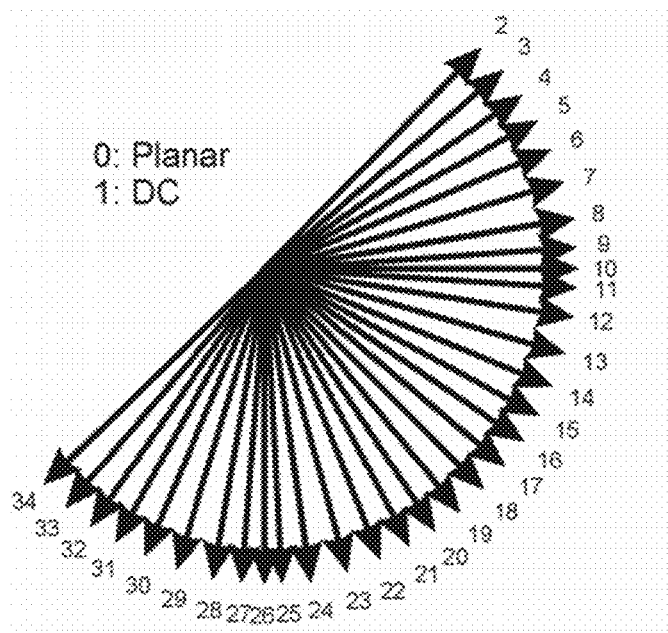
FIG. 6 is a schematic diagram of intra prediction modes.
Figure 7:
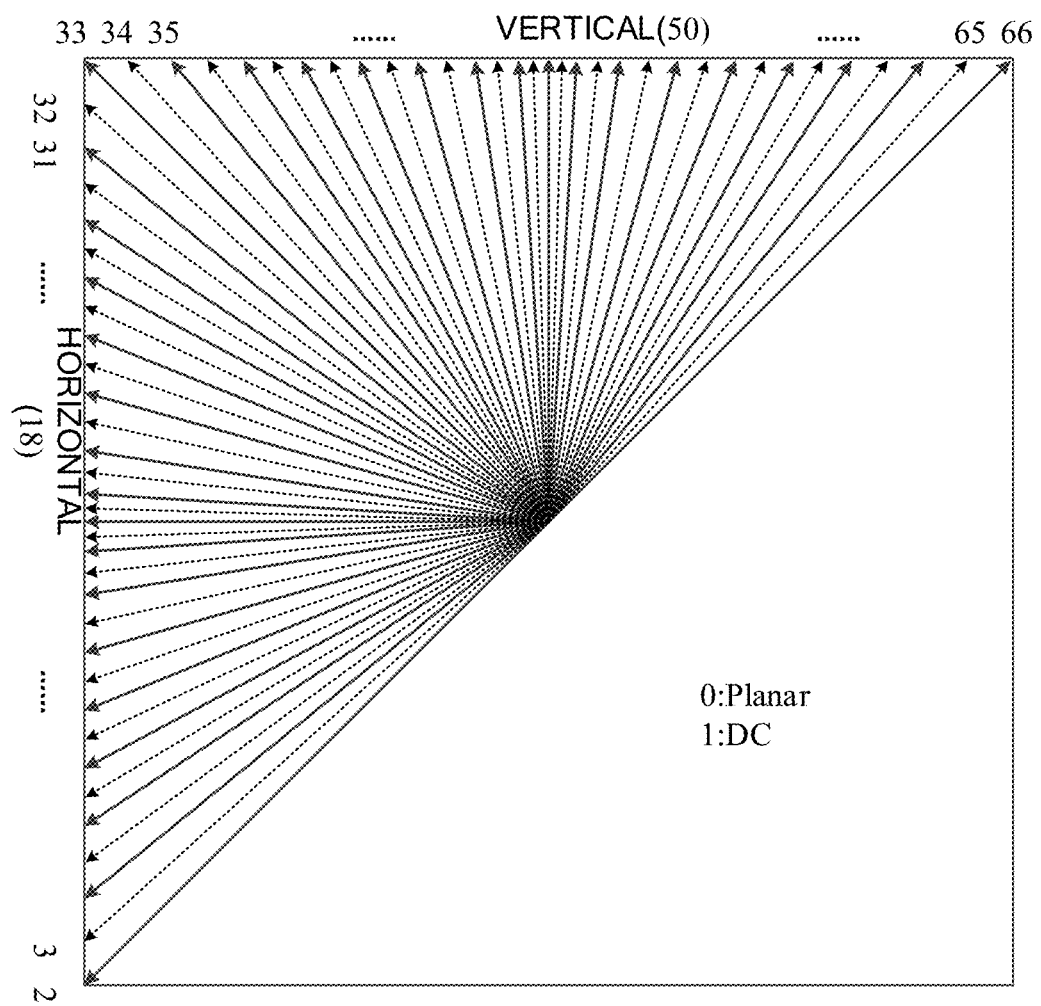
FIG. 7 is a schematic diagram of intra prediction modes.
Figure 8:
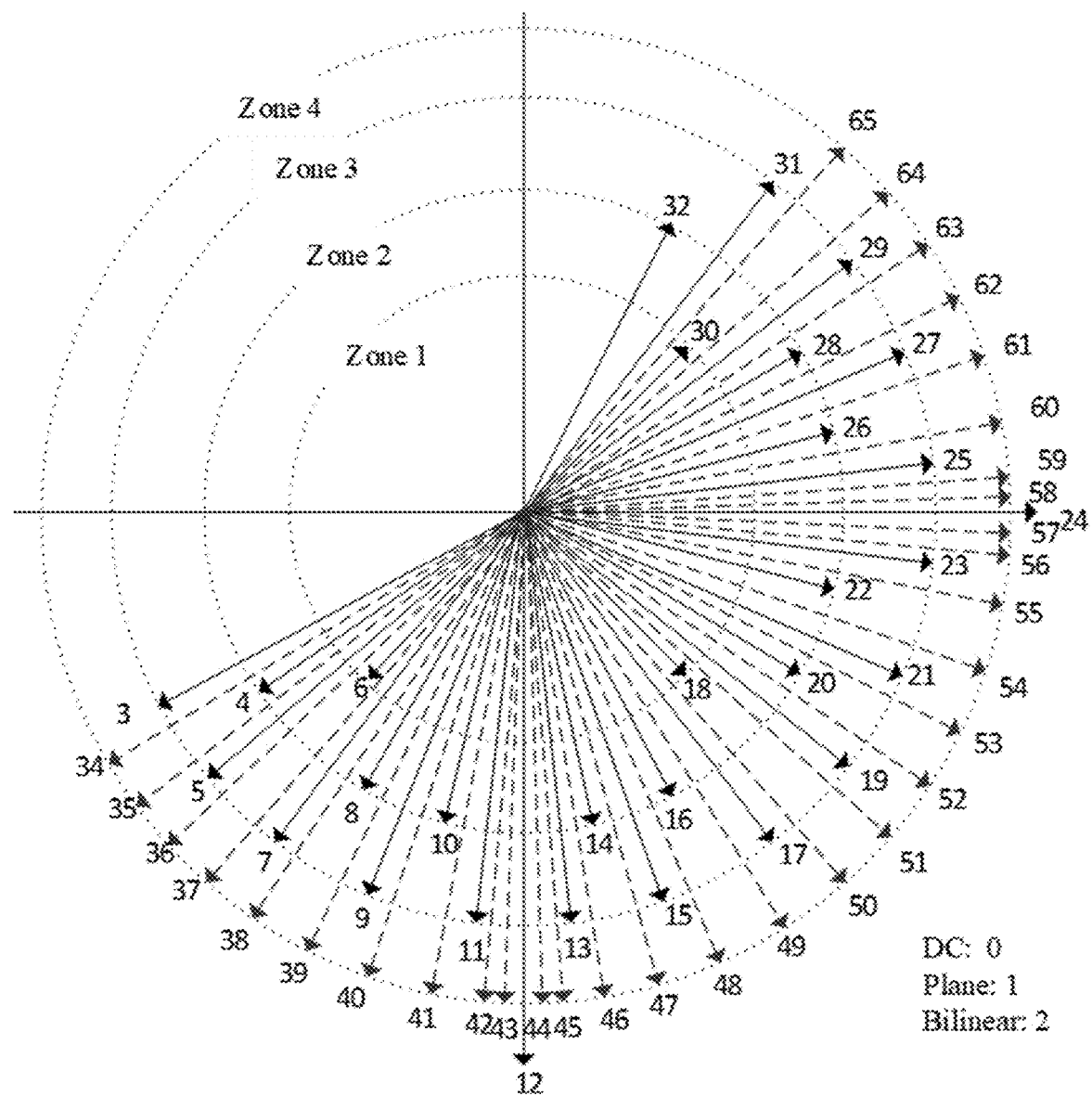
FIG. 8 is a schematic diagram of intra prediction modes.

In addition, there are other modes such as the Planar mode. As the technology develops and the block size increases, there are more and more angular prediction modes. FIG. 6 illustrates a schematic diagram of intra prediction modes. As illustrated in FIG. 6, HEVC uses a total of 35 prediction modes, including Planar, DC, and 33 angular modes. FIG. 7 illustrates a schematic diagram of intra prediction modes. As illustrated in FIG. 7, VVC uses a total of 67 prediction modes, including Planar, DC, and 65 angular modes. FIG. 8 illustrates a schematic diagram of intra prediction modes. As illustrated in FIG. 8, AVS3 uses a total of 66 prediction modes, including DC, Planar, Bilinear, and 63 angular modes.

Furthermore, there are some techniques to improve the prediction, such as fractional sample interpolation which improves reference samples, filtering of prediction samples, etc. For example, in the Multiple Intra prediction Filter (MIPF) in AVS3, prediction values are generated using different filters for different block sizes. For different positions of samples within the same block, a filter is used to generate prediction values for samples that are closer to the reference samples, while another filter is used to generate prediction values for samples that are away from the reference samples. The technology of filtering prediction samples, such as Intra prediction Filter (IPF) in AVS3, may filter the prediction values based on the reference samples.

In intra prediction, an intra mode coding technology using a most probable mode (MPM) list may be used to improve the coding efficiency. The mode list is constructed with intra prediction modes for the surrounding coded blocks, intra prediction modes derived from the intra prediction modes for the surrounding coded blocks, and some commonly-used or high-probability intra prediction modes, such as DC, Planar, and Bilinear modes. Reference to the intra prediction modes of the surrounding coded blocks utilizes spatial correlation because textures have a certain spatial continuity. The MPM(s) may be used as a prediction for intra prediction modes. That is, it is assumed that the probability of using the MPM for the current block is higher than not using the MPM. Therefore, during binarization, fewer codewords will be assigned to the MPM to save the cost and improve coding efficiency.

The variable predIntraPredMode (prediction value of the prediction mode) is used in AVS3 to represent the MPM(s), such as predIntraPredMode0 and predIntraPredMode1. The present disclosure considers "predIntraPredMode" to be another term for MPM, or in other words, the solution for MPM in this disclosure also applies to "predIntraPredMode".

In AVS3, predIntraPredMode0 and predIntraPredMode1 are constructed as follows.

The prediction value of the prediction mode predIntraPredMode of the current prediction block is calculated as follows:

If the left prediction block A "exists" and is a normal intra prediction block, then assign the IntraLumaPredMode of A to intraPredModeA; otherwise, intraPredModeA is equal to 0.

If the upper prediction block B "exists" and is a normal intra prediction block, then assign the IntraLumaPredMode of B to intraPredModeB; otherwise, intraPredModeB is equal to 0.

If intraPredModeA is not equal to intraPredModeB, then predIntraPredMode0 is equal to Min(intraPredModeA, intraPredModeB), and predIntraPredMode1 is equal to Max (intraPredModeA, intraPredModeB); otherwise:
- if intraPredModeA is equal to 0, then predIntraPredMode0 is equal to 0, and predIntraPredMode1 is equal to 2;
- if intraPredModeA is not equal to 0, then predIntraPredMode0 is equal to 0, and predIntraPredMode1 is equal to intraPredModeA.

In the above, 0 represents the DC mode, and 2 represents the Bilinear mode.

Although there are multiple modes for inter prediction and intra prediction, these modes may only handle prediction of simple texture. Even with an increasing number of angular modes, prediction based on these modes may only follow a straight line at a single angle. Therefore, the current prediction modes may only handle simple texture prediction. For complex textures, smaller partitioned blocks are required, more residuals need to be coded, or significant distortion will be introduced during prediction.

With regard to the above problem, in implementations of this disclosure, the coder may determine two different prediction values of the current block by using two different intra prediction modes, and combine the two prediction values by using diverse weight matrixes to finally obtain a more complex prediction value, improving the accuracy of the prediction. Additionally, the coder may also construct the MPM list by using the correlation between the weights and the prediction modes, which can greatly reduce the complexity, thereby reducing overhead of the bitstream. In other words, the prediction method proposed in this disclosure can improve the prediction quality while reducing the complexity, thus improving the compression performance.

Figure 9:
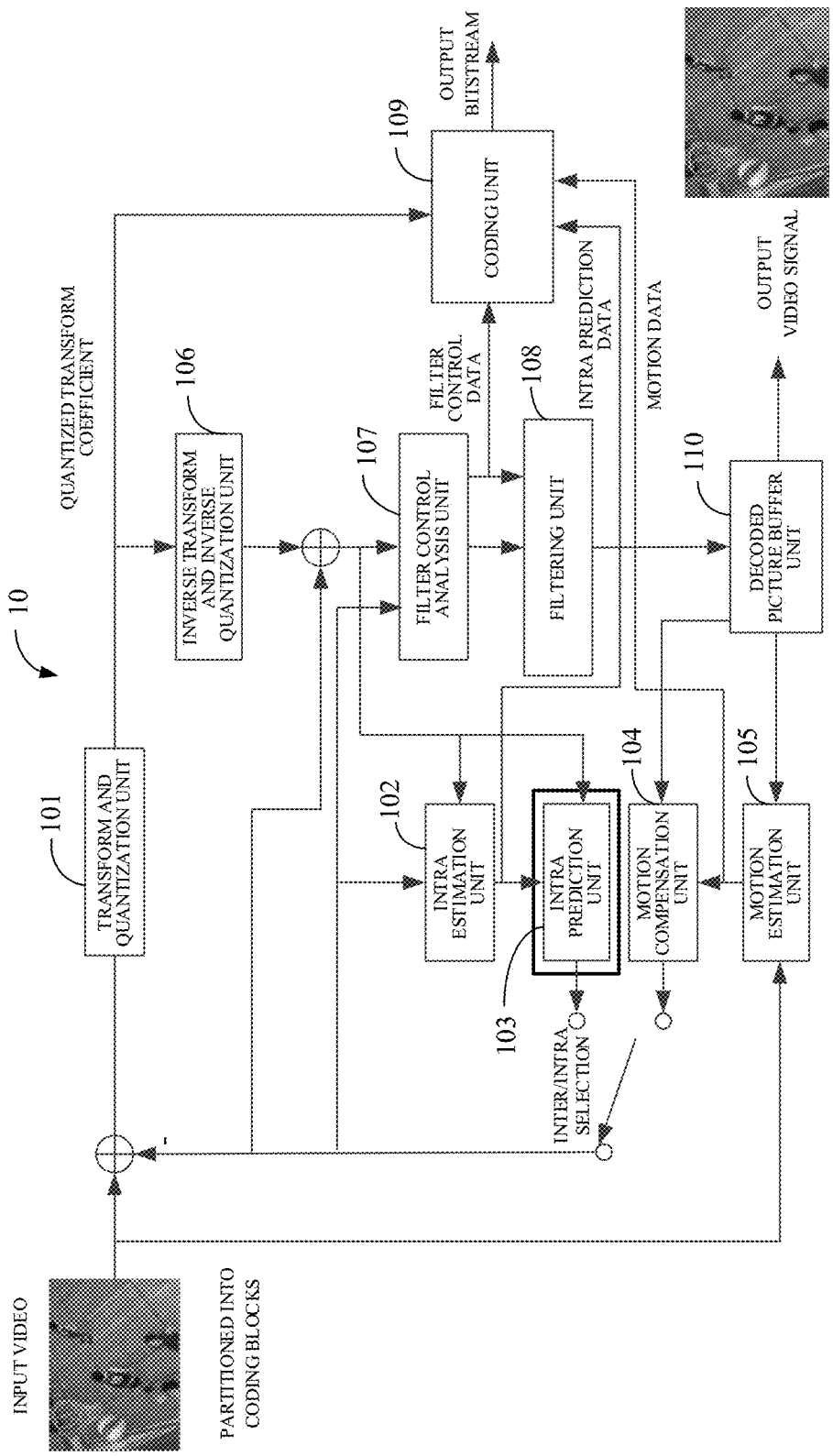
FIG. 9 is a block diagram of components of a video encoding system.

FIG. 9 is a schematic block diagram of a video encoding system provided in implementations of the present disclosure. As illustrated in FIG. 9, the video encoding system 10 includes units such as a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, an encoding unit 109, and a decoded picture buffer unit 110. The filtering unit 108 may implement deblocking filtering and Sample Adaptive Offset (SAO) filtering, and the encoding unit 109 may implement header information coding and context-based adaptive binary arithmetic coding (CABAC). An input raw video signal may be partitioned by a coding tree unit (CTU) to obtain a video encoding block. The video encoding block is transformed by the transform and quantization unit 101 processing residual sample information obtained after intra or inter prediction, which includes transforming the residual information from the pixel domain to the transform domain and quantizing the resulting transform coefficients to further reduce the bit rate. The intra estimation unit 102 and intra prediction unit 103 are configured to perform intra prediction on the video encoding block. Specifically, the intra estimation unit 102 and intra prediction unit 103 are configured to determine an intra prediction mode to be used for encoding the video encoding block. The motion compensation unit 104 and motion estimation unit 105 are configured to perform inter prediction coding of the received video encoding block relative to one or more reference blocks within one or more reference pictures, to provide temporal prediction information. The motion estimation performed by the motion estimation unit 105 involves generating a motion vector(s), which can estimate the motion of the video encoding block. Then the motion compensation unit 104 performs motion compensation based on the motion vector determined by the motion estimation unit 105. After determining the intra prediction mode, the intra prediction unit 103 is further configured to provide the selected intra prediction data to the encoding unit 109, and the motion estimation unit 105 also transmits the calculated motion vector data to the encoding unit 109. In addition, the inverse transform and inverse quantization unit 106 is configured to reconstruct the video encoding block by reconstructing a residual block in the pixel domain. The reconstructed residual block is then filtered by the filter control analysis unit 107 and filtering unit 108 to remove blocking effect artifacts, and then the reconstructed residual block is added to a prediction block within a picture in the decoded picture buffer unit 110 to produce the reconstructed video encoding block. The encoding unit 109 is configured to encode various encoding parameters and quantized transform coefficients. In the CABAC-based encoding algorithm, context content may be based on adjacent coding blocks and may be used to encode information indicating the determined intra prediction mode, outputting the bitstream of the video signal. The decoded picture buffer unit 110 is configured to store the reconstructed video encoding blocks for prediction reference. As the video picture encoding progresses, new reconstructed video encoding blocks are continuously generated and stored in the decoded picture buffer unit 110.

Figure 10:
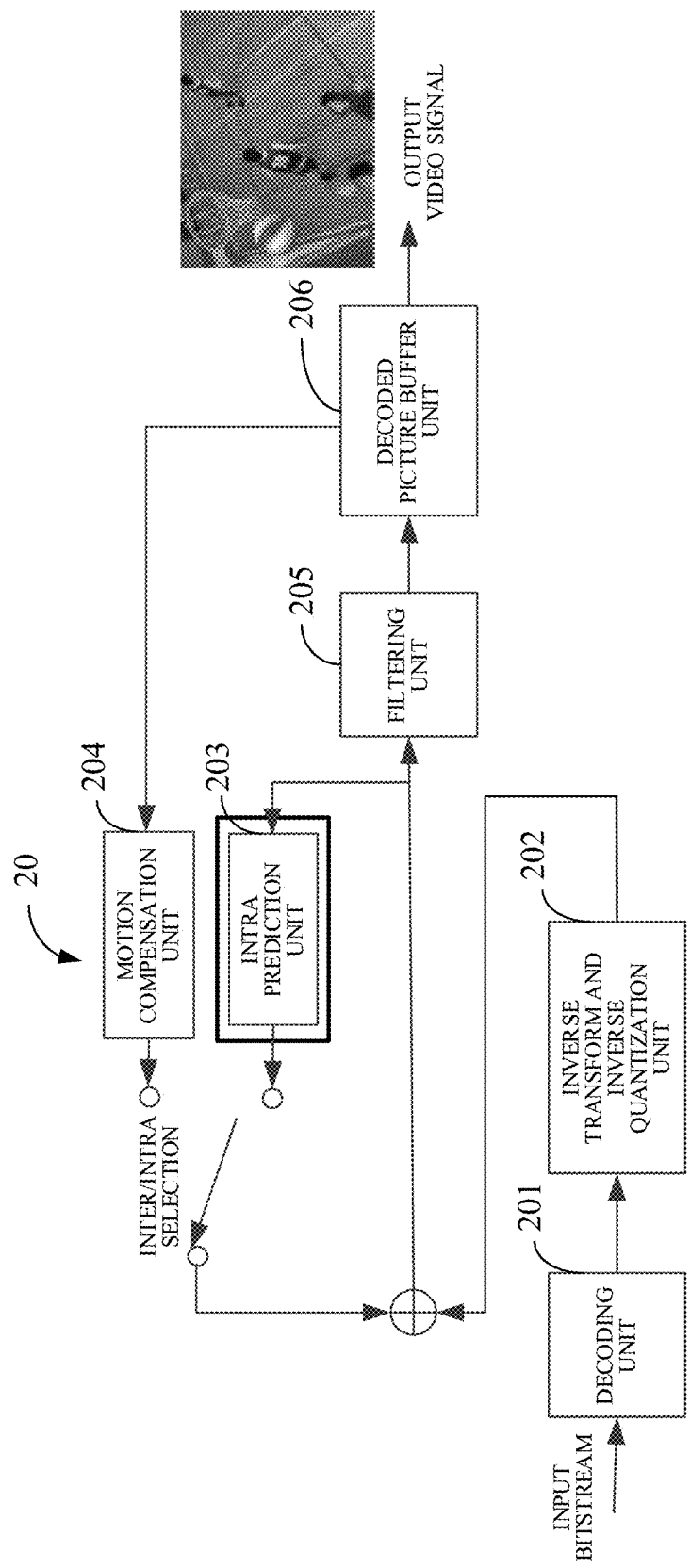
FIG. 10 is a block diagram of components of a video decoding system.

FIG. 10 illustrates a schematic block diagram of a video decoding system provided in implementations of the present disclosure. As illustrated in FIG. 10, the video decoding system 20 includes a decoding unit 201, an inverse transform and inverse quantization unit 202, an intra prediction unit 203, a motion compensation unit 204, a filtering unit 205, a decoded picture buffer unit 206, etc. The decoding unit 201 may implement header information decoding and CABAC decoding, and the filtering unit 205 may implement deblocking filtering and SAO filtering. The input video signal is encoded as illustrated in FIG. 9 and output as a bitstream. The bitstream is then input to the video decoding system 20 and first passes through the decoding unit 201 to obtain the decoded transform coefficients. The inverse transform and inverse quantization unit 202 processes these transform coefficients to generate residual blocks in the pixel domain. The intra prediction unit 203 may produce prediction data for the current video decoding block based on the determined intra prediction mode and data of previously decoded blocks from the current picture. The motion compensation unit 204 determines the prediction information for the video decoding block by parsing motion vectors and other related syntax elements, and uses this information to generate the prediction block for the video decoding block. The decoded video block is formed by summing the residual block from the inverse transform and inverse quantization unit 202 and the corresponding prediction block generated by the intra prediction unit 203 or motion compensation unit 204. The decoded video signal is then passed through the filtering unit 205 to remove blocking artifacts and thus improve video quality. The decoded video block is then stored in the decoded picture buffer unit 206, which stores reference pictures for subsequent intra prediction or motion compensation and is further configured to output the video signal, that is, the recovered original video signal is obtained.

The prediction method disclosed in the present disclosure is mainly applied in the intra prediction unit 103 and/or motion compensation unit 104 as illustrated in FIG. 9, and/or the intra prediction unit 203 and/or motion compensation unit 204 as illustrated in FIG. 10. In other words, the prediction method in the present disclosure may be applied to the video encoding system, to the video decoding system, or even simultaneously to both video encoding system and video decoding system, which is not limited in the disclosure. It should also be noted that when the prediction method is applied to the encoding side, the "current block" specifically refers to the current encoding block during prediction, while when the prediction method is applied to the decoding side, the "current block" specifically refers to the current decoding block during prediction.

The following is a clear and complete description of the technical solution in the implementations of the present disclosure, in conjunction with the accompanying drawings in this disclosure.

Figure 11:
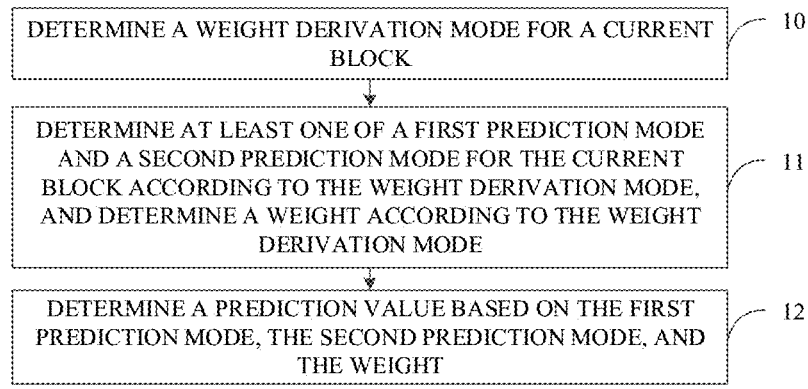
FIG. 11 is a schematic implementation flowchart of a prediction method.

A prediction method is provided in implementations of the disclosure, which is applied to an encoder. FIG. 11 is a schematic implementation flowchart of the prediction method. As illustrated in FIG. 11, the prediction method performed by the encoder may include the following operations.

At 10, a weight derivation mode for a current block is determined.

In the implementations of the present disclosure, the encoder may first determine a prediction mode parameter of the current block.

It should be noted that in this implementation, the prediction mode parameter may indicate whether a spatial angular weighted prediction (SAWP) encoding mode may be used for the current block, i.e., indicating whether two different prediction modes may be used for prediction of the current block.

It may be understood that in this implementation, the prediction mode parameter may be understood as a flag indicating whether the SAWP mode is used or not. Specifically, the encoder may use a variable as the prediction mode parameter, so that the prediction mode parameter may be set by setting the value of the variable.

For example, in this disclosure, if the SAWP mode is used for the current block, the encoder may set the value of the prediction mode parameter to indicate that the SAWP mode is used for the current block. Specifically, the encoder may set the value of the variable to 1.

For example, in this disclosure, if the SAWP mode is not used for the current block, the encoder may set the value of the prediction mode parameter to indicate that the SAWP mode is not used for the current block. Specifically, the encoder may set the value of the variable to 0.

Furthermore, in implementations of the present disclosure, after the encoder completes the setting of the prediction mode parameter, the encoder may signal the prediction mode parameter into a bitstream and transmit to the decoder. This allows the decoder to obtain the prediction mode parameter after parsing the bitstream.

In other words, in implementations of the present disclosure, the encoder will perform prediction encoding for the current block, during which the prediction mode parameter of the current block may be determined. The corresponding prediction mode parameter may then be signalled into the bitstream and transmitted from the encoder to the decoder.

It should be noted that in implementations of this disclosure, the SAWP mode is a prediction method. Specifically, in the SAWP mode, two different prediction modes are determined for the current block. These two different prediction modes include the following examples.

Example 1: Both of the above two different prediction modes are intra prediction modes.

Example 2: Both of the above two different prediction modes are inter prediction modes.

Example 3: One of the above two different prediction modes is an intra prediction mode, and the other is an inter prediction mode.

Example 4: One of the above two different prediction modes is an intra prediction mode, and the other is a non-intra and non-inter prediction mode, such as an Intra-Block Copy (IBC) prediction mode or a palette prediction mode.

Example 5: One of the above two different prediction modes is an inter prediction mode, and the other is a non-intra and non-inter prediction mode, such as the IBC prediction mode or palette prediction mode.

Example 6: Both of the above two different prediction modes are not intra prediction modes or inter prediction modes, such as one being the IBC prediction mode, and the other being the palette prediction mode.

It should be noted that the specific types of the above two different prediction modes are not limited in implementations of the disclosure.

Two prediction values are then determined according to these two different prediction modes and a weight may be determined, so as to combine the two prediction values according to the weight. Finally, a new prediction value may be obtained.

Figure 12:
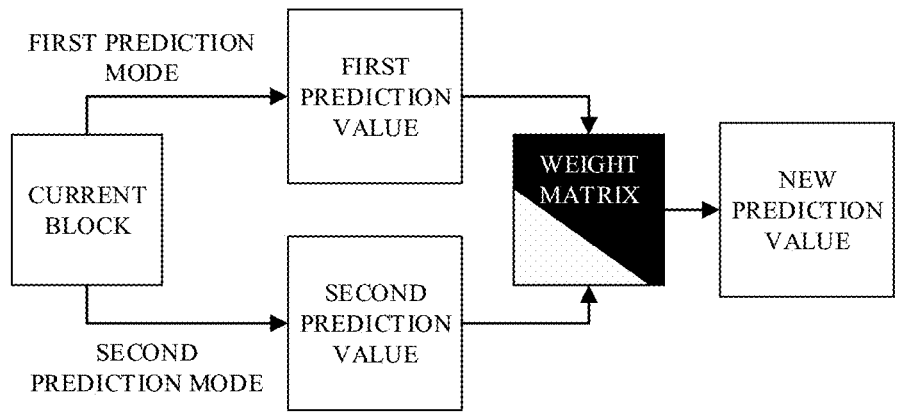
FIG. 12 is a schematic diagram of a spatial angular weighted prediction (SAWP) mode.

FIG. 12 illustrates a schematic diagram of the SAWP mode. As illustrated in FIG. 12, during prediction of the current block, the first prediction mode may be used to determine a first prediction value, and the second prediction mode may be used to determine a second prediction value. Then, the two prediction values may be combined using a weight to obtain a new prediction value.

It should be noted that in implementations of this disclosure, the video picture may be partitioned into multiple picture blocks, and the current block is the current picture block to-be-encoded, which may be referred to as a coding block (CB). Here, each coding block may include a first colour component, a second colour component, and a third colour component. Specifically, in this disclosure, if the first prediction is performed, and the first colour component is the luma component, i.e., the colour component to-be-predicted is the luma component, the coding block to-be-predicted may be referred to as a luma block. Or, if the second prediction is performed, and the second colour component is the chroma component, i.e., the colour component to-be-predicted is the chroma component, the coding block to-be-predicted may be referred to as a chroma block.

Further, in implementations of this disclosure, limitations may be imposed on the block size when applying the SAWP mode.

It may be understood that, since the prediction method proposed in this disclosure requires the use of two different prediction modes to generate two prediction values, which are then weighted to obtain a new prediction value, in order to reduce complexity while considering the trade-off between compression performance and complexity, the SAWP mode may not be used for blocks with certain sizes in implementations of the disclosure. Thus, in this disclosure, the encoder may first determine a size parameter of the current block, and then determine whether to use the SAWP mode for the current block based on the size parameter.

It should be noted that in the implementations of the disclosure, the size parameter of the current block may include both a height and a width of the block, so the encoder may limit the use of the SAWP mode based on the height and width of the current block.

For example, in this disclosure, if the width is greater than a first threshold and the height is greater than a second threshold, then it is determined to use the SAWP mode for the current block. As can be seen, one possible limitation is to use the SAWP mode only when the block width is greater than (or greater than or equal to) the first threshold and the block height is greater than (or greater than or equal to) the second threshold. The values of the first and second thresholds may be 8, 16, 32, etc., and the first threshold may be equal to the second threshold.

For example, in this disclosure, if the width is less than a third threshold and the height is greater than a fourth threshold, then it is determined to use the SAWP mode for the current block. As can be seen, one possible limitation is to use the SAWP mode only when the block width is less than (or less than or equal to) the third threshold and the block height is greater than (or greater than or equal to) the fourth threshold. The values of the third and fourth thresholds may be 8, 16, 32, etc., and the third threshold may be equal to the fourth threshold.

Furthermore, in the implementations of this disclosure, limitations on the block size for which the SAWP mode may be used may also be achieved through sample parameter restrictions.

For example, in this disclosure, the encoder may first determine a sample parameter of the current block, and then determine whether the SAWP mode may be used for the current block based on the sample parameter and a fifth threshold. As can be seen, one possible limitation is to use the SAWP mode only when the number of samples in the block is greater than (or greater than or equal to) the fifth threshold. The value of the fifth threshold may be 8, 16, 32, etc.

In other words, in this disclosure, the SAWP mode may be used for the current block only when the size parameter of the block meets the size requirement.

It should be noted that in the implementations of this disclosure, in addition to the SAWP mode proposed in this disclosure, the encoder may use other prediction modes such as the Direct Current (DC) mode, PLANAR mode, or any of the angular modes when predicting the current block.

It may be understood that in the implementations of this disclosure, before predicting the current block, the encoder may first determine the prediction mode parameter, and then use the prediction mode parameter to determine which specific encoding mode is used for the current block.

Furthermore, in the implementations of this disclosure, when determining the prediction mode parameter of the current block, the encoder may first use multiple different prediction modes to encode the current block separately, and then calculate the rate-distortion costs corresponding to each of the multiple prediction modes. Finally, the encoder may select the minimum rate-distortion cost from the calculated multiple rate-distortion costs and determine a prediction mode corresponding to the minimum rate-distortion cost as the prediction mode parameter of the current block.

That is to say, for the current block, the encoder may use multiple prediction modes respectively to encode the colour component to-be-predicted.

Moreover, in the implementations of this disclosure, after the encoder uses multiple prediction modes to encode the current block separately, the encoder may obtain the rate-distortion cost corresponding to each prediction mode. Then, the encoder may select the minimum rate-distortion cost from the obtained multiple rate-distortion costs and determine the prediction mode corresponding to the minimum rate-distortion cost as the prediction mode parameter of the current block. Thus, the determined prediction mode may be used to encode the current block, and in this prediction mode, the prediction residual may be reduced, which may improve the coding efficiency.

Furthermore, in the implementations of this disclosure, at the encoding side, when the encoder attempts to obtain a certain prediction value, the encoder will also attempt to obtain a cost of encoding using the SAWP mode. When attempting to obtain the cost of encoding using the SAWP mode, the encoder will attempt to obtain the costs in all or part of possible cases and then select the minimum cost as the cost of encoding using the SAWP mode.

It should be noted that in the implementations of this disclosure, the above-described all possible cases include a combination of three variables, which are: the first prediction mode for the current block is all possible prediction modes, the second prediction mode for the current block is all possible prediction modes, and the weight derivation mode is all possible modes. Assuming that there are 66 available prediction modes, the first prediction mode has 66 possible possibilities, and since the second prediction mode is different from the first prediction mode, the second prediction mode has 65 possible possibilities. Assuming that there are 56 possible weight derivation modes (taken AWP as an example), this disclosure may use any two different prediction modes and any one weight derivation mode, and thus there are 66×65×56 possibilities. If the PCM prediction mode is not used, there would be 65×64×56 possibilities. In this disclosure, the prediction modes that may be selected and the number of the weight derivation modes that may be used may be limited, so that the number of possible cases will be correspondingly reduced.

Furthermore, in the implementations of this disclosure, the encoder may perform rate-distortion optimization (RDO) on all possible cases of the SAWP mode to determine a combination with the minimum cost, where each combination includes the first prediction mode, the second prediction mode, and the weight derivation mode.

Optionally, to reduce the time consumption of RDO, a preliminary selection may be made on all possible cases of the SAWP mode mentioned above, for example, by using SAD, SATD, etc. as approximate cost, to determine a set number of candidate combinations of the first prediction mode, the second prediction mode, and the weight derivation mode. Then, RDO may be used for fine selection to determine the combination the first prediction mode, the second prediction mode, and the weight derivation mode with the minimum cost of. This allows for reducing the number of attempts by using some fast algorithms during preliminary selection. For example, if one angular prediction mode results in a high cost, several neighboring prediction modes of this angular prediction mode will not be attempted.

It can be understood that, in the above preliminary selection and fine selection in the present disclosure, the cost may include the cost of an overhead of encoding the first prediction mode, the second prediction mode, and the weight derivation mode in the bitstream. It is also possible to use an estimated cost of the overhead of the first prediction mode, the second prediction mode, and the weight derivation mode in the bitstream during the preliminary selection. For example, the number of bits of the first or second prediction mode is estimated according to whether the first or second prediction mode is an MPM, or the number of bits of the first or second prediction mode is estimated according to the ranking of the prediction modes. In RDO, the cost may be obtained through more accurate trial coding. In this process, the method of constructing the mode list or sorting the prediction modes in the present disclosure is needed.

It can be understood that in this disclosure, during both preliminary selection and fine selection, the first prediction value will be determined according to the first prediction mode, the second prediction value will be determined according to the second prediction mode, the weight will be derived according to the weight derivation mode, and the prediction value in this disclosure will be determined according to the first prediction value, the second prediction value, and the weight. During SAD and SATD preliminary selection, the SAD and SATD are determined using the current block and the prediction value corresponding to the current block. It should be noted that, deriving the weight according to the weight derivation mode can be understood as deriving the weight corresponding to each sample in the current block, and can also be understood as deriving the weight matrix corresponding to the current block. When determining the prediction value of the current block based on the weight, the first prediction value and the second prediction value corresponding to each sample in the current block are determined, and the prediction value corresponding to each sample is determined according to the first prediction value, the second prediction value, and the weight, where the prediction values corresponding to samples in the current block constitute the prediction value of the current block. Optionally, the prediction of the current block may be determined based on the weight on the block basis. For example, the first prediction value and the second prediction value of the current block are determined, and the first prediction value and the second prediction value of the current block are weighted according to the weight matrix of the current block to obtain a new prediction value of the current block.

Further, in the implementations of the present disclosure, the encoder may first analyse the textures of the current block, for example, by using gradients. The analysed data is used to help with preliminary selection. For example, among the textures of the current block, more prediction modes with directions similar to a direction that has a stronger texture will be selected in the above preliminary selection for trial. For example, among the textures of the current block, less or no prediction modes with directions similar to a direction that has a weaker texture will be selected for the preliminary selection.

It should be noted that in this disclosure, the cost for encoding using the SAWP mode includes a cost of codewords occupied by the first prediction mode, the second prediction mode, and the weight derivation mode in the bitstream, a cost of various flags and quantization coefficients that need to be transmitted in the bitstream generated from transformation, quantization, entropy encoding, etc. for the prediction residuals, a distortion cost of the reconstruction block, and the like.

After determining the cost of encoding using the SAWP mode, if the cost of encoding using the SAWP mode is lower than that of other prediction modes, which may include other prediction modes or inter prediction modes, the encoder will select the SAWP mode as the prediction mode for the current block. Otherwise, the encoder will select some other prediction mode.

In further implementations of this disclosure, the encoder will attempt different block partition schemes to determine the encoding costs. If the SAWP mode is selected for a particular prediction value, a flag required by the SAWP mode, as well as the information for the first prediction mode, the second prediction mode, and the weight derivation mode, may be signalled into the bitstream according to the syntax, and the prediction value may be predicted and encoded using the SAWP mode.

In this disclosure, after the encoder determines the prediction mode parameter for the current block, if the prediction mode parameter indicates that the SAWP mode is used to determine the prediction value of the current block, the encoder may further determine the weight derivation mode for the current block.

It should be noted that in this disclosure, the weight derivation mode is used to determine the weight(s) used for the current block. Specifically, the weight derivation mode may be a mode used to derive the weight. For a block of a given length and width, each weight derivation mode may be used to derive a weight matrix. Different weight derivation modes may be used to derive different weight matrices for blocks of the same size.

For example, in this disclosure, there are 56 weight derivation modes for AWP and 64 weight derivation modes for GPM.

At 11, at least one of a first prediction mode or a second prediction mode for the current block is determined based on the weight derivation mode, and the weight is determined according to the weight derivation mode.

In the present implementations of this disclosure, if the prediction mode parameter indicates that the SAWP mode is used to determine the prediction value of the current block, after the encoder determines the weight derivation mode for the current block, the encoder may first determine the first prediction mode and the second prediction mode for the current block based on the weight derivation mode, and determine the weight according to the weight derivation mode.

At least one of the first prediction mode or the second prediction mode in this disclosure is an intra prediction mode, an inter prediction mode, an IBC prediction mode, or a palette prediction mode. For example, the first prediction mode is an intra prediction mode and the second prediction mode is an inter prediction mode. Alternatively, the first prediction mode is an inter prediction mode and the second prediction mode is an intra prediction mode. Alternatively, the first prediction mode is an intra prediction mode or an inter prediction mode, and the second prediction mode is an IBC prediction mode or a palette prediction mode. Alternatively, the first prediction mode is an IBC prediction mode or a palette prediction mode, and the second prediction mode is an intra prediction mode or an inter prediction mode. Alternatively, both the first prediction mode and the second prediction mode are intra prediction modes. Alternatively, both the first prediction mode and the second prediction mode are inter prediction modes. The specific types of the first prediction mode and the second prediction mode are not limited in implementations of the disclosure.

In some implementations, the inter prediction mode includes a skip mode, a merge mode, a basic inter prediction mode, etc.

In some implementations, the intra prediction mode includes a unidirectional prediction mode, a bidirectional prediction mode, a multi-hypothesis prediction mode, etc.

In some implementations, the intra prediction mode includes intra prediction techniques such as weighted prediction, decoder side motion vector refinement (DMVR), decoder side motion vector derivation (DMVD), and bi-directional optical flow (BDOF).

In some implementations, if the first prediction mode and/or the second prediction mode is an intra prediction mode, the MPM mode may not be used for the first prediction mode and/or the second prediction mode.

In some implementations, if the first prediction mode and/or the second prediction mode is an intra prediction mode, the MPM mode may be used for the first prediction mode and/or the second prediction mode.

In the prediction method proposed in implementations of the disclosure, based on the first prediction mode and the second prediction mode, two prediction values that are not completely identical may be determined, and the weight may be determined. The two prediction values may be combined according to the weight to obtain a new prediction value.

In implementations of the disclosure, each sample in the current block corresponds to a weight, and these weights form a weight map or weight matrix.

In this disclosure, the positions where the weight values change form a straight line (or curved line), or, in the blending area as illustrated in FIGS. 1 and 2, the positions where the weight values are the same form a straight line (or curved line). This straight line may be called the boundary line. The boundary line itself also has an angle. The angle horizontal to the right may be set to 0 degree, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a block, the corresponding texture is likely to show different characteristics on two sides of the boundary line, such as textures with two different angles on two sides of the boundary line respectively, or an angular texture on one side of the boundary line and a flat texture on the other side of the boundary line. Since the boundary line itself also has an angle, it may be assumed that the boundary line is obtained through angular prediction with a point, which may be close to some textures of the current block, so there is correlation between this straight line and the two prediction modes for the current block.

Specifically, in this disclosure, assuming that the boundary line is obtained through angular prediction with a point, at least one angular prediction mode may be found, which may be used to approximately create the boundary line. For example, a horizontal boundary line matches a horizontal prediction mode, such as mode 18 in VVC. A vertical boundary line matches a vertical intra prediction mode, such as mode 50 in VVC. A 45-degree boundary line may match a 45-degree intra prediction mode from bottom-left to upper-right, such as mode 66 in VVC, or a 225-degree intra prediction mode from upper-right to bottom-left, such as mode 2 in VVC. Thus, the weight derivation mode may match some intra prediction mode(s).

It should be noted that in this disclosure, the weight derivation mode may also be the index of the weight, for example, the 56 modes of AWP may be considered as 56 weight derivation modes, and the 64 modes of GPM in VVC may be considered as 64 weight derivation modes.

In some implementations, in addition to the intra angular prediction mode corresponding to the weight boundary line, some intra angular prediction modes related to the weight boundary line are also more likely to be used, such as intra prediction modes corresponding to angles near the boundary line or perpendicular to the boundary line.

In some implementations, if the two prediction values are obtained by predicting using intra prediction modes, two different intra prediction modes should be used in GPM.

In some implementations, if one of the two prediction values is obtained using an intra prediction mode and the other prediction value is obtained using another prediction method, only one intra prediction mode needs to be used in GPM. In this case, a smaller range of intra prediction modes may be provided for GPM to select from, thus saving the cost of the overhead of the flag indicating which intra prediction mode is selected.

In some implementations, in GPM, one prediction value is derived from intra prediction, and the other prediction value is derived from inter prediction. Assume the intra prediction mode used in this disclosure is determined by the weight derivation mode by default. For instance, if the boundary line of the weight derivation mode is in the horizontal direction, such as modes 18, 19, 50, and 51 of GPM as illustrated in FIG. 1, the intra prediction mode is determined to be the horizontal mode 18. Similarly, if the boundary line of the weight derivation mode is in the vertical direction, such as modes 0, 1, 36, and 37 of GPM as illustrated in FIG. 1, the intra prediction mode is determined to be the vertical mode 50.

In other words, in this disclosure, before determining at least one of the first and second prediction modes according to the weight derivation mode, the types of the first and second prediction modes should be determined. Only when the first and/or second prediction modes are intra prediction modes may the weight derivation mode be used to determine the first and/or second prediction modes.

Based on the above, before operations at 11 in FIG. 11 mentioned above, the method in implementations of this disclosure further includes the following.

A first flag is obtained, the first flag indicating whether the first and second prediction modes belong to intra prediction modes;

The types of the first and second prediction modes are determined according to the first flag.

That is, in this disclosure, the types of the first and second prediction modes are preset during encoding, and are indicated through the first flag.

For example, when the first flag has a first value, it indicates that both the first and second prediction modes are inter prediction modes. In this case, mode0IsInter and mode1IsInter are both equal to 1, where mode0IsInter indicates whether the first prediction mode is an inter prediction mode, and mode1IsInter indicates whether the second prediction mode is an inter prediction mode. If the first prediction mode is an inter prediction mode, mode0IsInter is equal to 1. If the second prediction mode is an inter prediction mode, mode1IsInter is equal to 1.

For example, when the first flag has a second value, it indicates that the first prediction mode is an intra prediction mode and the second prediction mode is an inter prediction mode. In this case, mode0IsInter is equal to 0 and mode1IsInter is equal to 1.

For example, when the first flag has a third value, it indicates that the first prediction mode is an inter prediction mode and the second prediction mode is an intra prediction mode. In this case, mode0IsInter is equal to 1 and mode1IsInter is equal to 0.

For example, when the first flag has a fourth value, it indicates that both the first and second prediction modes are intra prediction modes. In this case, mode0IsInter is equal to 0 and mode1IsInter is equal to 0.

This disclosure does not limit the specific values of the first, second, third, and fourth values.

Optionally, the first value is 0.
Optionally, the second value is 1,
Optionally, the third value is 2.
Optionally, the fourth value is 3.

In one example, the field "intra_mode_idx" may be used to represent the first flag.

In this disclosure, after the encoding side determines the types of the first and second prediction modes according to the first flag, the first flag should be signalled into the bitstream during encoding, so that the decoding side may determine the types of the first and second prediction modes according to the first flag.

Optionally, the first flag (intra_mode_idx) may be signalled into the bitstream according to Table 4.

TABLE 4

| { | |
|---|---|
| merge_gpm_partition_idx[x0][y0] | ae(v) |
| intra_mode_idx[x0][y0] | ae(v) |
| if( mode0IsInter ) | |
| merge_gpm_idx0[x0][y0] | ae(v) |
| if( (!mode0IsInter && mode1IsInter) \|\| (MaxNumGpmMergeCand > 2 && mode0IsInter && mode1IsInter)) | |
| merge_gpm_idx1[x0][y0] | ae(v) |
| } | | where merge_gpm_partition_idx represents the weight derivation mode or the weight derivation index, intra_mode_idx represents the first flag, merge_gpm_idx0 represents an index value of the first motion information in the candidate list, and merge_gpm_idx1 represents an index value of the second motion information in the candidate list.

In this disclosure, after the encoding side determines the types of the first and second prediction modes according to the above-mentioned first flag, operations at 11 in FIG. 11 includes the following.

If at least one of the first and second prediction modes is an intra prediction mode, the weight derivation mode is used to determine at least one of the first and second prediction modes.

That is to say, in this disclosure, the intra prediction mode is determined based on the weight derivation mode. For example, if both the first and second prediction modes are intra prediction modes, both the first and second prediction modes are determined based on the weight derivation mode. For another example, if one of the first and second prediction modes is an intra prediction mode, the intra prediction mode in the first and second prediction modes is determined based on the weight derivation mode.

The manner of determining at least one of the first and second prediction modes based on the weight derivation mode includes but is not limited to the following.

Manner 1: if either the first or second prediction mode is an intra prediction mode, an angle index is determined according to the weight derivation mode, and an intra prediction mode corresponding to the angle index is determined as the first or second prediction mode.

The angle index indicates an angle index of the boundary line of the weight.

In some implementations, the angle index is represented by the field "angleIdx".

Table 2 above illustrates the correspondence between merge_gpm_partition_idx and angleIdx. Based on Table 2, the angle index may be derived according to the weight derivation mode.

In this disclosure, there is a correspondence between the angle indices and the intra prediction modes, i.e., different angle indices correspond to different intra prediction modes.

As an example, the correspondence between the angle indices and the intra prediction modes is illustrated in Table 5.

TABLE 5

| angleIdx | Intra prediction mode |
|---|---|
| 0 | 50 |
| 2 | 42 |
| 3 | 38 |
| 4 | 34 |
| 5 | 30 |
| ... | ... |

In manner 1, if the first prediction mode or the second prediction mode is an intra prediction mode, the angle index is determined according to the weight derivation mode. For example, the angle index corresponding to the weight derivation mode is derived according to Table 2 above. Then, the intra prediction mode corresponding to the angle index is derived from Table 5 above. For example, if the angle index is 2, the corresponding intra prediction mode is 42, and then intra prediction mode 42 is determined as the first or second prediction mode.

Manner 2: if the first prediction mode and/or the second prediction mode is an intra prediction mode, the intra prediction mode corresponding to the weight derivation mode is obtained, and the first and/or second prediction mode is determined based on the intra prediction mode corresponding to the weight derivation mode.

In manner 2, if the first prediction mode and/or the second prediction mode is an intra prediction mode, the first and/or second prediction mode is determined from the intra prediction mode corresponding to the weight derivation mode. For example, the first and/or second prediction mode may be an intra prediction mode that is on or near the same line as the weight partition line (also known as the boundary line). Alternatively, the first and/or second prediction mode may be an intra prediction mode that is perpendicular or near perpendicular to the weight partition line. For example, if the weight boundary line is horizontal, such as mode 18, 19, 50, or 51 in GPM in FIG. 1, the first and/or second prediction mode may be horizontal mode 18 and vertical mode 50.

As may be seen from the above, there are many types of intra prediction modes corresponding to the weight derivation mode, including an intra prediction mode parallel to the boundary line of the weight, an intra prediction mode perpendicular to the boundary line, and the like. In this disclosure, a flag(s) may be used to indicate which mode in the intra prediction modes corresponding to the weight derivation mode is selected as the first and/or second prediction mode.

For example, if the first prediction mode is an intra prediction mode, a second flag is used to indicate the correspondence between the first prediction mode and the intra prediction modes corresponding to the weight derivation mode. For example, the second flag indicates that the first prediction mode is the intra prediction mode parallel to the boundary line of the weight, or indicates that the first prediction mode is the intra prediction mode perpendicular to the boundary line of the weight.

For example, if the second prediction mode is an intra prediction mode, a third flag is used to indicate the correspondence between the second prediction mode and the intra prediction modes corresponding to the weight derivation mode. For example, the third flag indicates that the second prediction mode is the intra prediction mode parallel to the boundary line of the weight, or indicates that the second prediction mode is the intra prediction mode perpendicular to the boundary line of the weight.

Based on this, the manner 2 for determining the first prediction mode and/or the second prediction mode according to the intra prediction mode corresponding to the weight derivation mode includes but is not limited to the following examples.

Example 1: if the first prediction mode is an intra prediction mode, the second flag is obtained, and an intra prediction mode corresponding to the second flag in the intra prediction modes corresponding to the weight derivation mode is determined as the first prediction mode.

Example 2: if the second prediction mode is an intra prediction mode, the third flag is obtained, and an intra prediction mode corresponding to the third flag in the intra prediction modes corresponding to the weight derivation mode is determined as the second prediction mode.

In some implementations, the intra prediction mode corresponding to the weight derivation mode includes at least one of the intra prediction mode parallel to the boundary line of the weight or the intra prediction mode perpendicular to the boundary line.

Optionally, when the second flag has a fifth value, such as 0, it indicates that the first prediction mode is the intra prediction mode parallel to the boundary line of the weight in the intra prediction modes corresponding to the weight derivation mode. When the second flag has a sixth value, such as 1, it indicates that the first prediction mode is the intra prediction mode perpendicular to the boundary line of the weight in the intra prediction modes corresponding to the weight derivation mode.

Optionally, when the third flag has the fifth value, such as 0, it indicates that the second prediction mode is the intra prediction mode parallel to the boundary line of the weight in the intra prediction modes corresponding to the weight derivation mode. When the third flag has the sixth value, such as 1, it indicates that the second prediction mode is the intra prediction mode perpendicular to the boundary line of the weight in the intra prediction modes corresponding to the weight derivation mode.

In some implementations, the intra prediction mode corresponding to the weight derivation mode includes at least one of the intra prediction mode parallel to the boundary line of the weight, the intra prediction mode perpendicular to the boundary line, or the planar mode.

Optionally, when the second flag has the fifth value, such as 0, it indicates that the first prediction mode is the intra prediction mode parallel to the boundary line of the weight in the intra prediction modes corresponding to the weight derivation mode. When the second flag has the sixth value, such as 1, it indicates that the first prediction mode is the intra prediction mode perpendicular to the boundary line of the weight in the intra prediction modes corresponding to the weight derivation mode. When the second flag has a seventh value, such as 2, it indicates that the first prediction mode is the planar mode.

Optionally, when the third flag has the fifth value, such as 0, it indicates that the second prediction mode is the intra prediction mode parallel to the boundary line of the weight in the intra prediction modes corresponding to the weight derivation mode. When the third flag has the sixth value, such as 1, it indicates that the second prediction mode is the intra prediction mode perpendicular to the boundary line of the weight in the intra prediction modes corresponding to the weight derivation mode. When the third flag has the seventh value, such as 2, it indicates that the second prediction mode is the planar mode.

In one example, the field "intra_gpm_idx0" is used to represent the second flag.

In one example, the field "intra_gpm_idx1" is used to represent the third flag.

In this disclosure, if the first prediction mode is an intra prediction mode, then the first prediction mode is determined according to the second flag as described above. If the second prediction mode is an intra prediction mode, then the second prediction mode is determined according to the third flag as described above. Furthermore, the above second flag and/or third flag is signalled into the bitstream at the encoding side.

For example, the second flag (intra_gpm_idx0) and/or the third flag (intra_gpm_idx1) may be signalled into the bitstream in the manner illustrated in Table 6 below.

TABLE 6

| | |
|---|---|
| { | |
|   merge_gpm_partition_idx[x0][y0] | ae(v) |
| intra_mode_idx[x0][y0] | ae(v) |
| if( mode0IsInter ) | |
|   merge_gpm_idx0[ x0][y0] | ae(v) |
|   if( (!mode0IsInter && mode1IsInter) \|\| | |
| (MaxNumGpmMergeCand > 2 | |
| && mode0IsInter && mode1IsInter)) | |
|   merge_gpm_idx1[x0][y0] | ae(v) |
| if(! mode0IsInter) | |
|   intra_gpm_idx0[x0][y0] | ae(v) |
|   if(! mode1IsInter) | |
|   intra_gpm_idx1[x0][y0] | ae(v) |
| } | |

At the encoding side, the second flag and/or the third flag are signalled into the bitstream in the manner described in Table 6 above. At the decoding side, the bitstream is decoded to obtain the second flag and/or the third flag, and based on these flags, the first prediction mode and/or the second prediction mode are determined. Using the first and second prediction modes and the corresponding weights, the prediction value is then determined.

In some implementations, if both the first and second prediction modes are intra prediction modes, the second flag and the third flag have different values. To ensure that the values of the second and third flags are different, a feasible way is to set the value of the second flag (intra_gpm_idx1) to be 0 or 1, and if intra_gpm_idx1 is greater than intra_gpm_idx0, then intra_gpm_idx1 is incremented by 1.

At 12 in FIG. 11, the prediction value is determined based on the first prediction mode, the second prediction mode, and the weight.

In some implementations, the above prediction process is carried out on a sample basis, and the weight above represents the weights corresponding to the samples. In this case, when predicting the current block, the first intra prediction mode is used to predict certain sample A in the current block to obtain a first prediction value of sample A. The second intra prediction mode is used to predict sample A to obtain and the second prediction value of sample A is obtained. The first and second prediction values are then weighted according to the weight corresponding to sample A to obtain a new prediction value of sample A. This process is repeated for each sample in the current block to obtain the prediction value for each sample in the current block. The prediction values corresponding to the samples in the current block form the prediction value for the current block.

In one example, if both the first and second prediction modes are intra prediction modes, the first intra prediction mode is used for prediction to obtain the first prediction value, the second intra prediction mode is used for prediction to obtain the second prediction value, and the first and second prediction values are then weighted according to the weight to obtain the new prediction value. For example, the first intra prediction mode is used to predict sample A to obtain the first prediction value of sample A, the second intra prediction mode is used to predict sample A to obtain the second prediction value of sample A, and the first and second prediction values are then weighted according to the weight of sample A to obtain the new prediction value of sample A.

In another example, if the first prediction mode is an intra prediction mode and the second prediction mode is an inter prediction mode, the intra prediction mode is used for prediction to obtain the first prediction value, and the inter prediction mode is used for prediction to obtain the second prediction value. The first prediction value and the second prediction value are then weighted according to the weight to obtain a new prediction value. In this example, the intra prediction mode is used to predict each sample in the current block to obtain prediction values of all samples, which constitute the first prediction value of the current block. The inter prediction mode is used to search for a best matching block of the current block within a predetermined search range, and the best matching block is determined as the second prediction value of the current block. Based on the weights of each sample in the current block, the first prediction value and the second prediction value of the current block are weighted on a sample basis to obtain the new prediction value of the current block. For example, for sample A in the current block, a first prediction value corresponding to sample A in the first prediction value of the current block and a second prediction value corresponding to sample A in the second prediction value of the current block are weighted according to the weight of sample A, so as to obtain a new prediction value of sample A.

In the prediction method provided in the implementations of the disclosure, the weight derivation mode for the current block is derived, the first prediction mode and the second prediction mode for the current block are determined according to the weight derivation mode, the weight is determined according to the weight derivation mode, and the prediction value is determined based on the first prediction mode, the second prediction mode, and the weight. That is, in the implementations of the disclosure, the encoder may determine two different prediction values based on two different prediction modes, and then combine the prediction values with diverse weights to obtain a more complex prediction value, thereby improving the accuracy of the prediction. Meanwhile, the encoder may also determine the first prediction mode and/or the second prediction mode based on the correlation between the weight and the prediction modes, which can greatly reduce complexity without transmitting the prediction modes in the bitstream, thereby reducing the bitstream overhead. Therefore, the prediction method proposed in this disclosure can improve compression performance by enhancing prediction quality while reducing complexity and bitstream overhead.

The method in implementations of the disclosure will be described below with an example in which the first prediction mode is a first intra prediction mode and the second prediction mode is a second intra prediction mode.

Figure 13:
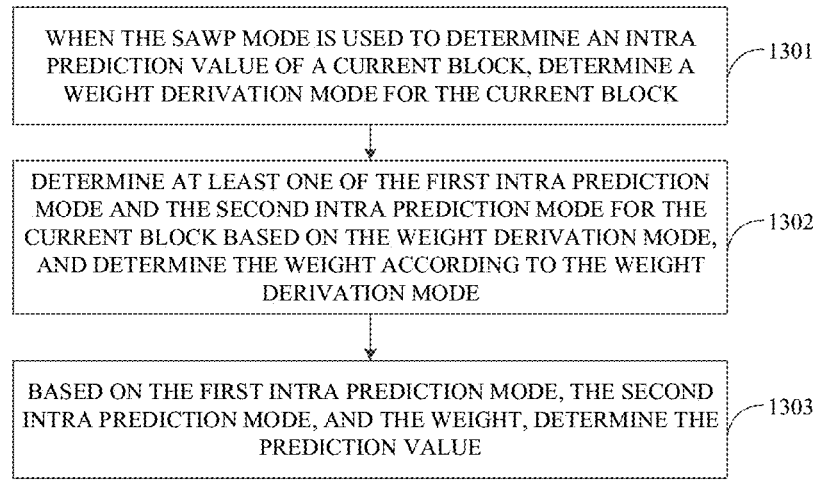
FIG. 13 is a schematic implementation flowchart of the prediction method.

FIG. 13 illustrates a schematic implementation flowchart of a prediction method. As illustrated in FIG. 13, the prediction method performed by the encoder may include the following.

At block 1301, when the SAWP mode is used to determine an intra prediction value of a current block, a weight derivation mode for the current block is determined.

In some implementations, the weight derivation mode is also referred to as a weight matrix derivation mode.

In the implementations of the disclosure, the encoder may first determine an intra prediction mode parameter of the current block.

It should be noted that in the implementations of the disclosure, the intra prediction mode parameter may indicate whether the SAWP mode could be used for prediction of the current block, that is, indicate whether two different prediction modes could be used for prediction of the current block.

It may be understood that in the implementations of the disclosure, the intra prediction mode parameter may be understood as a flag indicating whether the SAWP mode is used or not. Specifically, the encoder may use a variable as the intra prediction mode parameter, so that the setting of the intra prediction mode parameter may be achieved by setting the value of the variable.

For example, in the present disclosure, if the SAWP mode is used for the current block, the encoder may set the value of the intra prediction mode parameter to indicate that the SAWP mode is used for the current block. Specifically, the encoder may set the value of the variable to 1.

For example, in the present disclosure, if the SAWP mode is not used for the current block, the encoder may set the value of the intra prediction mode parameter to indicate that the SAWP mode is not used for the current block. Specifically, the encoder may set the value of the variable to 0.

Furthermore, in the implementations of the disclosure, after the encoder completes the setting of the intra prediction mode parameter, the encoder may signal the intra prediction mode parameter into a bitstream and transmit to the decoder, so that the decoder may obtain the intra prediction mode parameter after parsing the bitstream.

That is to say, in the implementations of the disclosure, the encoder will perform prediction coding for the current block, during which the intra prediction mode parameter of the current block may be determined. The corresponding intra prediction mode parameter is signalled into the bitstream for transmission from the encoder to the decoder.

It should be noted that in the implementations of the disclosure, the SAWP mode is a type of intra prediction method. Specifically, in the SAWP mode, two different intra prediction modes are determined for the current block, and then two prediction values are determined based on these two different intra prediction modes. Then a weight is determined to combine the two prediction values according to the weight, resulting in a new prediction value, which is the prediction value of the current block.

Figure 14:
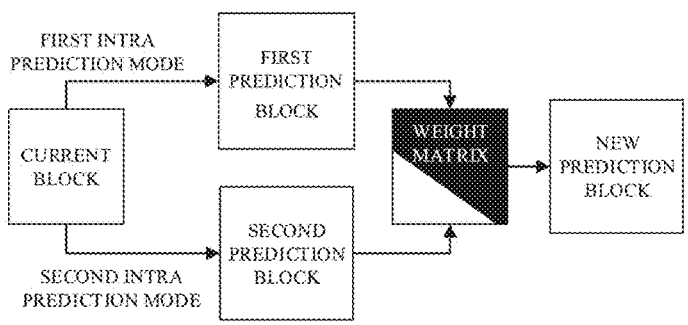
FIG. 14 is a schematic diagram of a SAWP mode.

FIG. 14 is a schematic diagram of the SAWP mode. As illustrated in FIG. 14, when performing intra prediction on the current block, the first intra prediction mode may be used to determine the first prediction value of the current block, while the second intra prediction mode may be used to determine the second prediction value of the current block. Then, the first and second prediction values may be combined using the weight to obtain the new prediction value.

It should be noted that in the implementations of the present disclosure, the video picture may be partitioned into multiple picture blocks, and the current block refers to each picture block to-be-encoded, which may be referred to as a CB. Here, each coding block may include a first colour component, a second colour component, and a third colour component. Specifically, in this disclosure, if the first intra prediction is performed, and the first colour component is the luma component, i.e., the colour component to-be-predicted is the luma component, the coding block to-be-predicted may be referred to as a luma block. Or, if the second intra prediction is performed, and the second colour component is the chroma component, i.e., the colour component to-be-predicted is the chroma component, the coding block to-be-predicted may be referred to as a chroma block.

Further, in implementations of this disclosure, limitations may be imposed on the block size when applying the SAWP mode.

It may be understood that, since the prediction method proposed in this disclosure requires the use of two different intra prediction modes to generate two prediction values, which are then weighted to obtain a new prediction value, in order to reduce complexity while considering the trade-off between compression performance and complexity, the SAWP mode may not be used for blocks with certain sizes in implementations of the disclosure. Thus, in this disclosure, the encoder may first determine a size parameter of the current block, and then determine whether to use the SAWP mode for the current block based on the size parameter.

It should be noted that in the implementations of the disclosure, the size parameter of the current block may include both a height and a width of the block, so the encoder may limit the use of the SAWP mode based on the height and width of the current block, that is, limit the size of the block for which the SAWP mode can be used.

For example, in this disclosure, if the width is greater than a first threshold and the height is greater than a second threshold, then it is determined to use the SAWP mode for the current block. As can be seen, one possible limitation is to use the SAWP mode only when the block width is greater than (or greater than or equal to) the first threshold and the block height is greater than (or greater than or equal to) the second threshold. The values of the first and second thresholds may be 8, 16, 32, etc., and the first threshold may be equal to the second threshold.

For example, in this disclosure, if the width is less than a third threshold and the height is greater than a fourth threshold, then it is determined to use the SAWP mode for the current block. As can be seen, one possible limitation is to use the SAWP mode only when the block width is less than (or less than or equal to) the third threshold and the block height is greater than (or greater than or equal to) the fourth threshold. The values of the third and fourth thresholds may be 8, 16, 32, etc., and the third threshold may be equal to the fourth threshold.

Furthermore, in the implementations of this disclosure, limitations on the block size for which the SAWP mode may be used may also be achieved through sample parameter restrictions.

For example, in this disclosure, the encoder may first determine a sample parameter of the current block, and then determine whether the SAWP mode may be used for the current block based on the sample parameter and a fifth threshold. As can be seen, one possible limitation is to use the SAWP mode only when the number of samples in the block is greater than (or greater than or equal to) the fifth threshold. The value of the fifth threshold may be 8, 16, 32, etc.

In other words, in this disclosure, the SAWP mode may be used for the current block only when the size parameter of the block meets the size requirement.

It should be noted that in the implementations of this disclosure, in addition to the SAWP mode proposed in this disclosure, the encoder may use other prediction modes such as the DC mode, the Planar mode, or any of the angular modes when predicting the current block.

It may be understood that in the implementations of this disclosure, before intra prediction of the current block, the encoder may first determine the prediction mode parameter, and then use the prediction mode parameter to determine which specific encoding mode is used for the current block.

Furthermore, in the implementations of this disclosure, when determining the prediction mode parameter of the current block, the encoder may first use multiple different prediction modes to encode the current block separately, and then calculate the rate-distortion costs corresponding to each of the multiple prediction modes. Finally, the encoder may select the minimum rate-distortion cost from the calculated multiple rate-distortion costs and determine a prediction mode corresponding to the minimum rate-distortion cost as the prediction mode parameter of the current block.

That is to say, for the current block, the encoder may use multiple prediction modes separately to encode the colour component to-be-predicted.

Moreover, in the implementations of this disclosure, after the encoder uses multiple prediction modes to encode the current block separately, the encoder may obtain the rate-distortion cost corresponding to each prediction mode. Then, the encoder may select the minimum rate-distortion cost from the obtained multiple rate-distortion costs and determine the prediction mode corresponding to the minimum rate-distortion cost as the prediction mode parameter of the current block. Thus, the determined prediction mode may be used to encode the current block, and in this prediction mode, the prediction residual may be reduced, which may improve the coding efficiency.

Furthermore, in the implementations of this disclosure, at the encoding side, when the encoder attempts to obtain a certain prediction value, the encoder will also attempt to obtain a cost of encoding using the SAWP mode. When attempting to obtain the cost of encoding using the SAWP mode, the encoder will attempt to obtain the costs in all or part of possible cases and then select the minimum cost as the cost of encoding using the SAWP mode.

It should be noted that in the implementations of this disclosure, the above-described all possible cases include a combination of three variables, which are: the first intra prediction mode for the current block is all possible prediction modes for the first prediction mode for the current block, all possible prediction modes for the second intra prediction mode for the current block is all possible prediction modes, and all possible modes for the weight derivation mode is all possible modes. Assuming that there are 66 available prediction modes, the first prediction mode has 66 possible possibilities, and since the second prediction mode is different from the first prediction mode, the second prediction mode has 65 possible possibilities. Assuming that there are 56 possible weight derivation modes (taken AWP as an example), this disclosure may use any two different intra prediction modes and any one weight derivation mode, and thus there are 66×65×56 possibilities. If the PCM prediction mode is not used, there would be 65×64×56 possibilities. In this disclosure, the intra prediction modes that may be selected and the number of the weight derivation modes that may be used may be limited, so that the number of possible cases will be correspondingly reduced.

Furthermore, in the implementations of this disclosure, the encoder may perform RDO on all possible cases of the SAWP mode to determine a combination with the minimum cost, where each combination includes the first intra prediction mode, the second intra prediction mode, and the weight derivation mode.

Optionally, to reduce the time consumption of RDO, a preliminary selection may be made on all possible cases of the SAWP mode mentioned above, for example, by using SAD, SATD, etc. as approximate cost, to determine a set number of candidate combinations of the first intra prediction mode, the second intra prediction mode, and the weight derivation mode. Then, RDO may be used for fine selection to determine the combination of the first intra prediction mode, the second intra prediction mode, and the weight derivation mode with the minimum cost. This allows for reducing the number of attempts by using some fast algorithms during preliminary selection. For example, if one angular intra prediction mode results in a high cost, several neighboring intra prediction modes of this angular intra prediction mode will not be attempted.

It can be understood that, in the above preliminary selection and fine selection in the present disclosure, the cost may include the cost of an overhead of encoding the first intra prediction mode, the second intra prediction mode, and the weight derivation mode in the bitstream. It is also possible to use an estimated cost of the overhead of the first intra prediction mode, the second intra prediction mode, and the weight derivation mode in the bitstream during the preliminary selection. For example, the number of bits of the first or second intra prediction mode is estimated according to whether the first or second intra prediction mode is an MPM, or the number of bits of the first or second intra prediction mode is estimated according to the ranking of the intra prediction modes. In RDO, the cost may be obtained through more accurate trial coding. In this process, the method of constructing the mode list or sorting the intra prediction modes in the present disclosure is needed.

It can be understood that in this disclosure, during both preliminary selection and fine selection, the first prediction value will be determined according to the first intra prediction mode, the second prediction value will be determined according to the second intra prediction mode, the weight will be derived according to the weight derivation mode, and the prediction value in this disclosure will be determined according to the first intra prediction value, the second intra prediction value, and the weight. The SAD and SATD are determined by using the current block and the prediction value corresponding to the current block during preliminary selection of the SAD and SATD.

Further, in the implementations of the present disclosure, the encoder may first analyse the textures of the current block, for example, by using gradients. The analysed data is used to help with preliminary selection. For example, among the textures of the current block, more prediction modes with directions similar to a direction that has a stronger texture will be selected in the above preliminary selection for trial. For example, among the textures of the current block, less or no prediction modes with directions similar to a direction that has a weaker texture will be selected for the preliminary selection.

It should be noted that in this disclosure, the cost for encoding using the SAWP mode includes a cost of codewords occupied by the first intra prediction mode, the second intra prediction mode, and the weight derivation mode in the bitstream, a cost of various flags and quantization coefficients that need to be transmitted in the bitstream generated from transform, quantization, entropy encoding, etc. for the prediction residuals, a distortion cost of the reconstruction block, and the like.

After determining the cost of encoding using the SAWP mode, if the cost of encoding using the SAWP mode is lower than that of other prediction modes, which may include other prediction modes or inter prediction modes, the encoder will select the SAWP mode as the prediction mode for the current block. Otherwise, the encoder will select some other prediction mode.

In further implementations of this disclosure, the encoder will attempt different block partition schemes to determine the encoding costs. If the SAWP mode is selected for a particular prediction value, a flag required by the SAWP mode, as well as the information for the first intra prediction mode, the second intra prediction mode, and the weight derivation mode, may be signalled into the bitstream according to the syntax, and the prediction value may be predicted and encoded using the SAWP mode.

In this disclosure, after the encoder determines the intra prediction mode parameter for the current block, if the intra prediction mode parameter indicates that the SAWP mode is used to determine the intra prediction value of the current block, the encoder may further determine the weight derivation mode for the current block.

It should be noted that in this disclosure, the weight derivation mode is used to determine the weight(s) used for the current block. Specifically, the weight derivation mode may be a mode used to derive the weight. For a block of a given length and width, each weight derivation mode may be used to derive a weight matrix. Different weight derivation modes may be used to derive different weight matrices for blocks of the same size.

For example, in this disclosure, there are 56 weight derivation modes for AWP in AVS3 and 64 weight derivation modes for GPM in VVC.

At block 1302, at least one of the first intra prediction mode or the second intra prediction mode for the current block is determined based on the weight derivation mode, and the weight is determined according to the weight derivation mode.

In the present implementations of this disclosure, if the intra prediction mode parameter indicates that the SAWP mode is used to determine the intra prediction value of the current block, after the encoder determines the weight derivation mode for the current block, the encoder may first determine at least one of the first intra prediction mode or the second intra prediction mode for the current block based on the weight derivation mode, and determine the weight according to the weight derivation mode.

It should be noted that in implementations of the disclosure, each of the first intra prediction mode and the second intra prediction mode may be any intra prediction mode commonly used at present, including but not limited to DC, Planar, Bilinear, angular prediction mode, etc.

Optionally, in the disclosure, in a broader understanding, the intra prediction mode further includes some techniques to improve the prediction, such as fractional sample interpolation which improves reference samples, filtering of prediction samples, etc., such as MIPF, IPF.

Accordingly, in this disclosure, intra prediction models like DC, Planar, Bilinear, and angular prediction modes may be referred to as basic intra prediction modes, and techniques like MIPF and IPF that improve predictions may be referred to as improved intra prediction modes. The basic intra prediction modes may be used to generate prediction values independently without relying on other intra prediction modes, that is, once reference samples and the basic intra prediction mode have been determined, prediction values may be calculated. In comparison, the improved intra prediction modes cannot be used to independently generate prediction values, relying on basic intra prediction modes to determine prediction values instead. For example, in a certain angular intra prediction mode, the prediction value may be generated according to the reference samples, while in MIPF, based on this angular intra prediction mode, different filters may be used for samples at different positions to generate or determine the prediction value.

Exemplarily, in this disclosure, both the first intra prediction mode and the second intra prediction mode may be basic intra prediction modes, that is, two different basic intra prediction modes are used in this implementation. In this case, the improved intra prediction mode may be combined with the first intra prediction mode and the second intra prediction mode respectively to generate a first prediction value and a second prediction value. In addition, after a "new prediction value" is generated in this implementation of the disclosure, the new prediction value may be further improved by the improved intra prediction mode to obtain an updated prediction value.

Exemplarily, in this disclosure, the first intra prediction mode and the second intra prediction mode may also be a combination of a basic intra prediction mode and an improved intra prediction mode. That is to say, a combination of two different intra prediction modes are used in this implementation of the disclosure. For example, the same angular prediction mode is used for both the first intra prediction mode and the second intra prediction mode, but the improved intra prediction mode such as IPF is not used for the first intra prediction mode and is used for the second intra prediction mode. Alternatively, the same angular prediction mode is used for both the first intra prediction mode and the second intra prediction mode, but a certain option of the improved intra prediction method is used for the first intra prediction mode while another option of the improved intra prediction method is used for the second intra prediction mode. After the "new prediction value" is obtained, the new prediction value may be further improved using the improved intra prediction mode to obtain an updated prediction value.

Therefore, in the prediction method proposed in the implementations of the disclosure, based on the first intra prediction mode and the second intra prediction mode, two different prediction values may be determined, a weight may be determined, and the two prediction values may be combined based on the weight to obtain the new prediction value.

In implementations of the disclosure, each sample in the current block corresponds to a weight, and these weights form a weight map or weight matrix.

Furthermore, in implementations of the disclosure, not all points in every possible weight matrix have equal weight values. In other words, at least one possible weight matrix contains at least two different weight values.

Optionally, in the disclosure, all possible weight matrices contain at least two different weight values.

Optionally, in the disclosure, a part of weight matrices contain at least two different weight values. For example, if the minimum weight value is 0 and the maximum weight value is 8, there may be a matrix where some points are equal to 0 while some points are equal to 8. Correspondingly, some matrices only contain one single weight value. For example, in the disclosure, all points in a certain weight matrix are equal to 4.

Optionally, in this disclosure, there are only two weight values in a weight matrix, where one weight value represents that the prediction value of the corresponding point comes entirely from the value of the corresponding point in the first prediction value, and another weight value represents that the prediction value of the corresponding point comes entirely from the value of the corresponding point in the second prediction value. For example, in this disclosure, there are only two weight values in a weight matrix, which are 0 and 1.

Optionally, in this disclosure, there may be multiple weight values in a weight matrix, where the maximum value or the minimum value (such as 0) respectively represent that the prediction value of the corresponding point comes entirely from the value of the corresponding point in either the first prediction value or the second prediction value. The non-maximum and non-minimum weight value represent that the prediction value of the corresponding point is a weighted average of values of the corresponding points in the first prediction value and the second prediction value. The area formed by these maximum or minimum weight values may be called blending area.

It should be noted that in this disclosure, for a case where the weight matrix has only two weight values, positions where the weight values change will form a straight line. For a case where the weight matrix has multiple weight values, positions where the weight values are the same in the blending area form a straight line (segment). The straight line may be completely horizontal or vertical, or may not be completely horizontal or vertical.

Optionally, in this disclosure, for the case where the weight matrix has only two weight values, positions where the weight values change will form a curve line (segment). For the case where the weight matrix has multiple weight values, positions where the weight values are the same in the blending area form a curve line (segment).

Furthermore, in implementations of the disclosure, the encoder may determine the weight(s) using a method similar to GPM or AWP. Specifically, in the same coding standard or codec, if GPM or AWP is used, then such method may also be used to determine the weight, so that some common logics may be reused. For instance, AWP is used in inter prediction in AVS3, so it is possible to use AWP for determining the weight in AVS3. Additionally, other methods different from GPM or AWP could also be used in the same coding standard or codec, for example, using different numbers of modes, different algorithms for blending areas, different parameters, etc. Inter prediction utilizes temporal correlation, where a reconstructed block in the reference picture is used as the reference block. Intra prediction utilizes spatial correlation, where reconstructed samples around the current block are used as reference samples. The closer the distance in space, the stronger the correlation, while the farther the distance, the weaker the correlation. Therefore, if a certain weight makes that sample positions used for obtaining the prediction value are far from the reference sample(s), then such weight may not be able to produce more suitable prediction values than existing technology, and thus such weight may be abandoned. Rather, the weight may be used in inter prediction.

It should be noted that two intra prediction modes are required in the implementations of the disclosure whereas generally only one intra prediction mode is required in other common intra prediction methods. Therefore, the manner for encoding the intra prediction modes used in the implementations may differ from those in other common intra prediction methods. Correspondingly, the MPM construction method used in the implementations may also differ from those in other common intra prediction methods.

Furthermore, in implementations of the disclosure, the proposed prediction method requires transmission of information of the weight derivation mode and information of the two intra prediction modes in the bitstream. Taking AWP in AVS3 as an example, the weight derivation mode has 56 modes, binarization of which requires 5 to 6 bits. Taking AVS as an example, the intra prediction mode has 66 modes using two MPMs. If the intra prediction mode is an MPM, then binarization requires 1 bits, otherwise 7 bits are required. This means that in AVS3, the above information requires an overhead of at most 6+7+7=20 bits.

To reduce aforementioned binarization overhead and improve coding performance, in implementations of the disclosure, the encoder may use correlation between the intra prediction modes and weights for the current block to determine the above information. Specifically, there may be some correlation between the intra prediction modes and weights used for the current block. Using such correlation, the encoder may utilize weight information in encoding the intra prediction modes. Further, the encoder may utilize information of the weight derivation mode in encoding the intra prediction modes.

Further, in implementations of the disclosure, in the case that the weight matrix has two weight values, the positions where the weight values change form a straight light, or in the case that the weight matrix has multiple weight values, the positions where the weight values are the same in the blending area form a straight line. The boundary line itself also has an angle. This straight line may be called the boundary line. The angle horizontal to the right may be set to 0 degree, and angles increase counterclockwise. In this case, the boundary line may have different angles, such as 0 degrees for horizontal, 90 degrees for vertical, inclined angles like 45 degrees, 135 degrees, and others. If a certain weight is selected for a prediction value, the corresponding texture is likely to show different characteristics on two sides of the boundary line, such as textures with two different angles on two sides of the boundary line, or an angular texture on one side of the boundary line, while a flat texture on the other side of the boundary line. Since the boundary line itself also has an angle, it may be assumed that the boundary line is obtained through intra angular prediction with a point, which may be close to some textures of the current block, so there is correlation between this straight line and the two intra prediction modes for the current block.

Specifically, in this disclosure, assuming that the boundary line is obtained through angular intra prediction with a point, at least one angular intra prediction mode may be found, which may be used to approximately create the boundary line. For example, a horizontal boundary line matches a horizontal intra prediction mode, such as mode 24 in AVS3. A vertical boundary line matches a vertical intra prediction mode, such as mode 12 in AVS3. A 45-degree boundary line may match a 45-degree intra prediction mode from bottom-left to upper-right, such as mode 30 in AVS3, or a 225-degree intra prediction mode from upper-right to bottom-left, such as mode 6 in AVS3. If the weight matrix has only one weight value, the weight matrix may match a mode without an obvious angle, such as DC, Planar, Bilinear, etc. Thus, the weight derivation mode may match some intra prediction modes, and the weight derivation mode may be used to assist in encoding of the intra prediction modes.

It should be noted that in this disclosure, the weight derivation mode may also be the index of the weight, for example, the 56 modes of AWP may be considered as 56 weight derivation modes.

By way of example, in this disclosure, a mapping table may be constructed to further represent the mapping relationship between weight derivation modes and angular intra prediction modes. Specifically, the boundary lines for multiple modes of AWP and GPM are at the same angle, for example, for AWP of AVS3, the boundary lines for every 8 modes are at the same angle. There are seven angles of the boundary lines for 56 AWP modes. The index of the boundary line angle may be obtained by taking the mode number of the weight derivation mode modulo 8 (%8). For example, Table 7 is a mapping table taking angular modes in AVS3 as an example. The indices 0 and 1 of boundary line angle correspond to two intra angular prediction modes respectively: one from upper right to bottom left and one from upper left to bottom right. In a specific implementation, another approximately corresponding intra angular prediction mode may be found for another boundary line angle index, or all indices of boundary line angle correspond to one intra angular prediction mode.

TABLE 7

| Angle index of the boundary line | 0 | 1 | 2 | 3 | 4 | 5 | 6 | 7 |
|---|---|---|---|---|---|---|---|---|
| Corresponding intra prediction mode | 6 30 | 27 3 | 24 | 21 | 18 | 15 | 12 | 9 |

Figure 15:
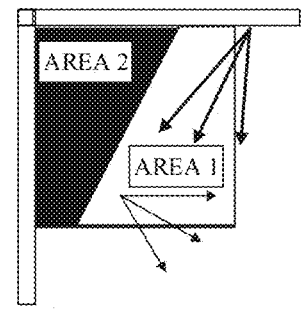
FIG. 15 is a schematic diagram illustrating intra prediction.

Furthermore, in this disclosure, it is observed that generally reference samples on the left and top sides of current block are used for intra prediction, and closer spatial distance between samples indicates stronger correlation while farther spatial distance indicates weaker correlation. Therefore, if only a part of samples in the current block is predicted by using one prediction mode, then positions of the part of samples will affect probability of intra prediction modes used for the part. That is, the position and angle of the boundary line mentioned above will affect selection of the two intra prediction modes for two sides of the boundary line. FIG. 15 is a schematic diagram illustrating intra prediction. As illustrated in FIG. 15, area 1 of the current block indicates that the prediction values are obtained from the first intra prediction mode, and area 2 of the current block indicates that the prediction values are obtained from the second intra prediction mode. The blending area between area 1 and area 2 indicates that the prediction values are obtained by weighting of the prediction values in the two intra prediction modes. For area 1, since the reference samples on the upper right are closest to the area, the intra prediction modes (such as indicated by the thick arrow) in a fan-shaped angle area from upper right to the bottom left can make better use of the above spatial correlation, and the probability of using these modes is relatively high. However, since the reference samples on the upper left are away from area 1, the intra prediction modes (such as indicated by the thin arrow) in a fan-shaped angle area from the upper left to the bottom right cannot make good use of the above spatial correlation, and the probability of using these modes is low.

Further, in implementations of the disclosure, when determining at least one of the first intra prediction mode or the second intra prediction mode for the current block according to the weight derivation mode, the encoder may first determine a mode list (MPM) by using the weight derivation mode. Then, based on the mode list, the encoder may further determine at least one of the first intra prediction mode or the second intra prediction mode.

Specifically, in implementations of the disclosure, when determining the first intra prediction mode and the second intra prediction mode using the correlation with the weight, the mode list may be constructed by using the weight derivation mode, or the MPM list may be constructed using information about the weight derivation mode. The weight derivation mode may correspond to at least one intra prediction mode, so the encoder may add the intra prediction mode corresponding to the weight derivation mode determined for current block into the mode list or add several intra prediction modes related to the intra prediction mode corresponding to the weight derivation mode into the mode list.

Further, in implementations of the disclosure, when determining the mode list by using the weight derivation mode, the encoder may first determine an intra prediction mode corresponding to an adjacent block of the current block, and determine the intra prediction mode corresponding to the adjacent block as a mode to-be-added. After determining that the mode to-be-added meets a preset adding condition, the encoder may add the mode to-be-added to the mode list, that is, add the intra prediction mode corresponding to the adjacent block of the current block to the mode list. Next, if the mode list does not reach a preset list-length, the encoder may determine a related intra prediction mode corresponding to the weight derivation mode, and determine the related intra prediction mode corresponding to the weight derivation mode as the mode to-be-added. When determining that the mode to-be-added meets the preset adding condition, the encoder may add the mode to-be-added to the mode list, that is, add the related intra prediction mode corresponding to the weight derivation mode to the mode list.

It should be noted that in implementations of the disclosure, when adding the intra prediction mode corresponding to the adjacent block to the mode list, the encoder may first determine order parameters each corresponding to an adjacent block, and add the intra prediction modes corresponding to the adjacent blocks to the mode list sequentially according to the order parameters. The encoder may determine the corresponding order parameter according to the spatial distance between the adjacent block and the current block. For example, the closer the spatial distance between the adjacent block and the current block, the stronger the correlation between the adjacent block and the current block, and the earlier the addition process, that is, the smaller the order parameter. The farther the spatial distance between the adjacent block and the current block, the weaker the correlation, and the later the addition process, that is, the larger the order parameter.

Further, in implementations of the disclosure, for determining the related intra prediction mode corresponding to the weight derivation mode, the encoder may first determine an intra prediction mode corresponding to the weight derivation mode, and based on the intra prediction mode corresponding to the weight derivation mode, the encoder may determine the related intra prediction mode according to a first index interval.

For example, in implementations of this disclosure, when determining several intra prediction modes related to the intra prediction mode corresponding to the weight derivation mode, the encoder may select, according to the first index interval, a mode with an index number that differs by a certain value from the index number of the intra prediction mode corresponding to the weight derivation mode, for example, differs by 1 or 2. For example, assuming that an index number for the intra prediction mode corresponding to the weight derivation mode is 10 and the first index interval is 2, then two intra prediction modes with index numbers 8 and 12 may be determined as two intra prediction modes related to the intra prediction mode corresponding to the weight derivation mode.

It should be noted that in implementations of this disclosure, after the encoder adds the intra prediction mode corresponding to the adjacent block of the current block to the mode list, or adds the related intra prediction mode corresponding to the weight derivation mode to the mode list, if the mode list does not reach the preset list-length, that is, the mode list is not full, then the encoder may continue to determine a preset prediction mode as the mode to-be-added. When the mode to-be-added meets the preset adding condition, the encoder may add the mode to-be-added to the mode list, that is, add the preset prediction mode to the mode list.

It should be noted that the preset prediction mode in this disclosure includes one or more of different modes like a DC mode, a Bilinear mode, and a Planar mode.

Further, in implementations of this disclosure, after the encoder adds the intra prediction mode corresponding to the adjacent block of the current block, the related intra prediction mode corresponding to the weight derivation mode, and the preset prediction mode to the mode list, if the mode list does not reach the preset list-length, that is, the mode list is not full, then the encoder may determine an associated intra prediction mode using the prediction modes in the mode list, and determine the associated intra prediction mode as the mode to-be-added. When the mode to-be-added meets the preset adding condition, the encoder may add the mode to-be-added to the mode list, that is, add to the mode list the associated intra prediction mode corresponding to the mode list.

In other words, in this disclosure, after the the intra prediction mode corresponding to the adjacent block of the current block, the related intra prediction mode corresponding to the weight derivation mode, and the preset prediction mode are added to the mode list sequentially, if the mode list is not full, then the encoder may determine the associated intra prediction mode based on the existing prediction modes in the mode list, and then add the associated intra prediction mode to the mode list.

For example, in this disclosure, based on any one prediction mode in the mode list, the encoder may determine the associated intra prediction mode related to the one prediction mode according to a second index interval. The encoder may select, according to the second index interval, a mode with an index number that differs by a certain value from the index number of the one prediction mode, for example, differs by 1 or 2.

It should be noted that in implementations of this disclosure, regardless of whether the intra prediction mode corresponding to the adjacent block of the current block, the related intra prediction mode corresponding to the weight derivation mode, the preset prediction mode, or the associated intra prediction mode is taken as the mode to-be-added, the encoder needs to determine whether the mode to-beadded meets the preset addition condition. Specifically, if the mode to-be-added exists and is different from all prediction modes in the mode list, it is determined that the mode to-be-added meets the preset addition condition, and the mode to-be-added will be added to the mode list.

Correspondingly, if the mode to-be-added does not exists or is the same as (identical to) a prediction mode in the mode list, it is determined that the mode to-be-added does not meet the preset addition condition, and the mode to-be-added will not be added to the mode list. Instead, the mode to-be-added will be directly discarded.

It can be understood that in this disclosure, since two intra prediction modes are required for intra prediction of the current block, it is possible to refer to intra prediction modes for more positions when constructing the MPM list, or refer to more intra prediction modes for the adjacent blocks. Correspondingly, in this disclosure, the length of the mode list used for the current block may be different from a length of other mode list of intra prediction modes. Because the codeword for binarization of the MPM is shorter than the codeword for binarization of other modes, increasing the probability that the two intra prediction modes are MPMs can improve the coding efficiency.

Exemplarily, in the implementations of this disclosure, assuming that the length of the mode list used for the current block is 4, the encoder may determine the mode list by using the weight derivation mode as follows.

The intra prediction mode corresponding to the adjacent block is added to the mode list.

In implementations of the disclosure, the encoder may first determine intra prediction modes corresponding to adjacent blocks of the current block, and add the intra prediction modes corresponding to the adjacent blocks sequentially to the mode list.

Figure 16:
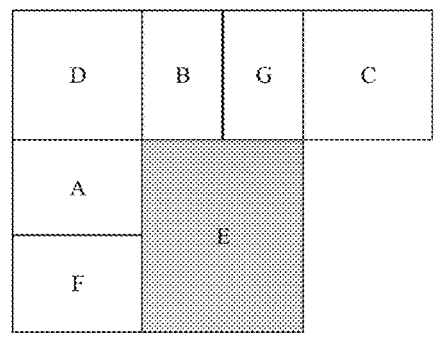
FIG. 16 is a schematic diagram of adjacent blocks.

FIG. 16 is a schematic diagram of adjacent blocks. As illustrated in FIG. 16, E represents a current block. The encoder may add intra prediction modes used for adjacent blocks F, G, C, A, B and D into the mode list sequentially, until the mode list is full. If any position among F, G, C, A, B, and D is not available or no intra prediction mode has been used for the position, the position will be skipped.

It should be understood that in this disclosure, if complexity is allowable, intra prediction modes for more rightward and downward blocks may also be utilized.

Determine whether the mode list is full. If the mode list is not full, the related intra prediction mode corresponding to the weight derivation mode is added to the mode list. Otherwise, the mode list is derived.

In the implementation of the disclosure, after the intra prediction mode corresponding to the adjacent block is added to the mode list, if the mode list is not full, that is, the length of the mode list is shorter than 4, the encoder may continue to add the intra prediction mode corresponding to the weight derivation mode to the mode list, until the mode list is full.

It should be noted that in this disclosure, the encoder may add only the intra prediction mode corresponding to the weight derivation mode to the mode list, or add both the intra prediction mode corresponding to the weight derivation mode and the related intra prediction mode corresponding thereto to the mode list.

Determine whether the mode list is full. If the mode list is not full, the preset prediction mode is added to the mode list. Otherwise, the mode list is derived.

In the implementation of the disclosure, after the related intra prediction mode corresponding to the weight derivation mode is added to the mode list, if the mode list is not full, that is, the length of the mode list is shorter than 4, the encoder may continue to add the preset prediction mode to the mode list, until the mode list is full.

The preset prediction mode may include one or more of different modes such as a DC mode, a Bilinear mode, a Planar mode, etc.

Determine whether the mode list is full. If the mode list is not full, the associated intra prediction mode corresponding to the mode list is added to the mode list. Otherwise, the mode list is derived.

In the implementation of the disclosure, after the preset prediction mode is added to the mode list, if the mode list is not full, that is, the length of the mode list is shorter than 4, the encoder may determine the associated intra prediction mode(s) corresponding to the mode list, and then add to the mode list sequentially the associated intra prediction modes corresponding to the mode list.

Specifically, if the mode list is not full, starting from the first intra prediction mode in the MPM list, an intra prediction mode with an index number that differs from the index number of the first intra prediction mode by 1, −1, 2, −2, 3 or −3 may be filled into the MPM list until the mode list is full. If any of the intra prediction modes with index numbers that differ from the index number of the intra prediction mode by 1, −1, 2, −2, 3 and −3 is illegal due to less than 0 or greater than a maximum value, the illegal intra prediction mode will be discarded.

It should be noted that in the implementations of the disclosure, during construction of the mode list, each intra prediction mode to-be-filled (the mode to-be-added) should be different from any existing intra prediction mode in the mode list. Otherwise, the mode to-be-added will be discarded.

That is, in the implementations of the disclosure, in order to ensure that the first intra prediction mode and the second intra prediction mode for current block are different, when constructing the mode list, the encoder should ensure that the intra prediction mode added to the mode list each time is not duplicated with any existing intra prediction mode in the mode list.

Further, in implementations of the disclosure, when determining the mode list by using the weight derivation mode, the encoder may first determine a list construction strategy corresponding to the weight derivation mode, and then determine the mode list according to the list construction strategy.

That is, in the disclosure, for different weights, that is, for different weight derivation modes, the encoder may construct the mode list by using different list construction strategies. For example, based on the list construction strategy, in a case that the boundary line of the weight is 0 degree or 90 degrees, that is, horizontal or vertical, the encoder may consider intra prediction modes corresponding to the weight for construction of the mode list. For other cases, the encoder may not consider the intra prediction modes corresponding to the weight.

Exemplarily, in this disclosure, assuming that the boundary line of the weight is 0 degree, such as modes 2, 10, etc. of AWP (counting from 0), the horizontal intra prediction mode 24 may be added to candidates of the mode list when constructing the mode list. Assuming that the boundary line of the weight is 90 degrees, such as modes 6, 14, etc. of AWP (counting from 0), the vertical intra prediction mode 12 may be added to the candidates of the mode list when constructing the mode list.

It is understood that in the present disclosure, it is also possible to add the horizontal intra prediction mode, or the horizontal intra prediction mode and similar intra prediction modes, to the candidates of the mode list when the boundary line of the weight is in a range around 0 degrees; and to add the vertical intra prediction mode, or the vertical intra prediction mode and similar intra prediction modes, to the candidates of the mode list when the boundary line of the weight is in a range around 90 degrees.

It can be understood that in the present disclosure, the two intra prediction modes used for intra prediction of the current block are not the same, i.e., the first intra prediction mode is not the same as the second intra prediction mode, so that the second intra prediction mode may exclude the possibility of the first intra prediction mode during decoding. In other words, the second intra prediction mode may be decoded using the information of the first intra prediction mode.

In implementations of the present disclosure, further, the encoder may set an alternate intra prediction mode during constructing the mode list. The alternate intra prediction mode is not the same as any intra prediction mode in the mode list.

Specifically, in the present disclosure, in order to ensure that the first intra prediction mode and the second intra prediction mode used for the current block are not the same, the second intra prediction mode may be determined depending on the first intra prediction mode. When determining at least one of the first intra prediction mode or the second intra prediction mode based on the mode list, the encoder may first determine one of the prediction modes in the mode list as the first intra prediction mode, and then determine the second intra prediction mode based on the first intra prediction mode and the mode list.

Further, in implementations of the present disclosure, after determining the prediction mode in the mode list as the first intra prediction mode, the encoder may remove the prediction mode from the mode list and then add the alternate intra prediction mode to the mode list, so that an updated mode list may be obtained. A prediction mode may then be selected from the updated mode list and determined as the second intra prediction mode. Any selection method may be used.

In other words, in implementations of the present disclosure, if an MPM is selected for the first intra prediction mode, in order to ensure that the first intra prediction mode and the second intra prediction mode used for the current block are not the same, then the number of MPMs available for the second intra prediction mode is reduced by one. In order not to change the length of the mode list available for the first intra prediction mode and the second intra prediction mode, the encoder may add another MPM to the mode list after determining the first intra prediction mode. That is, the preset alternate intra prediction mode is added to the mode list. Therefore, the second intra prediction mode may be determined using the same number of MPMs as the first intra prediction mode.

Exemplarily, in this disclosure, assuming that the first intra prediction mode and the second intra prediction mode have N optional MPMs, when constructing the mode list, N MPMs and 1 alternate MPM may be constructed first. For the first intra prediction mode, the optional MPMs are the above-mentioned N MPMs. If one of the MPMs is selected for the first intra prediction mode, then for the second intra prediction mode, the MPM selected for the first intra prediction mode is removed, and then the alternate MPM is added to the mode list. In this way, the second intra prediction mode still has N optional MPMs.

In implementations of the present disclosure, furthermore, the encoder may set a length parameter of the mode list to be (N+1) during constructing the mode list, where N is a positive integer.

Specifically, in the present disclosure, the second intra prediction mode may be determined depending on the first intra prediction mode in order to ensure that the first intra prediction mode and the second intra prediction mode used for the current block are not the same. When determining at least one of the first intra prediction mode or the second intra prediction mode based on the mode list, the encoder may determine one of the first N prediction modes in the mode list as the first intra prediction mode if the first intra prediction mode is determined by using the mode list. Then the second intra prediction mode is determined based on the first intra prediction mode and the mode list.

Further, in implementations of the present disclosure, if the first intra prediction mode is determined by using the mode list, then the encoder determines the second intra prediction mode by using remaining N prediction modes in the mode list, other than the first intra prediction mode, after determining one of the first N prediction modes of the mode list as the first intra prediction mode.

It is noted that in implementations of the present disclosure, when determining at least one of the first intra prediction mode or the second intra prediction mode based on the mode list, if the mode list is not used to determine the first intra prediction mode, then the encoder may directly determine one of the first N prediction modes in the mode list as the second intra prediction mode.

That is, in the implementations of the present disclosure, assuming that the number of optional MPMs for the intra prediction mode are N. In order to ensure that the first intra prediction mode and the second intra prediction mode used for the current block are not the same, (N+1) MPMs may be constructed when constructing the mode list. For the first intra prediction mode, optional MPMs are the first N MPMs in the mode list. If no MPM is selected for the first intra prediction mode, then the MPMs available for the second intra prediction mode are the first N MPMs in the mode list. If one MPM is selected for the first intra prediction mode, then the MPMs available for the second intra prediction mode are the N MPMs in the mode list other than the first intra prediction mode.

Exemplarily, in this disclosure, assuming that N is 4, then the encoder may construct a mode list including 5 MPMs. MPM[x] represents the (x+1)-th MPM, i.e., MPM[0] represents the first MPM, since the count of the array starts from 0. The first intra prediction mode is mode0 and the second intra prediction mode is mode1. Assuming that both the first intra prediction mode and the second intra prediction mode are MPMs, and the index number of the first intra prediction mode in the optional MPMs is idx0 and the index number of the second intra prediction mode in the optional MPMs is idx1, then mode0=MPM[idx0]

mode1=MPM[idx1<idx0?idx1:idx1+1]

That is, if idx1<idx0, then mode1=MPM[idx1].

Otherwise, mode1=MPM[idx1+1].

It can be seen that the values of idx0 and idx1 both range from 0 to 3, and the value of mode1 is not only related to idx1, but also related to idx0.

Optionally, in implementations of the present disclosure, if it is only ensured that the first intra prediction mode and the second intra prediction mode used for the current block are not the same, without limiting the number of MPMs that can be selected for the first intra prediction mode and the second intra prediction mode, then the encoder may also not set the alternate intra prediction mode, or, alternatively, may not increase the length of the mode list. In this case, the encoder needs to change the method for encoding the second intra prediction mode. In other words, if one MPM in the mode list is selected for the first intra prediction mode, one less MPM can be selected for the second intra prediction mode. Since there are fewer MPMs to select for the second intra prediction mode, the method for encoding the second intra prediction mode needs to be changed.

Exemplarily, in this disclosure, the number N of MPMs is equal to 4, and the first bit indicates whether a mode is an MPM. For example, "1" means the mode is an MPM and "0" means the mode is not an MPM. If the first intra prediction mode is an MPM, since there are 4 MPMs, 2 bits are used to indicate which MPM first intra prediction mode is, i.e., "00, 01, 10, 11" representing the first, second, third and fourth MPMs respectively. If both the first intra prediction mode and the second intra prediction mode are MPMs, then there are only 3 MPMs available for the second intra prediction mode. In this case, 1 to 2 bits may be used to indicate which MPM the second intra prediction mode is, such as "00, 01, 10" representing the remaining first, second and third MPMs respectively. As can be seen, the encoding method, or called binarization method, can be changed to save overhead since one possibility is excluded.

Exemplarily, in this disclosure, assuming that N is 4, then a mode list including 4 MPMs is constructed. MPM[x] represents the (x+1)-th MPM, i.e., MPM[0] represents the first MPM, since the count of the array starts from 0. The first intra prediction mode is mode0 and the second intra prediction mode is mode1. Assuming that both the first intra prediction mode and the second intra prediction mode are MPMs, and the index number of the first intra prediction mode in the optional MPMs is idx0 and the index number of the second intra prediction mode in the optional MPMs is idx1, then mode0=MPM[idx0]

mode1=MPM[idx1<idx0?idx1:idx1+1]

That is, if idx1<idx0, then mode1=MPM[idx1].
Otherwise, mode1=MPM[idx1+1].

As can be seen, the value of idx0 ranges from 0 to 3 and the value of idx1 ranges from 0 to 2. The value of mode1 is not only related to idx1 but also related to idx0. 2-bit binarization may be used for idx0, while 1 to 2-bit binarization may be used for idx1.

In implementations of the present disclosure, further, when determining at least one of the first intra prediction mode or the second intra prediction mode for the current block based on the weight derivation mode, the encoder may also sort the intra prediction mode(s) corresponding to the adjacent block(s) of the current block, the related intra prediction mode(s) corresponding to the weight derivation mode, and the preset prediction mode, so as to obtain a candidate list of prediction modes. The preset prediction modes include one or more of various prediction modes such as DC mode, Bilinear mode, Planar mode, etc. Then, the encoder may determine at least one of the first intra prediction mode or the second intra prediction mode based on the candidate list of prediction modes.

Specifically, in implementations of the present disclosure, when determining the first intra prediction mode and/or the second intra prediction mode by using the correlation with the weights, it is also possible to give the intra prediction mode corresponding to the weight derivation mode or several intra prediction modes related thereto a codeword shorter than common intra prediction modes, or a codeword shorter than the longest possible codeword for the intra prediction modes, i.e., a non-longest codeword. This is because the intra prediction mode corresponding to the weight derivation mode or the several intra prediction modes related thereto are considered having a higher probability of being selected than the other modes.

That is, in the implementations of the present disclosure, the first intra prediction mode and/or the second intra prediction mode may also be determined without MPM. The encoder may generate the candidate list of prediction modes by sorting all the possible intra prediction modes for the first intra prediction mode and the second intra prediction mode, and then variable-length coding is used for binarization, with the top-ranked intra prediction modes in the candidate list of prediction modes assigned shorter codewords and the bottom-ranked intra prediction modes in the candidate list of prediction modes assigned longer codewords. The sorting process may consider the intra prediction modes for adjacent blocks of the current block, and may also consider the weight derivation mode for the current block.

Exemplarily, in implementations of the present disclosure, the encoder may determine at least one of the first intra prediction mode or the second intra prediction mode for the current block based on the weight derivation mode as follows.

The intra prediction mode corresponding to the adjacent block is added to the candidate list.

In implementations of the disclosure, the encoder may first determine intra prediction modes corresponding to adjacent blocks of the current block, and sort the intra prediction modes corresponding to adjacent blocks. After sorting, the intra prediction modes corresponding to the adjacent blocks are added sequentially to the candidate list.

E represents the current block. The encoder may add intra prediction modes used for adjacent blocks F, G, C, A, B and D into the candidate list in an order of F, G, C, A, B and D. If any position among F, G, C, A, B, and D is not available or no intra prediction mode has been used for the position, the position will be skipped.

It should be understood that in this disclosure, if complexity is allowable, intra prediction modes for more rightward and downward blocks may also be utilized.

The related intra prediction mode corresponding to the weight derivation mode is added to the candidate list.

In the implementation of the disclosure, after the intra prediction mode corresponding to the adjacent block is added to the candidate list, the encoder may continue to add the intra prediction mode corresponding to the weight derivation mode to the candidate list.

It should be noted that in this disclosure, the encoder may add only the intra prediction mode corresponding to the weight derivation mode to the candidate list, or add both the intra prediction mode corresponding to the weight derivation mode and the related intra prediction mode corresponding thereto to the candidate list.

The preset prediction mode is added to the candidate list.

In the implementation of the disclosure, after the related intra prediction mode corresponding to the weight derivation mode is added to the mode list, the encoder may continue to add the preset prediction mode to the candidate list.

The preset prediction mode may include one or more of different modes such as a DC mode, a Bilinear mode, a Planar mode, etc.

The associated intra prediction mode corresponding to the candidate list is added to the candidate list.

In the implementation of the disclosure, after the preset prediction mode is added to the candidate list, the encoder may determine the associated intra prediction mode(s) corresponding to the candidate list, and then add the associated intra prediction mode(s) to the candidate list sequentially.

Specifically, starting from the first intra prediction mode in the candidate list, intra prediction modes with index numbers that differ from the index number of the intra prediction mode by 1, −1, 2, −2, 3 and −3 may be filled into the candidate list. If any of the intra prediction modes with index numbers that differ from the index number of the intra prediction mode by 1, −1, 2, −2, 3 and −3 is illegal due to less than 0 or greater than a maximum value, the illegal intra prediction mode will be discarded.

An intra prediction mode(s) beyond the candidate list is added to the candidate list.

In implementations of the present disclosure, the encoder may also add intra prediction modes that have not been sorted, starting from index 0 of the prediction modes and continuing until the end, to the candidate list.

As can be seen, the probabilities of the intra prediction modes differ due to differences in the angular position of the boundary line of the weight, etc., and the probabilities of the first intra prediction mode and the second intra prediction mode differ. For example, in the example above, for the first intra prediction mode (corresponding to the white block), the upper-right to bottom-left angular mode will have a higher probability than the upper-left to bottom-right angular mode, while for the second intra prediction mode (corresponding to the black block), the upper-right to bottom-left angular mode will not have a higher probability than the upper-left to bottom-right angular mode. Therefore, regarding each weight derivation mode, it is possible to sort separately for the first intra prediction mode and the second intra prediction mode according to respective probability characteristics.

Further, in implementations of the present disclosure, when determining at least one of the first intra prediction mode or the second intra prediction mode for the current block based on the weight derivation mode, the encoder may also establish a reference set of first intra prediction modes corresponding to the weight derivation mode and a reference set of second intra prediction modes corresponding to the weight derivation mode. Then the first intra prediction mode may be determined based on the reference set of first intra prediction modes, and the second intra prediction mode may be determined based on the reference set of second intra prediction modes.

That is, in the implementations of the present disclosure, for the weight derivation mode for the current block, the encoder may sort all possible intra prediction modes of the first intra prediction mode corresponding to the weight derivation mode to generate the reference set of first intra prediction modes, and at the same time, may also sort all possible intra prediction modes of the second intra prediction mode corresponding to the weight derivation mode to generate the reference set of second intra prediction modes. In this way, the first intra prediction mode may be determined from the reference set of first intra prediction modes, and the second intra prediction mode may be determined from the reference set of second intra prediction modes.

Exemplarily, in this disclosure, the encoder may preset a mapping table to determine the mapping relationship between each weight derivation mode and the first and second intra prediction modes, as illustrated in Table 8. With Table 8, for a weight derivation mode, the ranking of all possible intra prediction modes for the corresponding first intra prediction mode and the ranking of all possible intra prediction modes for the corresponding second intra prediction mode can be determined.

TABLE 8

| Weight derivation mode | Intra prediction mode | Sort |
|---|---|---|
| 0 | 0 (first intra prediction mode) | ...... |
|   | 1 (second intra prediction mode) | ...... |
| 1 | 0 (first intra prediction mode) | ...... |
|   | 1 (second intra prediction mode) | ...... |
| 2 | 0 (first intra prediction mode) | ...... |
|   | 1 (second intra prediction mode) | ...... |
| ...... | ...... | ...... |

Further, in implementations of the present disclosure, in order to reduce the complexity, the encoder may narrow down the lookup table as in Table 8 above by clustering. For example, the weight derivation modes can be classified to determine the types corresponding to the weight derivation modes, and one type of weight derivation modes corresponds to the same ranking of all possible intra prediction modes for the first intra prediction mode, and corresponds to the same ranking of all possible intra prediction modes for the second intra prediction mode.

Further, in implementations of the present disclosure, in order to reduce the complexity, the encoder may narrow down the lookup table as in Table 8 above by clustering. For example, the intra prediction modes may be classified to determine the types corresponding to the intra prediction modes. For example, DC, Planar, Bilinear, and other non-angular modes are classified into one type, and the angular modes may be classified according to some range of degrees, such as every 45 degrees, i.e. ⅛ circle, for one type, or every 22.5 degrees, i.e. 1/16 circle, for one type. Specifically, the angular modes may also be divided into several unequal intervals.

Figure 17:
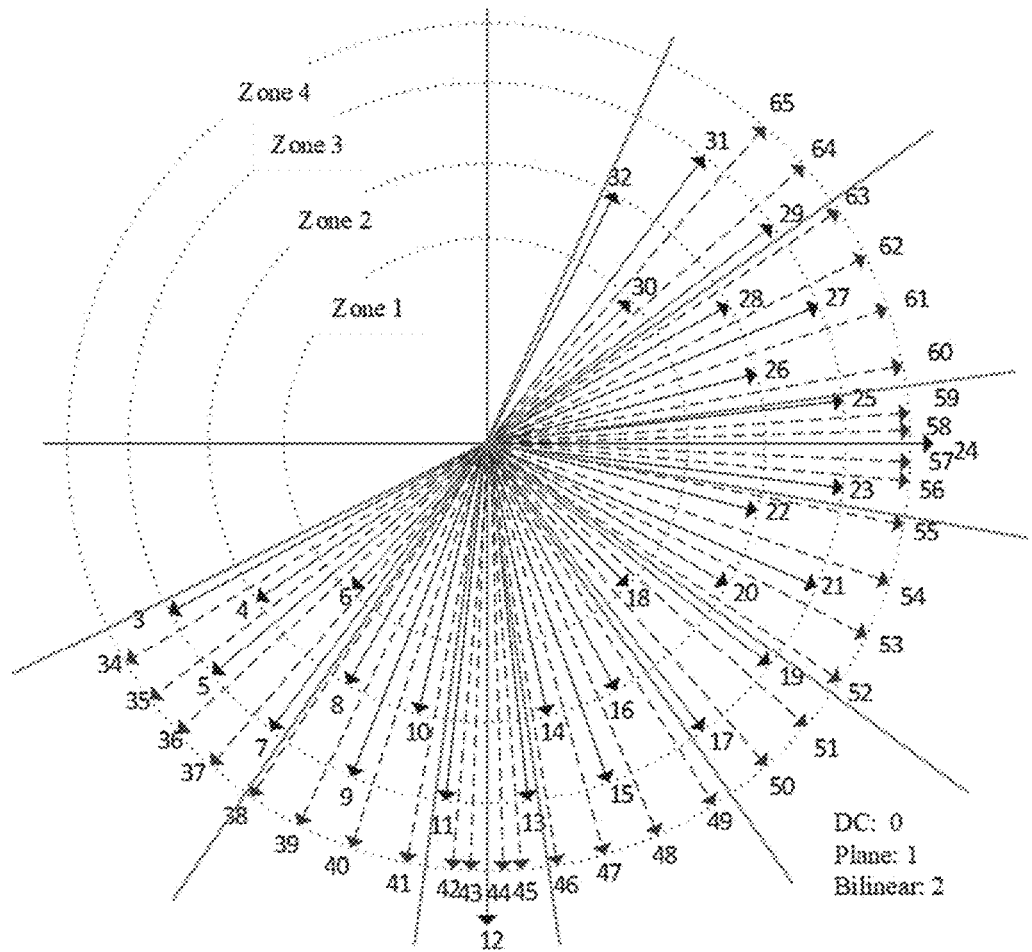
FIG. 17 is a schematic diagram illustrating clustering.

FIG. 17 is a schematic diagram illustrating clustering. As illustrated in FIG. 17, all angular modes may be divided into 9 regions. Within each region, the angular modes may be sorted in order of mode number, or sorted from center to periphery of the region.

It can be understood that in the present disclosure, the angles of the angular modes in AVS3 are not continuous. Instead, the preceding modes 3 to 32 cover a large range of degrees and are sparse, and the following modes 34 to 65 are denser. This feature can also be used to classify the modes before mode 33 and the modes after mode 33 into different classes.

In implementations of the present disclosure, further, since the prediction method proposed in the present disclosure requires the use of the two different intra prediction modes and the weight to determine the prediction value, in order to reduce the overhead, in the present disclosure, the encoder may reduce the number of bits by limiting the two intra prediction modes for the current block, and the encoder may also reduce the number of bits by limiting the weight derivation mode for the current block.

Exemplarily, in this disclosure, since the first 33 prediction modes in AVS3 already cover almost the entire angle range, using only the first 33 prediction modes in AVS3 can ensure better performance, and only needs an adjustment to not use EIPM during encoding. Further, the encoder may further compress and limit the number of possible intra prediction modes for the current block, to allow only 5 bits used for encoding, thus further reducing the overhead and achieving better performance.

Optionally, in the present disclosure, the encoder may reduce the overhead of encoding the weight derivation mode by reducing the number of weight derivation modes that can be used for the current block. For example, in AVS3, if 56 weight derivation modes are used, up to 6 bits are required to encode the weight derivation mode, while if only 32 weight derivation modes are used, up to 5 bits are required to encode the weight derivation mode. The encoder may further compress and limit the number of weight derivation modes that can be used for the current block, such as using only 16 weight derivation modes, ultimately achieving only 4 bits for encoding, thus further reducing the overhead and achieving better performance.

It should be noted that in the implementation of the present disclosure, the encoder, when limiting the number of weight derivation modes, may either directly limit the number of weight derivation modes for all prediction values, or may use different limiting methods for different sizes of current blocks with reference to a size parameter of the current block.

Exemplarily, in this disclosure, for a block with a large size parameter, such as a 64×64 or 32×32 block, the encoder may use all weight derivation modes for determining the weight derivation mode for the current block, while for a block with a small size parameter, such as a 8×8 block, the encoder may use a part of weight derivation modes for determining the weight derivation mode for the current block, i.e., the number of possible weight derivation modes for the current block is limited. This is because for the block with the small size parameter, the impact of minor angular differences is not significant.

It is understood that in the present disclosure, a size threshold, such as a first size threshold, may be set first. If the size parameter of the current block is smaller than the first size threshold, then it can be assumed that minor angular differences will not cause a large impact, and thus the number of weight derivation modes that can be selected for the current block may be limited. Specifically, the limitation on the number of weight derivation modes can be achieved by limiting the index numbers of the weight derivation modes in the current block.

Exemplarily, in the present disclosure, if the size parameter of the current block is smaller than the first size threshold, then the encoder may determine the weight derivation mode based on the first mode index range. The first mode index range is used to limit the index number of the weight derivation mode. Specifically, the first mode index range may include a first lower threshold and a first upper threshold. The encoder may compare the index number of the weight derivation mode with the first lower threshold and the first upper threshold, respectively. If the index number of the weight derivation mode is smaller than the first lower threshold, then the index number of the weight derivation mode may be set to the first lower threshold. If the index number of the weight derivation mode is larger than the first upper threshold, then the index number of the weight derivation mode can be set to the first upper threshold.

That is, in the present disclosure, the limitation of the number of weight derivation modes can be achieved by limiting the index numbers of weight derivation modes for the current block by the first mode index range.

For example, in AVS3, the first mode index range can be 0~32, i.e., the index number of the weight derivation mode may be limited to 0~32 by the first mode index range, so the current block may use the first 33 weight derivation modes for the determination of the weight derivation mode for the current block.

Optionally, in the present disclosure, the encoder may reduce the overhead of encoding two intra prediction modes by reducing the number of intra prediction modes that can be used in the current block. For example, in AVS3, if 66 intra prediction modes are used, up to 7 bits are needed to encode one intra prediction mode, while if only 33 intra prediction modes are used and no PCM mode is used, up to 6 bits are needed to encode one intra prediction mode.

It should be noted that in the implementation of the present disclosure, the encoder, when limiting the number of intra prediction modes, may either directly limit the number of intra prediction modes for all prediction values, or may use different limiting methods for different sizes of current blocks with reference to the size parameter of the current block.

Exemplarily, in this disclosure, for a blocks with a large size parameter, such as a 64×64 or 32×32 size block, the encoder may use all of the intra prediction modes for the determination of two intra prediction modes for the current block, while for a blocks with a small size parameter, such as a 8×8 size block, the encoder may use some of the intra prediction modes for the determination of two intra prediction modes for the current block, i.e., the number of possible intra prediction modes for the current block is limited. This is because the impact of small angular differences is not significant for small blocks.

It is understood that in the present disclosure, a size threshold, such as a second size threshold, may be set first. If the size parameter of the current block is smaller than the second size threshold, then it can be assumed that minor angular differences will not have a large impact, and therefore the number of intra prediction modes that can be selected for the current block can be limited. Specifically, the limitation on the number of intra prediction modes can be achieved by limiting the index numbers of the two intra prediction modes in the current block.

Exemplarily, in the present disclosure, if the size parameter of the current block is less than the second size threshold, then the encoder may determine the first intra prediction mode and/or the second intra prediction mode based on a second mode index range. The second mode index range is used to limit the index numbers of the intra prediction modes. Specifically, the second mode index range may include a second lower threshold and a second upper threshold. The encoder may first determine a first index number of the first intra prediction mode and may also determine a second index number of the second intra prediction mode, and then set both the first index number and the second index number to be greater than the second lower threshold and less than the second upper threshold.

In other words, in this disclosure, the limitation on the number of intra prediction modes can be achieved by limiting the index number of the first intra prediction mode and the index number of the second intra prediction mode for the current block by the second mode index range.

For example, in AVS3, the second mode index range may be 0~32, i.e., the index number of the first intra prediction mode and the index number of the second intra prediction mode can be limited to 0~32 by the second mode index range. Thus the first 33 prediction modes can be used for determination of the first intra prediction mode and/or the second intra prediction mode for the current block.

It is understood that in the present disclosure, the first size threshold and the second size threshold may be the same or different, and the first mode index range and the second mode index range may be the same or different.

At 1303, based on the first intra prediction mode, the second intra prediction mode, and the weight, the prediction value is determined.

In implementations of the present disclosure, after the encoder determines the first intra prediction mode and/or the second intra prediction mode for the current block based on the weight derivation mode, and also determines the weight for the current block based on the weight derivation mode, the encoder may further determine the prediction value based on the first intra prediction mode, the second intra prediction mode, and the weight.

It is understood that in the implementation of the present disclosure, when determining the prediction value based on the first intra prediction mode, the second intra prediction mode, and the weight, the encoder may first determine the first prediction value based on the first intra prediction mode and the second prediction value based on the second intra prediction mode. Then the weight may be used to calculate a weighted average of the first prediction value and the second prediction value, so as to obtain the final prediction value Further, in the implementation of the present disclosure, the encoder, after determining the prediction value, may also perform a difference operation on an actual value and the prediction value of the current block to obtain a difference result, so that the prediction difference value of the current block, i.e., the residual, may be determined.

In other words, in this disclosure, the encoder may calculate the difference between the actual value and the intra prediction value of the current block to obtain the residual. This residual is transformed, quantized, and entropy encoded into the bitstream and transmitted to the decoding side.

In implementations of the present disclosure, further, if the intra prediction mode parameter indicates that the SAWP mode is used to determine the intra prediction value of the current block, then the encoder may further encode as follows.

A first initial mode and a second initial mode for the current block are determined based on the mode list.

In implementations of the present disclosure, after the encoder determines the intra prediction mode parameter for the current block, if the intra prediction mode parameter indicates that the SAWP mode is used to determine the intra prediction value for the current block, then the encoder may further determine the mode list (MPM list) used for the current block. The first initial mode and the second initial mode for the current block may then be determined from the mode list.

It is noted that in the present disclosure, the mode list is used to determine the intra prediction modes used for the current block. Specifically, the encoder may construct the mode list using several highly probable intra prediction modes, so that two intra prediction modes for the current block may be determined based on the mode list.

As can be appreciated, in the implementation of the present disclosure, the encoder may determine the mode list using a common manner of constructing the MPM list, such as constructing the MPM list using the prediction modes for adjacent blocks, or using the method of constructing the mode list involved in the prediction method proposed in the present disclosure, i.e., constructing the mode list using the weight derivation mode for the current block.

That is, in the present disclosure, the method of constructing the mode list may be the method of constructing the mode list proposed in operations at 1302 of the above-mentioned implementations, or may be other methods of constructing the MPM list, which is not limited in the present disclosure.

Further, in implementations of the present disclosure, the encoder, after determining the mode list used for the current block, may determine the first initial mode and the second initial mode for the current block based on the mode list.

Exemplarily, in this disclosure, the encoder constructs the mode list with N MPMs. If N is equal to 2n, then n bits (mpm_idx) may be used to indicate which MPM in the mode list is selected, i.e., to determine the first initial mode and the second initial mode, and then one more bit (offset_needed) may be used to indicate whether an offset is required. For example, for a mode list containing 4 MPMs, when selecting the intra prediction mode in the mode list, 2 bits (mpm_idx) are required to indicate which MPM in the mode list is selected as the initial mode. The correspondence between the values of mpm_idx and the bin strings as illustrated in Table 9 can be used to determine the prediction mode.

TABLE 9

| mpm_idx | Binary string |
| --- | --- |
| 0 | 00 |
| 1 | 01 |
| 2 | 10 |
| 3 | 11 |

An offset mode parameter is determined, and an offset parameter for the current block is determined when the offset mode parameter indicates that an offset process is to be performed.

In implementations of the present disclosure, the encoder may further determine the offset mode parameter, where the offset mode parameter is used to determine whether offsetting is required. Specifically, the encoder may further determine the offset parameter for the current block when the offset mode parameter indicates performing the offset process.

It is noted that in the implementations of the present disclosure, the encoder may use a bit (offset_needed) to indicate whether offsetting is needed, i.e., the encoder may determine whether the prediction mode (first initial mode or second initial mode) for the current block requires an offset by setting the offset mode parameter.

Further, in implementations of the present disclosure, the encoder may further determine the offset parameter for the current block if the offset mode parameter indicates that the offset process is to be performed. The offset parameter may include an offset manner and an offset amount. In other words, by the determination of the offset parameter, the encoder may determine whether the first initial mode or the second initial mode for the current block should be offset.

It is noted that in implementations of the present disclosure, the encoder may also use coded bits to indicate the offset manner and offset amount in the offset parameter. For example, the encoder may use a bit (sign) to indicate whether the offset manner is "+" or "−", and may use some bits (offset) to indicate the offset amount.

Optionally, in this disclosure, the encoder may also preset the offset manner and the offset amount. For example, the encoder may set a default offset amount, such as 1 or 2 or 4, etc.

The first intra prediction mode for the current block is determined according to the first initial mode and the offset parameter, and the second intra prediction mode for the current block is determined according to the second initial mode and the offset parameter.

In implementations of the present disclosure, after determining the offset parameter of the current block, the encoder may determine the first intra prediction mode for the current block according to the first initial mode and the offset parameter, and determine the second intra prediction mode for the current block according to the second initial mode and the offset parameter.

Further, in implementations of the present disclosure, when determining the first intra prediction mode and/or the second intra prediction mode for the current block based on the mode list and the offset parameter, the encoder may offset the first initial mode in accordance with the offset manner and the offset amount, so as to determine the first intra prediction mode. The encoder may also offset the second initial mode in accordance with the offset manner and the offset amount, so as to determine the second intra prediction mode.

That is, in the implementations of the present disclosure, the encoder may first use a few bits to determine which prediction mode from the mode list to use, i.e., the initial mode is first determined from the mode list. Then the initial mode is offset according to the offset parameter, and finally the intra prediction mode used for the current block can be determined.

It is understood that in the implementations of the present disclosure, the encoder may use the same offset parameter for the first initial mode and the second initial mode, i.e., the offset process is performed according to the same offset manner and offset amount based on the first initial mode and the second initial mode. Accordingly, the encoder may also use different offset parameters for the first initial mode and the second initial mode, i.e., the offset process is performed on the first initial mode using one offset manner, while the offset processing is performed on the second initial mode using another offset manner, where the offset manners and the offset amounts corresponding to the two offset manners may not be identical.

That is, in this disclosure, the offset manner and offset amount for the offset process of the first initial mode may be the same as or different from the offset manner and offset amount for the offset process of the second initial mode.

Optionally, in the present disclosure, the offset mode parameter corresponding to the first initial mode and the offset mode parameter corresponding to the second initial mode may also be different. That is, the encoder achieves several different processes by setting the offset mode parameter separately for the first initial mode and the second initial mode. In an example, both the first initial mode and the second initial mode are offset. In an example, none of the first initial mode and the second initial mode is offset. In an example, the first initial mode is offset and the second initial mode is not offset. In an example, the first initial mode is not offset and the second initial mode is offset.

Further, in implementations of the present disclosure, if the offset mode parameter indicates that no offset process is to be performed, then the encoder may determine the first intra prediction mode and/or the second intra prediction mode directly from the mode list. That is, the encoder may directly use a few bits to determine which prediction mode from the mode list is to be used.

Based on the first intra prediction mode and/or the second intra prediction mode, the prediction value is determined.

In implementations of the present disclosure, after the encoder determines the first intra prediction mode and/or the second intra prediction mode for the current block based on the mode list and the offset parameter, the encoder may further determine the prediction value based on the first intra prediction mode and the second intra prediction mode.

It should be noted that in the implementation of the present disclosure, the encoder may first determine the first prediction value based on the first intra prediction mode, and at the same time determine the second prediction value based on the second intra prediction mode. Then the weighted average of the first and second prediction values may be calculated using the weight of the current block to finally obtain the prediction value.

Further, in implementations of the present disclosure, after determining the prediction value, the encoder may also perform subtraction on the actual value and the prediction value of the current block to obtain a difference between the actual value and the prediction value, so that the prediction difference of the current block, i.e., the residual, can be determined.

In other words, in this disclosure, the encoder may calculate the difference between the actual value and the intra prediction value of the current block to obtain the residual, and this residual is transformed, quantized, and entropy encoded into the bitstream and transmitted to the decoding side.

In implementations of the present disclosure, further, in the prediction method above, the encoder may first select the prediction mode from the mode list, then determine whether the offset is required based on that prediction mode. If the offset is required, the encoder further determines the offset manner and the offset amount, where the offset amount may be understood as a mode index number to be offset.

It should be noted that in the implementations of the present disclosure, the method of determining the prediction mode for the current block after the offset process of the mode list can be applied to the SAWP mode in the implementations of the present disclosure, to other intra prediction modes, and to any inter prediction mode, which are not limited in the present disclosure. Also, one bit (offset_needed) may be used to indicate whether an offset is needed. For example, setting the offset mode parameter offset_needed to 0 may be considered as not performing the offset process, and setting the offset mode parameter offset_needed to 1 may be considered as performing the offset process.

Exemplarily, in this disclosure, providing that 4 MPMs are constructed, then 2 bits may be used to determine which prediction mode is selected and 1 bit may be used to determine if the offset process is performed. If the selected intra prediction mode is one of the MPMs, 2 bits (mpm_idx) are needed to indicate which MPM it is and 1 bit (offset_needed) to indicate that no offset is needed, for a total of 3 bits.

Further, in implementations of the present disclosure, if the offset mode parameter indicates that the offset process is performed, then the offset parameter may be further determined, where the offset parameter may include a bit (sign) indicating the offset manner and may also include some bits (offset) indicating the offset amount.

That is, in this disclosure, if an offset is required, then a bit (sign) may be used to indicate whether the offset manner is "+" or "−". Further, the offset may be set to a certain default amount, such as 1 or 2 or 4, etc., or alternatively, some overhead may be used to indicate the offset amount. For example, assuming that there are two optional offset amounts, such as 2 and 4, then one bit may be used to indicate whether the offset amount is 2 or 4. Assuming that there are multiple optional offset amounts, then some bits (offset) may be used to indicate the offset amount. The correspondence between the values of offset and the binary strings as illustrated in Table 10 may be used to determine the offset amount.

TABLE 10

| offset | Binary string |
|---|---|
| 1 | 0 |
| 2 | 10 |
| 4 | 110 |
| 8 | 1110 |

The implementations of the present disclosure provide the prediction method in which the encoder may determine two different prediction values of the current block using two different intra prediction modes, and combine the two prediction values using diverse weights to finally obtain the more complex prediction value, improving the accuracy of the prediction. Additionally, the encoder may also construct the MPM list by using the correlation between the weights and the prediction modes, which can greatly reduce the complexity without transmission of the prediction modes in the bitstream, thereby reducing overhead of the bitstream. In other words, the prediction method proposed in this disclosure can improve the prediction quality while reducing the complexity and overhead of the bitstream, thus improving the compression performance.

The process of determining the first and second prediction modes and the weight based on the weight derivation mode and determining the prediction value based on the first prediction mode, the second prediction mode and the weight, as involved in the implementations of the present disclosure, is described above. The following describes the process of determining a first prediction mode and a second prediction mode based on a prediction list and determining a prediction value based on the first prediction mode and the second prediction mode, as involved in implementations of the present disclosure.

Figure 18:
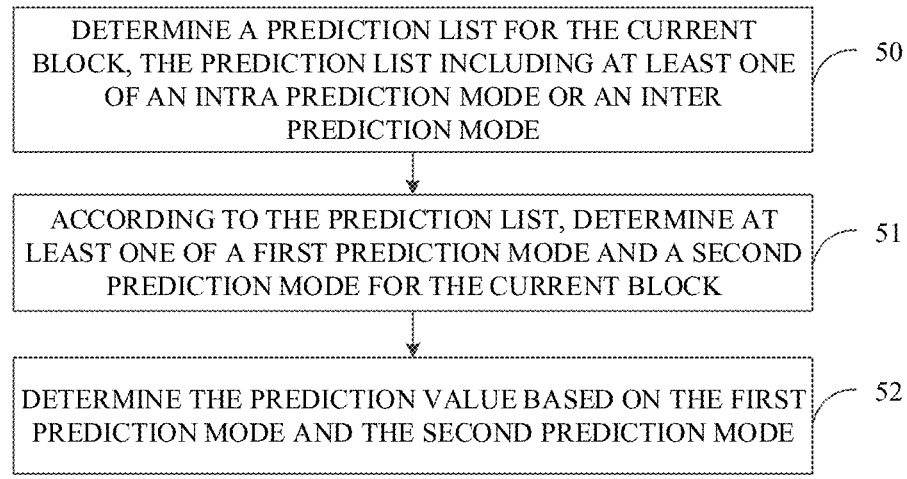
FIG. 18 is a schematic implementation flowchart of a prediction method.

FIG. 18 is a schematic implementation flowchart of a prediction method, which is applied to the encoder.

Based on the above implementations, further implementations of the present disclosure propose the prediction method which is applied to the encoder. As illustrated in FIG. 18, the prediction method performed by the encoder may include the following.

At 50, a prediction list for the current block is determined, the prediction list including at least one of an intra prediction mode or an inter prediction mode.

In implementations of the present disclosure, the encoder may first determine the prediction list for the current block after determining that the SAWP mode is used for the current block to determine the prediction value.

The prediction list includes at least one of an intra prediction mode and an inter prediction mode.

Exemplarily, the prediction list includes at least one intra prediction mode. In this case, the prediction list may be referred to as an intra mode list (MPM list).

Exemplarily, the prediction list includes at least one inter prediction mode.

Exemplarily, the prediction list includes at least one intra prediction mode and at least one inter-picture prediction mode.

Optionally, if the prediction list includes an inter prediction mode, the inter prediction mode may be predetermined, or may be a most probable inter prediction mode, an inter prediction mode determined in other way, such as an inter prediction mode with the lowest loss cost, or an inter prediction mode with the best prediction result, etc.

Optionally, the prediction list may also include other prediction modes, such as IBC prediction mode or palette prediction mode, etc.

In some implementations, the inter prediction mode includes the skip, merge, basic inter prediction modes, etc.

In some implementations, the intra prediction mode includes unidirectional prediction, bidirectional prediction, or multi-hypothesis prediction, etc.

In some implementations, the intra prediction mode includes weighted prediction, decoder side motion vector refinement (DMVR), decoder side motion vector derivation (DMVD), bidirectional optical flow (BDOF), and other intra prediction techniques.

In some implementations, in the present disclosure, the encoder may first determine a size parameter of the current block, and then determine whether the SAWP mode is used for the current block based on the size parameter. Specifically, if the width is greater than a first threshold and the height is greater than a second threshold, it is determined that the SAWP mode is used for the current block. Optionally, if the width is less than a third threshold and the height is greater than a fourth threshold, it is determined that the SAWP mode is used for the current block.

Optionally, in this disclosure, the encoder may first determine a sample parameter of the current block, and then determine whether the SAWP mode is used for the current block based on the sample parameter and a fifth threshold value.

Optionally, in this disclosure, the encoder may first determine a prediction mode parameter of the current block, and then determine whether the SAWP mode is used for the current block based on the prediction mode parameter.

At 51, according to the prediction list, at least one of a first prediction mode or a second prediction mode for the current block is determined.

The at least one of the first prediction mode or the second prediction mode in this implementation is an intra prediction mode or an inter prediction mode.

For example, the first prediction mode is an intra prediction mode and the second prediction mode is an inter prediction mode. Optionally, the first prediction mode is an inter prediction mode and the second prediction mode is an intra prediction mode. Optionally, the first prediction mode and the second prediction mode are both inter prediction modes. Optionally, the first prediction mode and the second prediction mode are both intra prediction modes. Implementations of the present disclosure do not limit the specific types of the first prediction mode and the second prediction mode.

In one example, the first prediction mode and the second prediction mode described above may default to one of the prediction modes in the prediction list. For example, the first prediction mode is default to an intra prediction mode in the prediction list, and the second prediction mode is default to an inter prediction mode in the prediction list.

In some implementations, types of the first prediction mode and the second prediction mode are indicated by a first flag. In this case, prior to operations at 51, the method in this implementation of the present disclosure further includes the following.

The first flag is obtained, where the first flag indicates whether the first prediction mode and the second prediction mode are intra prediction modes.

According to the first flag, the types of the first prediction mode and the second prediction mode are determined.

That is, in this disclosure, the types of the first prediction mode and the second prediction mode are set in advance and indicated by the first flag during encoding.

Exemplarily, the first flag with a first value indicates that both the first prediction mode and the second prediction mode are inter prediction modes. In this case, mode0IsInter is equal to 1 and mode1IsInter is equal to 1, where mode0IsInter indicates whether the first prediction mode is an inter prediction mode and mode1IsInter indicates whether the second prediction mode is an inter prediction mode. mode0IsInter is equal to 1 when the first prediction mode is an inter prediction mode, and mode1IsInter is equal to 1 when the second prediction mode is an inter prediction mode.

Exemplarily, the first flag with a second value indicates that the first prediction mode is an intra prediction mode and the second prediction mode is an inter prediction mode. In this case, mode0IsInter is equal to 0 and mode1IsInter is equal to 1.

Exemplarily, the first flag with a third value indicates that the first prediction mode is an inter prediction mode and the second prediction mode is an intra prediction mode. In this case, mode0IsInter is equal to 1 and mode1IsInter is equal to 0.

Exemplarily, the first flag with a fourth value indicates that both the first prediction mode and the second prediction mode are intra prediction modes. In this case, mode0IsInter is equal to 0 and mode1IsInter is equal to 0.

This disclosure does not limit the specific values of the first, second, third and fourth values mentioned above.

Optionally, the first value is 0.
Optionally, the second value is 1.
Optionally, the third value is 2.
Optionally, the fourth value is 3.

In one example, the field intra_mode_idx may be used to represent the first flag.

In this disclosure, after the encoding side determines the types of the first prediction mode and the second prediction mode based on the first flag, the first flag should be signalled into the bitstream during encoding, so that the decoding side can determine the types of the first prediction mode and the second prediction mode based on the first flag. Specific reference may be made to the description in Table 11 above, which will not be repeated here.

In this case, operations at 11 in FIG. 11 above include the following.

According to the types of the first prediction mode and the second prediction mode, at least one of the first prediction mode or the second prediction mode is determined based on the prediction list.

For example, when the first prediction mode is an intra prediction mode, one of the intra prediction modes in the prediction list is selected as the first prediction mode. For example, the intra prediction mode with the lowest coding cost in the prediction list is determined as the first prediction mode.

For example, if the second prediction mode is an inter prediction mode, one of the inter prediction modes in the prediction list is selected as the second prediction mode. For example, the inter prediction mode with the lowest coding cost in the prediction list is determined as the second prediction mode.

At FIG. 18, 52, the prediction value is determined based on the first prediction mode and the second prediction mode.

In implementations of the present disclosure, after determining the first prediction mode and/or the second prediction mode for the current block based on the prediction list, the encoder may then determine the prediction value based on the first prediction mode and the second prediction mode. Specific reference may be made to the specific description for operations at 12 in FIG. 11 above, which will not be repeated here.

It is understood that in the implementations of the present disclosure, when determining the prediction value based on the first prediction mode and the second prediction mode, the encoder may first determine a first prediction value based on the first prediction mode and determine a second prediction value based on the second prediction mode, and then the encoder may calculate a weighted average of the first prediction value and the second prediction value to finally obtain the prediction value. For example, the encoder may calculate the weighted average of the first prediction value and the second prediction value using the weight to obtain the prediction value.

Further, in implementations of the present disclosure, after determining the prediction value, the encoder may also perform subtraction on the actual value and the prediction value of the current block to obtain a difference between the actual value and the prediction value, so that the prediction difference of the current block, i.e., the residual, can be determined.

In other words, in this disclosure, the encoder may calculate the difference between the actual value and the intra prediction value of the current block to obtain the residual, and this residual is transformed, quantized, and entropy encoded into the bitstream and transmitted to the decoding side.

The method in implementations of this disclosure is described below in conjunction with FIG. 19, with an example that the first prediction mode is a first intra prediction mode, the second prediction mode is a second intra prediction mode, and the prediction list includes a mode list.

Figure 19:
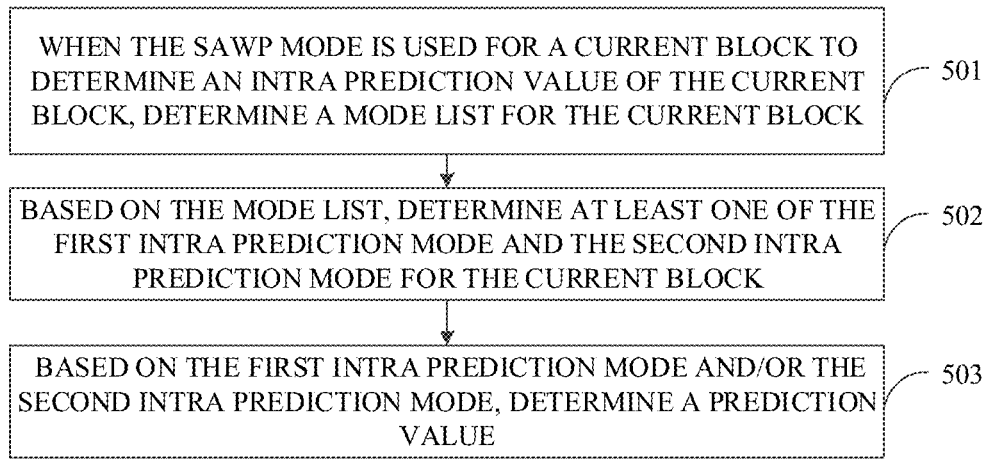
FIG. 19 is a schematic implementation flowchart of a prediction method.

FIG. 19 is a schematic implementation flowchart of a prediction method. As illustrated in FIG. 19, the prediction method performed by the encoder may include the following.

At 501, when the SAWP mode is used for a current block to determine an intra prediction value of the current block, a mode list for the current block is determined.

In implementations of the present disclosure, the encoder may first determine the mode list for the current block after determining that the SAWP mode is used for the current block to determine the intra prediction value for the current block.

It should be noted that in the implementations of the disclosure, the SAWP mode is a type of intra prediction method. Specifically, in the SAWP mode, two different intra prediction modes are determined for the current block, and then two prediction values are determined based on these two different intra prediction modes. Then a weight is determined to combine the two prediction values according to the weight, resulting in a new prediction value, which is the prediction value of the current block.

Optionally, in the present disclosure, the encoder may first determine a size parameter of the current block; and then determine whether the SAWP mode is used for the current block based on the size parameter. Specifically, if the width is greater than a first threshold and the height is greater than a second threshold, it is determined that the SAWP mode is used for the current block. Optionally, if the width is less than a third threshold and the height is greater than a fourth threshold, it is determined that the SAWP mode is used for the current block.

Optionally, in this disclosure, the encoder may first determine a sample parameter of the current block, and then determine whether the SAWP mode is used for the current block based on the sample parameter and a fifth threshold value.

Optionally, in this disclosure, the encoder may first determine an intra prediction mode parameter for the current block, and then determine whether the SAWP mode is used for the current block based on the intra prediction mode parameter.

It is noted that in the present disclosure, the weight derivation mode is used to determine the weight used for the current block. Specifically, the weight derivation mode may be a mode for deriving the weights. For a block of a given length and width, each weight derivation mode may be used to derive a weight matrix. For blocks of the same size, different weight matrices may be derived from different weight derivation modes.

Exemplarily, in this disclosure, there are 56 weight derivation modes for AWP in AVS3 and 64 weight derivation modes for GPM in VVC.

Further, in implementations of the disclosure, when determining the mode list by using the weight derivation mode, the encoder may first determine an intra prediction mode corresponding to an adjacent block of the current block, and determine the intra prediction mode corresponding to the adjacent block as a mode to-be-added. After determining that the mode to-be-added meets a preset adding condition, the encoder may add the mode to-be-added to the mode list, that is, add the intra prediction mode corresponding to the adjacent block of the current block to the mode list. Next, if the mode list does not reach a preset list-length, the encoder may determine a weight derivation mode for the current block, and determine a related intra prediction mode corresponding to the weight derivation mode as the mode to-be-added. When determining that the mode to-be-added meets the preset adding condition, the encoder may add the mode to-be-added to the mode list, that is, add the related intra prediction mode corresponding to the weight derivation mode to the mode list.

It should be noted that in implementations of this disclosure, after the encoder adds the intra prediction mode corresponding to the adjacent block of the current block to the mode list, or adds the related intra prediction mode corresponding to the weight derivation mode to the mode list, if the mode list does not reach the preset list-length, that is, the mode list is not full, then the encoder may continue to determine a preset prediction mode as the mode to-be-added, and when the mode to-be-added meets the preset adding condition, add the mode to-be-added to the mode list, that is, add the preset prediction mode to the mode list.

It should be noted that the preset prediction mode in this disclosure includes one or more of different modes like a DC mode, a Bilinear mode, and a Planar mode.

Further, in implementations of this disclosure, after the encoder adds the intra prediction mode corresponding to the adjacent block of the current block, the related intra prediction mode corresponding to the weight derivation mode, and the preset prediction mode to the mode list, if the mode list does not reach the preset list-length, that is, the mode list is not full, then the encoder may determine an associated intra prediction mode using the prediction modes in the mode list, and determine the associated intra prediction mode as the mode to-be-added. When the mode to-be-added meets the preset adding condition, the encoder adds the mode to-be-added to the mode list, that is, add to the mode list the associated intra prediction mode corresponding to the mode list.

In other words, in this disclosure, after the the intra prediction mode corresponding to the adjacent block of the current block, the related intra prediction mode corresponding to the weight derivation mode, and the preset prediction mode are added to the mode list sequentially, if the mode list is not full, then the encoder may determine the associated intra prediction mode based on the existing prediction modes in the mode list, and then add the associated intra prediction mode to the mode list.

It should be noted that in implementations of this disclosure, regardless of whether the intra prediction mode corresponding to the adjacent block of the current block, the related intra prediction mode corresponding to the weight derivation mode, the preset prediction mode, or the associated intra prediction mode is taken as the mode to-be-added, the encoder needs to determine whether the mode to-be-added meets the preset addition condition. Specifically, if the mode to-be-added exists and is different from all prediction modes in the mode list, it is determined that the mode to-be-added meets the preset addition condition, and the mode to-be-added will be added to the mode list.

Correspondingly, if the mode to-be-added does not exists or is the same as (identical to) a prediction mode in the mode list, it is determined that the mode to-be-added does not meet the preset addition condition, and the mode to-be-added will not be added to the mode list. Instead, the mode to-be-added will be directly discarded.

It can be understood that in this disclosure, since two intra prediction modes are required for intra prediction of the current block, it is possible to refer to intra prediction modes for more positions when constructing the MPM list, or refer to more intra prediction modes for the adjacent blocks. Correspondingly, in this disclosure, the length of the mode list used for the current block may be different from a length of other mode list of intra prediction modes. Because the codeword for binarization of the MPM is shorter than the codeword for binarization of other modes, increasing the probability that the two intra prediction modes are MPMs can improve the coding efficiency.

Further, in implementations of the disclosure, when determining the mode list by using the weight derivation mode, the encoder may first determine a list construction strategy corresponding to the weight derivation mode, and then determine the mode list according to the list construction strategy.

That is, in the disclosure, for different weights, that is, for different weight derivation modes, the encoder may construct the mode list by using different list construction strategies. For example, based on the list construction strategy, in a case that the boundary line of the weight is 0 degree or 90 degrees, that is, horizontal or vertical, the encoder may consider intra prediction modes corresponding to the weight for construction of the mode list. For other cases, the encoder may not consider the intra prediction modes corresponding to the weight.

At 502, based on the mode list, at least one of the first intra prediction mode or the second intra prediction mode for the current block is determined.

In implementations of the present disclosure, after constructing the mode list for the current block, the encoder may then determine the first intra prediction mode and/or the second intra prediction mode for the current block based on the mode list.

It can be understood that in the present disclosure, the two intra prediction modes used for intra prediction of the current block are not the same, i.e., the first intra prediction mode is not the same as the second intra prediction mode, so that the second intra prediction mode may exclude the possibility of the first intra prediction mode during decoding. In other words, the second intra prediction mode may be decoded using the information of the first intra prediction mode.

In implementations of the present disclosure, further, the encoder may set an alternate intra prediction mode during constructing the mode list. The alternate intra prediction mode is not the same as any intra prediction mode in the mode list.

Specifically, in the present disclosure, in order to ensure that the first intra prediction mode and the second intra prediction mode used for the current block are not the same, the second intra prediction mode may be determined depending on the first intra prediction mode. When determining the first intra prediction mode and/or the second intra prediction mode based on the mode list, the encoder may first determine one of the prediction modes in the mode list as the first intra prediction mode, and then determine the second intra prediction mode based on the first intra prediction mode and the mode list.

Further, in implementations of the present disclosure, after determining the prediction mode in the mode list as the first intra prediction mode, the encoder may remove the prediction mode from the mode list and then add the alternate intra prediction mode to the mode list, so that an updated mode list may be obtained. A prediction mode may then be selected from the updated mode list and determined as the second intra prediction mode. Any selection method may be used.

Exemplarily, in this disclosure, assuming that the first intra prediction mode and the second intra prediction mode have N optional MPMs, when constructing the mode list, N MPMs and 1 alternate MPM may be constructed first. For the first intra prediction mode, the optional MPMs are the above-mentioned N MPMs. If one of the MPMs is selected for the first intra prediction mode, then for the second intra prediction mode, the MPM selected for the first intra prediction mode is removed, and then the alternate MPM is added to the mode list. In this way, the second intra prediction mode still has N optional MPMs.

In implementations of the present disclosure, furthermore, the encoder may set a length parameter of the mode list to be (N+1) during constructing the mode list, where N is a positive integer.

Specifically, in the present disclosure, the second intra prediction mode may be determined depending on the first intra prediction mode in order to ensure that the first intra prediction mode and the second intra prediction mode used for the current block are not the same. When determining the first intra prediction mode and/or the second intra prediction mode based on the mode list, the encoder may determine one of the first N prediction modes in the mode list as the first intra prediction mode if the first intra prediction mode is determined by using the mode list. Then the second intra prediction mode is determined based on the first intra prediction mode and the mode list.

Further, in implementations of the present disclosure, if the first intra prediction mode is determined by using the mode list, then the encoder determines the second intra prediction mode by using the remaining N prediction modes in the mode list, other than the first intra prediction mode, after determining one of the first N prediction modes of the mode list as the first intra prediction mode.

It is noted that in implementations of the present disclosure, when determining the first intra prediction mode and/or the second intra prediction mode based on the mode list, if the mode list is not used to determine the first intra prediction mode, then the encoder may directly determine one of the first N prediction modes of the mode list as the second intra prediction mode.

Optionally, in implementations of the present disclosure, if it is only ensured that the first intra prediction mode and the second intra prediction mode used for the current block are not the same, without limiting the number of MPMs that can be selected for the first intra prediction mode and the second intra prediction mode, then the encoder may also not set the alternate intra prediction mode, or, alternatively, may not increase the length of the mode list. In this case, the encoder needs to change the method for encoding the second intra prediction mode. In other words, if one MPM in the mode list is selected for the first intra prediction mode, one less MPM can be selected for the second intra prediction mode. Since there are fewer MPMs to select for the second intra prediction mode, the method for encoding the second intra prediction mode needs to be changed.

Exemplarily, in this disclosure, the number N of MPMs is equal to 4, and the first bit indicates whether a mode is an MPM. For example, "1" means the mode is an MPM and "0" means the mode is not an MPM. If the first intra prediction mode is an MPM, since there are 4 MPMs, 2 bits are used to indicate which MPM first intra prediction mode is, i.e., "00, 01, 10, 11" representing the first, second, third and fourth MPMs respectively. If both the first intra prediction mode and the second intra prediction mode are MPMs, then there are only 3 MPMs available for the second intra prediction mode. In this case, 1 to 2 bits may be used to indicate which MPM the second intra prediction mode is, such as "00, 01, 10" representing the remaining first, second and third MPMs respectively. As can be seen, the encoding method, or called binarization method, can be changed to save overhead since one possibility is excluded.

At 503, based on the first intra prediction mode and/or the second intra prediction mode, a prediction value is determined.

In implementations of the present disclosure, after the encoder determines the first intra prediction mode and/or the second intra prediction mode for the current block according to the weight derivation mode, the encoder may further determine the prediction value based on the first intra prediction mode and the second intra prediction mode.

It is understood that in the implementation of the present disclosure, when determining the prediction value based on the first intra prediction mode and the second intra prediction mode, the encoder may first determine a first prediction value according to the first intra prediction mode and a second prediction value according to the second intra prediction mode. Then a weighted average of the first prediction value and the second prediction value may be calculated, so as to obtain the final prediction value. For example, the encoder may use a weight to calculate the weighted average of the first prediction value and the second prediction value, so as to obtain the prediction value.

Further, in implementations of the present disclosure, after determining the prediction value, the encoder may also perform subtraction on an actual value and the prediction value of the current block to obtain a difference between the actual value and the prediction value, so that the prediction difference of the current block, i.e., the residual, can be determined.

In other words, in this disclosure, the encoder may calculate the difference between the actual value and the intra prediction value of the current block to obtain the residual. This residual is signalled into the bitstream after transformation, quantization, and entropy encoding, and then transmitted to the decoding side.

The implementations of the present disclosure provide the intra prediction method in which the coder may determine two different prediction values of the current block by using two different intra prediction modes, and the two prediction values may be combined using diverse weights to finally obtain the more complex prediction value, improving the accuracy of the prediction. Additionally, the coder may also construct the MPM list by using the correlation between the weights and the prediction modes, which can greatly reduce the complexity without transmission of the prediction modes in the bitstream, thereby reducing overhead of the bitstream. In other words, the intra prediction method proposed in this disclosure can improve the intra prediction quality while reducing the complexity and bitstream overhead, thus improving the compression performance.

In implementations of the present disclosure, further, after determining the mode list of the current block, the encoder may also determine a first initial mode and a second initial mode for the current block based on the mode list, and then determine an offset mode parameter. When the offset mode parameter indicates performing an offset process, the encoder determines an offset parameter of the current block, and then determines the first intra prediction mode for the current block based on the first initial mode and the offset parameter and determines the second intra prediction mode for the current block based on the second initial mode and the offset parameter. Finally, based on the first intra prediction mode and the second intra prediction mode, the prediction value may be determined.

As can be appreciated, in implementations of the present disclosure, the encoder may determine the mode list using a common manner of constructing the MPM list, such as constructing the MPM list using the prediction modes for adjacent blocks, or using the method of constructing the mode list involved in the intra prediction method proposed in the present disclosure, i.e., constructing the mode list using the weight derivation mode for the current block.

That is, in the present disclosure, the method of constructing the mode list may be the method of constructing the mode list proposed in the above-mentioned implementations, or may be other methods of constructing the MPM list, which is not limited in the present disclosure.

Further, in implementations of the present disclosure, the encoder, after determining the mode list used for the current block, may determine the first initial mode and the second initial mode for the current block based on the mode list.

Exemplarily, in this disclosure, the encoder constructs the mode list with N MPMs. If N is equal to 2n, then n bits (mpm_idx) may be used to indicate which MPM in the mode list is selected, i.e., to determine the first initial mode and the second initial mode, and then one more bit (offset_needed) may be used to indicate whether an offset is required. For example, for a mode list containing 4 MPMs, when selecting the intra prediction mode in the mode list, 2 bits (mpm_idx) are required to indicate which MPM in the mode list is selected as the initial mode. The correspondence between the values of mpm_idx and the bin strings as illustrated in Table 9 can be used to determine the prediction mode.

It is noted that in the implementations of the present disclosure, the encoder may use a bit (offset_needed) to indicate whether offsetting is needed, i.e., the encoder may determine whether the prediction mode (first initial mode or second initial mode) for the current block requires an offset by setting the offset mode parameter.

Further, in implementations of the present disclosure, the encoder may further determine the offset parameter for the current block if the offset mode parameter indicates that the offset process is to be performed. The offset parameter may include an offset manner and an offset amount. In other words, by the determination of the offset parameter, the encoder may determine whether the first initial mode or the second initial mode for the current block should be offset.

It is noted that in implementations of the present disclosure, the encoder may also use coded bits to indicate the offset manner and offset amount in the offset parameter. For example, the encoder may use a bit (sign) to indicate whether the offset manner is "+" or "−", and may use some bits (offset) to indicate the offset amount.

Optionally, in this disclosure, the encoder may also preset the offset manner and the offset amount. For example, the encoder may set a default offset amount, such as 1 or 2 or 4, etc.

Further, in implementations of the present disclosure, when determining the first intra prediction mode and/or the second intra prediction mode for the current block based on the mode list and the offset parameter, the encoder may offset the first initial mode in accordance with the offset manner and the offset amount, so as to determine the first intra prediction mode. The encoder may also offset the second initial mode in accordance with the offset manner and the offset amount, so as to determine the second intra prediction mode.

That is, in the implementations of the present disclosure, the encoder may first use a few bits to determine which prediction mode from the mode list to use, i.e., the initial mode is first determined from the mode list. Then the initial mode is offset according to the offset parameter, and finally the intra prediction mode used for the current block can be determined.

It is understood that in the implementations of the present disclosure, the encoder may use the same offset parameter for the first initial mode and the second initial mode, i.e., the offset process is performed according to the same offset manner and offset amount based on the first initial mode and the second initial mode. Accordingly, the encoder may also use different offset parameters for the first initial mode and the second initial mode, i.e., the offset processing is performed on the first initial mode using an offset manner, while the offset process is performed on the second initial mode using another offset manner, where the offset manners and the offset amounts corresponding to the two offset manners may not be identical.

That is, in this disclosure, the offset manner and offset amount for the offset process of the first initial mode may be the same as or different from the offset manner and offset amount for the offset process of the second initial mode.

Optionally, in the present disclosure, the offset mode parameter corresponding to the first initial mode and the offset mode parameter corresponding to the second initial mode may also be different. That is, the encoder achieves several different processes by setting the offset mode parameter separately for the first initial mode and the second initial mode. In an example, both the first initial mode and the second initial mode are offset. In an example, none of the first initial mode and the second initial mode is offset. In an example, the first initial mode is offset and the second initial mode is not offset. In an example, the first initial mode is not offset and the second initial mode is offset.

Further, in implementations of the present disclosure, if the offset mode parameter indicates that no offset process is to be performed, then the encoder may determine the first intra prediction mode and/or the second intra prediction mode directly from the mode list. That is, the encoder may directly use a few bits to determine which prediction mode from the mode list is to be used.

It should be noted that in the implementation of the present disclosure, during prediction, the encoder may first determine the first prediction value based on the first intra prediction mode, and at the same time determine the second prediction value based on the second intra prediction mode. Then the weighted average of the first and second prediction values may be calculated to finally obtain the prediction value.

In summary, with regard to the shortcomings in the common technology that the intra prediction modes can be only used to predict simple textures, the intra prediction method proposed in this disclosure can improve the quality of intra prediction and thus improve the compression performance by determining two prediction values using two intra prediction modes and combining the two prediction values using various weights so as to obtain the more complex prediction value. As can be seen, the intra prediction method proposed in this disclosure can improve the coding of intra prediction modes by using the probabilistic characteristics of the intra prediction modes in new scenarios to improve the coding method of intra prediction modes and effectively improve the compression performance.

It should be noted that the encoding method of the intra prediction modes used in the present disclosure may be different from the encoding method of the intra prediction modes in the intra prediction methods of common technologies. Accordingly, the MPM construction method used in this disclosure may also be different from the MPM construction method of the intra prediction methods in common technologies It is understood that in the present disclosure, since the intra prediction mode selected for the current block will have a correlation with the weight, using this correlation, the encoding of the intra prediction mode may utilize the information of the weight, i.e., the encoding of the intra prediction mode may utilize the information of the weight derivation mode. Specifically, the MPM list may be constructed using the weight derivation mode, or, the information of the weight derivation mode can be utilized in the construction of the MPM list.

Optionally, in this disclosure, the intra prediction mode(s) corresponding to the weight derivation mode, or several intra prediction modes related to the intra prediction mode corresponding to the weight derivation mode, are each assigned to a shorter codeword than a normal intra prediction mode during binarization.

It should be noted that in the present disclosure, since two intra prediction modes are required, it is possible to consider intra prediction modes for more positions or intra prediction modes of more adjacent blocks when constructing the MPM list. The length of the mode list (i.e., MPM list) used in the present disclosure may be different from the length of other mode list (i.e., MPM list) of intra prediction modes.

The implementations of the present disclosure provide the intra prediction method in which the coder may determine two different prediction values of the current block by using two different intra prediction modes, and the two prediction values may be combined using diverse weights to finally obtain a more complex prediction value, improving the accuracy of the prediction. Additionally, the coder may also construct the MPM list by using the correlation between the weights and the prediction modes, which can greatly reduce the complexity without transmission of the prediction modes in the bitstream, thereby reducing overhead of the bitstream. In other words, the intra prediction method proposed in this disclosure can improve the intra prediction quality while reducing the complexity and bitstream overhead, thus improving the compression performance.

The prediction method is disclosure is introduced above taking the encoding side as an example. The following will describe taking the decoding side as an example.

Figure 20:
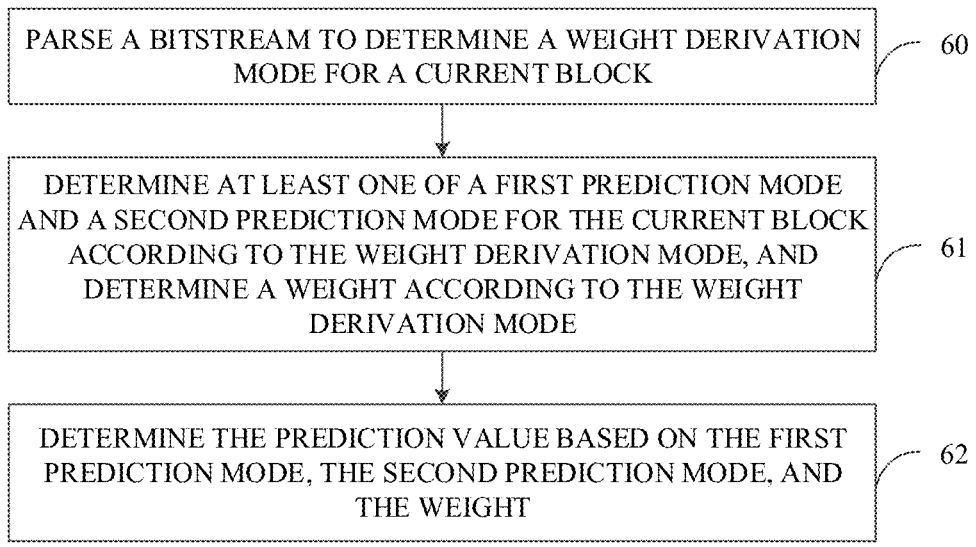
FIG. 20 is a schematic implementation flowchart of a prediction method.

In implementations of the disclosure, a prediction method is provided. The prediction method is applied to a decoder. FIG. 20 is a schematic implementation flowchart of the prediction method. As illustrated in FIG. 20, the prediction method performed by the decoder may include the following operations.

At FIG. 20, 60, a bitstream is parsed to determine a weight derivation mode for a current block.

In the implementations of the present disclosure, the decoder parse the bitstream to determine a prediction mode parameter of the current block.

It should be noted that in this implementation, the prediction mode parameter may indicate whether the SAWP mode may be used for the current block, i.e., indicating whether two different prediction modes may be used for prediction of the current block.

It may be understood that in this implementation, the prediction mode parameter may be understood as a flag indicating whether the SAWP mode is used or not. Specifically, by parsing the bitstream, the decoder may determine a variable as the prediction mode parameter, so that the prediction mode parameter may be determined through the value of the variable.

It should be noted that in implementations of this disclosure, the SAWP mode is a prediction method. Specifically, in the SAWP mode, two different prediction modes are determined for the current block. According to the two different prediction modes, two prediction values may be determined, and a weight may be determined to combine the two prediction values according to the weight, so as to obtain a new prediction value. That is, the prediction of the current block is obtained.

The above two different prediction modes include the following examples.

Example 1: Both of the above two different prediction modes are intra prediction modes.

Example 2: Both of the above two different prediction modes are inter prediction modes.

Example 3: One of the above two different prediction modes is an intra prediction mode, and the other is an inter prediction mode.

Example 4: One of the above two different prediction modes is an intra prediction mode, and the other is a non-intra and non-inter prediction mode, such as an Intra-Block Copy (IBC) prediction mode or a palette prediction mode.

Example 5: One of the above two different prediction modes is an inter prediction mode, and the other is a non-intra and non-inter prediction mode, such as the IBC prediction mode or palette prediction mode.

Example 6: Both of the above two different prediction modes are not intra prediction modes or inter prediction modes, such as one being the IBC prediction mode, and the other being the palette prediction mode.

It should be noted that the specific types of the above two different prediction modes are not limited in implementations of the disclosure.

Further, in implementations of this disclosure, limitations may be imposed on the block size when applying the SAWP mode.

It may be understood that, since the prediction method proposed in this disclosure requires the use of two different prediction modes to generate two prediction values, which are then weighted to obtain a new prediction value, in order to reduce complexity while considering the trade-off between compression performance and complexity, the SAWP mode may not be used for blocks with certain sizes in implementations of the disclosure. Thus, in this disclosure, the decoder may first determine a size parameter of the current block, and then determine whether to use the SAWP mode for the current block based on the size parameter.

It should be noted that in the implementations of the disclosure, the size parameter of the current block may include both a height and a width of the block, so the decoder may limit the use of the SAWP mode based on the height and width of the current block. That is, the decoder may limit the size of the block for which the SAWP mode can be used.

For example, in this disclosure, if the width is greater than a first threshold and the height is greater than a second threshold, then it is determined to use the SAWP mode for the current block. As can be seen, one possible limitation is to use the SAWP mode only when the block width is greater than (or greater than or equal to) the first threshold and the block height is greater than (or greater than or equal to) the second threshold. The values of the first and second thresholds may be 8, 16, 32, etc., and the first threshold may be equal to the second threshold.

For example, in this disclosure, if the width is less than a third threshold and the height is greater than a fourth threshold, then it is determined to use the SAWP mode for the current block. As can be seen, one possible limitation is to use the SAWP mode only when the block width is less than (or less than or equal to) the third threshold and the block height is greater than (or greater than or equal to) the fourth threshold. The values of the third and fourth thresholds may be 8, 16, 32, etc., and the third threshold may be equal to the fourth threshold.

Furthermore, in the implementations of this disclosure, limitations on the block size for which the SAWP mode may be used may also be achieved through sample parameter restrictions.

For example, in this disclosure, the decoder may first determine a sample parameter of the current block, and then determine whether the SAWP mode may be used for the current block based on the sample parameter and a fifth threshold. As can be seen, one possible limitation is to use the SAWP mode only when the number of samples in the block is greater than (or greater than or equal to) the fifth threshold. The value of the fifth threshold may be 8, 16, 32, etc.

In other words, in this disclosure, the SAWP mode may be used for the current block only when the size parameter of the block meets the size requirement.

Exemplarily, in this disclosure, a flag at the picture level may be used to determine whether the disclosure is used for the current decoding picture. For example, it may be configured that this disclosure is used for an intra frame (such as I frame), and is not used for an inter frame (such as B frame or P frame). Optionally, it may be configured that this disclosure is used for the inter frame, and is not used for the intra frame. Optionally, it may be configured that this disclosure is used for some inter frames but is not used for other inter frames. Since intra prediction may be used in some inter frame, this disclosure may be used for the inter frame.

A flag below the picture level but above the CU level (such as tile, slice, patch, LCU, etc.) may be used to determine whether the disclosure is used for that region.

At FIG. 20, 61, at least one of a first prediction mode or a second prediction mode for the current block is determined according to the weight derivation mode, and a weight is determined according to the weight derivation mode.

In this disclosure, after the decoder determines the prediction mode parameter for the current block, if the prediction mode parameter indicates that the SAWP mode is used to determine the prediction value of the current block, the decoder may further determine the weight derivation mode for the current block.

It should be noted that in this disclosure, the weight derivation mode is used to determine the weight(s) used for the current block. Specifically, the weight derivation mode may be a mode used to derive the weight. For a block of a given length and width, each weight derivation mode may be used to derive a weight matrix. Different weight derivation modes may be used to derive different weight matrices for blocks of the same size.

For example, in this disclosure, there are 56 weight derivation modes for AWP in AVS3 and 64 weight derivation modes for GPM in VVC.

In some implementations, at least one of the first and second prediction modes is an intra prediction mode or an inter prediction mode.

In some implementations, before determining the first and second prediction modes according to the weight derivation mode, the decoder first determines types of the first and second prediction modes. The types of the first and second prediction modes may be determined according to a first flag carried in the bitstream. That is, the bitstream contains the first flag which indicates whether the first prediction mode and the second prediction mode belong to the intra prediction mode. Based on this, before operations at FIG. 20, 61 mentioned above, the method in implementations of this disclosure further includes the following operations.

The bitstream is parsed to obtain the first flag, the first flag indicating whether the first prediction mode and the second prediction mode belong to the intra prediction mode.

The types of the first prediction mode and the second prediction mode are determined according to the first flag.

For example, when the first flag has a first value, it indicates that both the first and second prediction modes are inter prediction modes. In this case, mode0IsInter and mode1IsInter are both equal to 1, where mode0IsInter indicates whether the first prediction mode is an inter prediction mode, and mode1IsInter indicates whether the second prediction mode is an inter prediction mode. If the first prediction mode is an inter prediction mode, mode0IsInter is equal to 1. If the second prediction mode is an inter prediction mode, mode1IsInter is equal to 1.

For example, when the first flag has a second value, it indicates that the first prediction mode is an intra prediction mode and the second prediction mode is an inter prediction mode. In this case, mode0IsInter is equal to 0 and mode1IsInter is equal to 1.

For example, when the first flag has a third value, it indicates that the first prediction mode is an inter prediction mode and the second prediction mode is an intra prediction mode. In this case, mode0IsInter is equal to 1 and mode1IsInter is equal to 0.

For example, when the first flag has a fourth value, it indicates that both the first and second prediction modes are intra prediction modes. In this case, mode0IsInter is equal to 0 and mode1IsInter is equal to 0.

This disclosure does not limit the specific values of the first, second, third, and fourth values.

Optionally, the first value is 0.
Optionally, the second value is 1.
Optionally, the third value is 2.
Optionally, the fourth value is 3.

In one example, the field "intra_mode_idx" may be used to represent the first flag.

In some implementations, the first flag carried in the bitstream is as illustrated in Table 11.

After the decoder parses the bitstream to obtain the first flag and determines the types of the first prediction mode and the second prediction mode according to the first flag, the decoder performs operations at FIG. 20, 61. In this case, the operations at FIG. 20, 61 includes the following.

If at least one of the first and second prediction modes is an intra prediction mode, the weight derivation mode is used to determine at least one of the first and second prediction modes.

The manner of determining at least one of the first and second prediction modes based on the weight derivation mode includes but is not limited to the following.

Manner 1: if either the first or second prediction mode is an intra prediction mode, an angle index is determined according to the weight derivation mode, and an intra prediction mode corresponding to the angle index is determined as the first or second prediction mode.

The angle index indicates an angle index of the boundary line of the weight.

In some implementations, the angle index is represented by the field "angleIdx".

Table 2 above illustrates the correspondence between merge_gpm_partition_idx and angleIdx. Based on Table 2, the decoder may derive the angle index according to the weight derivation mode. Then, with reference to the correspondence between the angle indice and the intra prediction modes illustrated in Table 5, the decoder determines the intra prediction mode corresponding to the angle index. For example, if the angle index determined according to the weight derivation mode is 2, the corresponding intra prediction mode is 42, and then intra prediction mode 42 is determined as the first or second prediction mode.

Manner 2: if the first prediction mode and/or the second prediction mode is an intra prediction mode, the intra prediction mode corresponding to the weight derivation mode is obtained, and the first and/or second prediction mode is determined based on the intra prediction mode corresponding to the weight derivation mode.

In manner 2, if the first prediction mode and/or the second prediction mode is an intra prediction mode, the first and/or second prediction mode is determined from the intra prediction mode corresponding to the weight derivation mode. For example, the first and/or second prediction mode may be an intra prediction mode that is on or near the same line as the weight partition line (also known as the boundary line). Alternatively, the first and/or second prediction mode may be an intra prediction mode that is perpendicular or near perpendicular to the weight partition line. For example, if the weight boundary line is horizontal, such as mode 18, 19, 50, or 51 in GPM in FIG. 1, the first and/or second prediction mode may be horizontal mode 18 and vertical mode 50.

As may be seen from the above, there are many types of intra prediction modes corresponding to the weight derivation mode, including an intra prediction mode parallel to the boundary line of the weight, an intra prediction mode perpendicular to the boundary line, and the like. In this disclosure, a flag(s) may be used to indicate which mode in the intra prediction modes corresponding to the weight derivation mode is selected as the first and/or second prediction mode.

For example, if the first prediction mode is an intra prediction mode, a second flag is used to indicate the correspondence between the first prediction mode and the intra prediction modes corresponding to the weight derivation mode. For example, the second flag indicates that the first prediction mode is the intra prediction mode parallel to the boundary line of the weight, or indicates that the first prediction mode is the intra prediction mode perpendicular to the boundary line of the weight.

For example, if the second prediction mode is an intra prediction mode, a third flag is used to indicate the correspondence between the second prediction mode and the intra prediction modes corresponding to the weight derivation mode. For example, the third flag indicates that the second prediction mode is the intra prediction mode parallel to the boundary line of the weight, or indicates that the second prediction mode is the intra prediction mode perpendicular to the boundary line of the weight.

Based on this, the manner 2 for determining the first prediction mode and/or the second prediction mode according to the intra prediction mode corresponding to the weight derivation mode includes but is not limited to the following examples.

In one example, if the first prediction mode is an intra prediction mode, the second flag is obtained by parsing the bitstream, and an intra prediction mode corresponding to the second flag in the intra prediction modes corresponding to the weight derivation mode is determined as the first prediction mode.

In another example, if the second prediction mode is an intra prediction mode, the third flag is obtained by parsing the bitstream, and an intra prediction mode corresponding to the third flag in the intra prediction modes corresponding to the weight derivation mode is determined as the second prediction mode.

In some implementations, the intra prediction mode corresponding to the weight derivation mode includes at least one of the intra prediction mode parallel to the boundary line of the weight and the intra prediction mode perpendicular to the boundary line.

Optionally, when the second flag has a fifth value, such as 0, it indicates that the first prediction mode is the intra prediction mode parallel to the boundary line of the weight in the intra prediction modes corresponding to the weight derivation mode. When the second flag has a sixth value, such as 1, it indicates that the first prediction mode is the intra prediction mode perpendicular to the boundary line of the weight in the intra prediction modes corresponding to the weight derivation mode.

Optionally, when the third flag has the fifth value, such as 0, it indicates that the second prediction mode is the intra prediction mode parallel to the boundary line of the weight in the intra prediction modes corresponding to the weight derivation mode. When the third flag has the sixth value, such as 1, it indicates that the second prediction mode is the intra prediction mode perpendicular to the boundary line of the weight in the intra prediction modes corresponding to the weight derivation mode.

In some implementations, the intra prediction mode corresponding to the weight derivation mode includes at least one of the intra prediction mode parallel to the boundary line of the weight, the intra prediction mode perpendicular to the boundary line, and the planar mode.

Optionally, when the second flag has the fifth value, such as 0, it indicates that the first prediction mode is the intra prediction mode parallel to the boundary line of the weight in the intra prediction modes corresponding to the weight derivation mode. When the second flag has the sixth value, such as 1, it indicates that the first prediction mode is the intra prediction mode perpendicular to the boundary line of the weight in the intra prediction modes corresponding to the weight derivation mode. When the second flag has a seventh value, such as 2, it indicates that the first prediction mode is the planar mode.

Optionally, when the third flag has the fifth value, such as 0, it indicates that the second prediction mode is the intra prediction mode parallel to the boundary line of the weight in the intra prediction modes corresponding to the weight derivation mode. When the third flag has the sixth value, such as 1, it indicates that the second prediction mode is the intra prediction mode perpendicular to the boundary line of the weight in the intra prediction modes corresponding to the weight derivation mode. When the third flag has the seventh value, such as 2, it indicates that the second prediction mode is the planar mode.

In one example, the field "intra_gpm_idx0" is used to represent the second flag.

In one example, the field "intra_gpm_idx1" is used to represent the third flag.

In some implementations, if both the first prediction mode and the second prediction mode are intra prediction modes, the second flag has a different value from the third flag.

At FIG. 20, 62, the prediction value is determined based on the first prediction mode, the second prediction mode, and the weight.

In some implementations, the above prediction process is carried out on a sample basis, and the weight above represents the weights corresponding to the samples. In this case, when predicting the current block, the first intra prediction mode is used to predict certain sample A in the current block to obtain a first prediction value of sample A. The second intra prediction mode is used to predict sample A to obtain and the second prediction value of sample A is obtained. The first and second prediction values are then weighted according to the weight corresponding to sample A to obtain a new prediction value of sample A. This process is repeated for each sample in the current block to obtain the prediction value for each sample in the current block. The prediction values corresponding to the samples in the current block form the prediction value for the current block.

In one example, if both the first and second prediction modes are intra prediction modes, the first intra prediction mode is used for prediction to obtain the first prediction value, the second intra prediction mode is used for prediction to obtain the second prediction value, and the first and second prediction values are then weighted according to the weight to obtain the new prediction value. For example, the first intra prediction mode is used to predict sample A to obtain the first prediction value of sample A, the second intra prediction mode is used to predict sample A to obtain the second prediction value of sample A, and the first and second prediction values are then weighted according to the weight of sample A to obtain the new prediction value of sample A.

In another example, if the first prediction mode is an intra prediction mode and the second prediction mode is an inter prediction mode, the intra prediction mode is used for prediction to obtain the first prediction value, and the inter prediction mode is used for prediction to obtain the second prediction value. The first prediction value and the second prediction value are then weighted according to the weight to obtain a new prediction value. In this example, the intra prediction mode is used to predict each sample in the current block to obtain prediction values of all samples, which constitute the first prediction value of the current block. The inter prediction mode is used to search for a best matching block of the current block within a predetermined search range, and the best matching block is determined as the second prediction value of the current block. Based on the weights of each sample in the current block, the first prediction value and the second prediction value of the current block are weighted on a sample basis to obtain the new prediction value of the current block. For example, for sample A in the current block, a first prediction value corresponding to sample A in the first prediction value of the current block and a second prediction value corresponding to sample A in the second prediction value of the current block are weighted according to the weight of sample A, so as to obtain a new prediction value of sample A.

In the prediction method provided in the implementations of the disclosure, the weight derivation mode for the current block is determined by parsing the bitstream, at least one of the first prediction mode or the second prediction mode for the current block is determined according to the weight derivation mode, the weight is determined according to the weight derivation mode, and the prediction value is determined based on the first prediction mode, the second prediction mode, and the weight. That is, in the implementations of the disclosure, the decoder may determine two different prediction values based on two different prediction modes, and then combine the prediction values with diverse weights to obtain a more complex prediction value, thereby improving the accuracy of the prediction. Meanwhile, the decoder may also determine the first prediction mode and/or the second prediction mode based on the correlation between the weight and the prediction modes, which can greatly reduce complexity without transmitting the prediction modes in the bitstream, thereby reducing the bitstream overhead. Therefore, the prediction method proposed in this disclosure can improve compression performance by enhancing prediction quality while reducing complexity and bitstream overhead.

The method in implementations of the disclosure will be described below with an example in which the first prediction mode is a first intra prediction mode and the second prediction mode is a second intra prediction mode.

Figure 21:
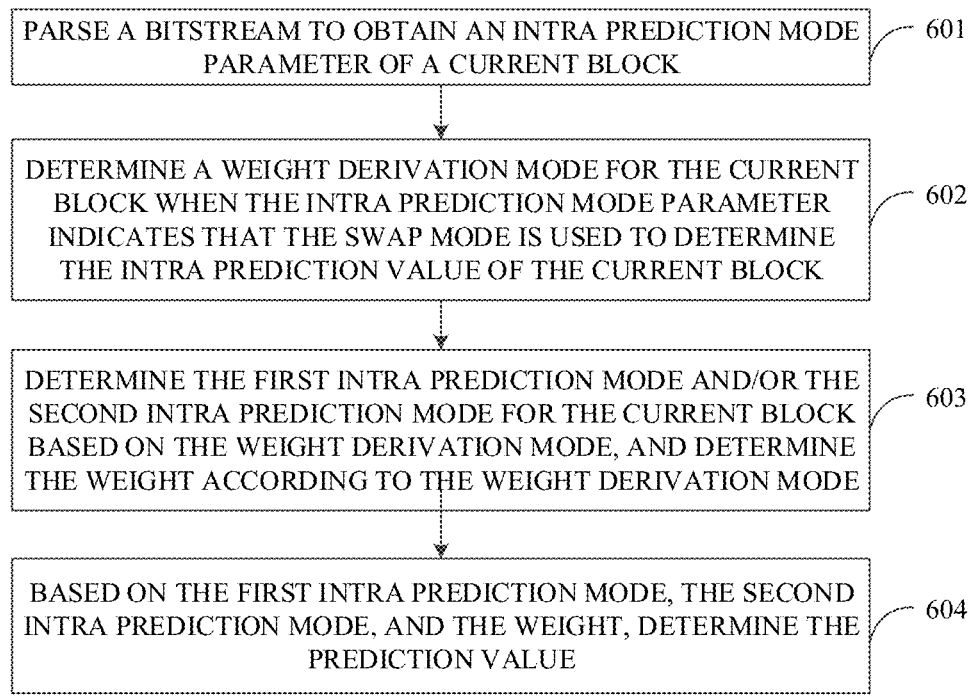
FIG. 21 is a schematic implementation flowchart of a prediction method.

FIG. 21 illustrates a schematic implementation flowchart of a prediction method. As illustrated in FIG. 21, the intra prediction method performed by the decoder may include the following.

At 601, a bitstream is parsed to obtain an intra prediction mode parameter of a current block.

In implementations of the disclosure, the decoder parse the bitstream to obtain the intra prediction mode parameter of the current block.

It should be noted that in the implementations of the disclosure, the intra prediction mode parameter may indicate whether the SAWP mode could be used for prediction of the current block, that is, indicate whether two different prediction modes could be used for prediction of the current block.

It may be understood that in the implementations of the disclosure, the intra prediction mode parameter may be understood as a flag indicating whether the SAWP mode is used or not. Specifically, the decoder parses the bitstream to determine a variable as the intra prediction mode parameter, so that the intra prediction mode parameter may be determined through the value of the variable.

It should be noted that in the implementations of the disclosure, the SAWP mode is a type of intra prediction method. Specifically, in the SAWP mode, two different intra prediction modes are determined for the current block, and then two prediction values are determined based on these two different intra prediction modes. Then a weight is determined to combine the two prediction values according to the weight, resulting in a new prediction value, which is the prediction value of the current block.

Further, in implementations of this disclosure, limitations may be imposed on the block size when applying the SAWP mode.

It may be understood that, since the intra prediction method proposed in this disclosure requires the use of two different intra prediction modes to generate two prediction values, which are then weighted to obtain a new prediction value, in order to reduce complexity while considering the trade-off between compression performance and complexity, the SAWP mode may not be used for blocks with certain sizes in implementations of the disclosure. Thus, in this disclosure, the decoder may first determine a size parameter of the current block, and then determine whether to use the SAWP mode for the current block based on the size parameter.

It should be noted that in the implementations of the disclosure, the size parameter of the current block may include both a height and a width of the block, so the decoder may limit the use of the SAWP mode based on the height and width of the current block, that is, limit the size of the block for which the SAWP mode can be used.

For example, in this disclosure, if the width is greater than a first threshold and the height is greater than a second threshold, then it is determined to use the SAWP mode for the current block. As can be seen, one possible limitation is to use the SAWP mode only when the block width is greater than (or greater than or equal to) the first threshold and the block height is greater than (or greater than or equal to) the second threshold. The values of the first and second thresholds may be 8, 16, 32, etc., and the first threshold may be equal to the second threshold.

For example, in this disclosure, if the width is less than a third threshold and the height is greater than a fourth threshold, then it is determined to use the SAWP mode for the current block. As can be seen, one possible limitation is to use the SAWP mode only when the block width is less than (or less than or equal to) the third threshold and the block height is greater than (or greater than or equal to) the fourth threshold. The values of the third and fourth thresholds may be 8, 16, 32, etc., and the third threshold may be equal to the fourth threshold.

Furthermore, in the implementations of this disclosure, limitations on the block size for which the SAWP mode may be used may also be achieved through sample parameter restrictions.

For example, in this disclosure, the decoder may first determine a sample parameter of the current block, and then determine whether the SAWP mode may be used for the current block based on the sample parameter and a fifth threshold. As can be seen, one possible limitation is to use the SAWP mode only when the number of samples in the block is greater than (or greater than or equal to) the fifth threshold. The value of the fifth threshold may be 8, 16, 32, etc.

In other words, in this disclosure, the SAWP mode may be used for the current block only when the size parameter of the block meets the size requirement.

Exemplarily, in this disclosure, a flag at the picture level may be used to determine whether the disclosure is used for the current decoding picture. For example, it may be configured that this disclosure is used for an intra frame (such as I frame), and is not used for an inter frame (such as B frame or P frame). Optionally, it may be configured that this disclosure is used for the inter frame, and is not used for the intra frame. Optionally, it may be configured that this disclosure is used for some inter frames but is not used for other inter frames. Since intra prediction may be used in some inter frame, this disclosure may be used for the inter frame.

A flag below the picture level but above the CU level (such as tile, slice, patch, LCU, etc.) may be used to determine whether the disclosure is used for that region.

At 602, a weight derivation mode for the current block is determined when the intra prediction mode parameter indicates that the SAWP mode is used to determine the intra prediction value of the current block.

In implementations of the disclosure, after the decoder determines the intra prediction mode parameter for the current block, if the intra prediction mode parameter indicates that the SAWP mode is used to determine the intra prediction value of the current block, the decoder may further determine the weight derivation mode for the current block.

It should be noted that in this disclosure, the weight derivation mode is used to determine the weight(s) used for the current block. Specifically, the weight derivation mode may be a mode used to derive the weight. For a block of a given length and width, each weight derivation mode may be used to derive a weight matrix. Different weight derivation modes may be used to derive different weight matrices for blocks of the same size.

For example, in this disclosure, there are 56 weight derivation modes for AWP in AVS3 and 64 weight derivation modes for GPM in VVC.

At 603, the first intra prediction mode and/or the second intra prediction mode for the current block is determined based on the weight derivation mode, and the weight is determined according to the weight derivation mode.

In the implementations of this disclosure, if the intra prediction mode parameter indicates that the SAWP mode is used to determine the intra prediction value of the current block, after the decoder determines the weight derivation mode for the current block, the decoder may first determine the first intra prediction mode and/or the second intra prediction mode for the current block based on the weight derivation mode, and determine the weight according to the weight derivation mode.

It should be noted that in implementations of the disclosure, each of the first intra prediction mode and the second intra prediction mode may be any intra prediction mode commonly used at present, including but not limited to DC, Planar, Bilinear, angular prediction mode, etc.

Optionally, in the disclosure, in a broader understanding, the intra prediction mode further includes some techniques to improve the prediction, such as fractional sample interpolation which improves reference samples, filtering of prediction samples, etc., such as MIPF, IPF.

Accordingly, in this disclosure, intra prediction models like DC, Planar, Bilinear, and angular prediction modes may be referred to as basic intra prediction modes, and techniques like MIPF and IPF that improve predictions may be referred to as improved intra prediction modes. The basic intra prediction modes may be used to generate prediction values independently without relying on other intra prediction modes, that is, once reference samples and the basic intra prediction mode have been determined, prediction values may be calculated. In comparison, the improved intra prediction modes cannot be used to independently generate prediction values, relying on basic intra prediction modes to determine prediction values instead. For example, in a certain angular intra prediction mode, the prediction value may be generated according to the reference samples, while in MIPF, based on this angular intra prediction mode, different filters may be used for samples at different positions to generate or determine the prediction value.

Exemplarily, in this disclosure, both the first intra prediction mode and the second intra prediction mode may be basic intra prediction modes, that is, two different basic intra prediction modes are used in this implementation. In this case, the improved intra prediction mode may be combined with the first intra prediction mode and the second intra prediction mode respectively to generate a first prediction value and a second prediction value. In addition, after a "new prediction value" is generated in this implementation of the disclosure, the new prediction value may be further improved by the improved intra prediction mode to obtain an updated prediction value.

Exemplarily, in this disclosure, the first intra prediction mode and the second intra prediction mode may also be a combination of a basic intra prediction mode and an improved intra prediction mode. That is to say, a combination of two different intra prediction modes are used in this implementation of the disclosure. For example, the same angular prediction mode is used for both the first intra prediction mode and the second intra prediction mode, but the improved intra prediction mode such as IPF is not used for the first intra prediction mode and is used for the second intra prediction mode. Alternatively, the same angular prediction mode is used for both the first intra prediction mode and the second intra prediction mode, but a certain option of the improved intra prediction method is used for the first intra prediction mode while another option of the improved intra prediction method is used for the second intra prediction mode. After the "new prediction value" is obtained, the new prediction value may be further improved using the improved intra prediction mode to obtain an updated prediction value.

As can be seen, in the intra prediction method proposed in the implementations of the disclosure, based on the first intra prediction mode and the second intra prediction mode, two different prediction values may be determined for the current block, a weight may be determined, and the two prediction values may be combined based on the weight to obtain the new prediction value.

Each point in the current block corresponds to a weight, and these weights form a weight map or weight matrix.

Furthermore, in implementations of the disclosure, not all points in every possible weight matrix have equal weight values. In other words, at least one possible weight matrix contains at least two different weight values.

Optionally, in the disclosure, all possible weight matrices contain at least two different weight values.

Optionally, in the disclosure, a part of weight matrices contain at least two different weight values. For example, if the minimum weight value is 0 and the maximum weight value is 8, there may be a matrix where some points are equal to 0 while some points are equal to 8. Correspondingly, some matrices only contain one single weight value. For example, in the disclosure, all points in a certain weight matrix are equal to 4.

Optionally, in this disclosure, there are only two weight values in a weight matrix, where one weight value represents that the prediction value of the corresponding point comes entirely from the first prediction value, and another weight value represents that the prediction value of the corresponding point comes entirely from the second prediction value. For example, in this disclosure, there are only two weight values in a weight matrix, which are 0 and 1.

Optionally, in this disclosure, there may be multiple weight values in a weight matrix, where the maximum value or the minimum value (such as 0) respectively represent that the prediction value of the corresponding point comes entirely from the value of the corresponding point in either the first prediction value or the second prediction value. The non-maximum and non-minimum weight value represent that the prediction value of the corresponding point is a weighted average of values of the corresponding points in the first prediction value and the second prediction value. The area formed by these maximum or minimum weight values may be called blending area.

It should be noted that in this disclosure, for a case where the weight matrix has only two weight values, positions where the weight values change will form a straight line. For a case where the weight matrix has multiple weight values, positions where the weight values are the same in the blending area form a straight line (segment). The straight line may be completely horizontal or vertical, or may not be completely horizontal or vertical.

Optionally, in this disclosure, for the case where the weight matrix has only two weight values, positions where the weight values change will form a curve line (segment). For the case where the weight matrix has multiple weight values, positions where the weight values are the same in the blending area form a curve line (segment).

Furthermore, in implementations of the disclosure, the decoder may determine the weight(s) using a method similar to GPM or AWP. Specifically, in the same coding standard or codec, if GPM or AWP is used, then such method may also be used to determine the weight, so that some common logics may be reused. For instance, AWP is used in inter prediction in AVS3, so it is possible to use AWP for determining the weight in AVS3. Additionally, other methods different from GPM or AWP could also be used in the same coding standard or codec, for example, using different numbers of modes, different algorithms for blending areas, different parameters, etc. Inter prediction utilizes temporal correlation, where a reconstructed block in the reference picture is used as the reference block. Intra prediction utilizes spatial correlation, where reconstructed samples around the current block are used as reference samples. The closer the distance in space, the stronger the correlation, while the farther the distance, the weaker the correlation. Therefore, if a certain weight makes that a prediction value is obtained using sample positions that are far from reference sample(s), then such weight may not be able to produce more suitable prediction values than existing technology, and thus such weight may be abandoned. Rather, the weight may be used in inter prediction.

It should be noted that two intra prediction modes are required in the implementations of the disclosure whereas generally only one intra prediction mode is required in other common intra prediction methods. Therefore, the manner for encoding the intra prediction modes used in the implementations may differ from those in other common intra prediction methods. Correspondingly, the MPM construction method used in the implementations may also differ from those in other common intra prediction methods.

Furthermore, in implementations of the disclosure, the proposed intra prediction method requires transmission of information of the weight derivation mode and information of the two intra prediction modes in the bitstream. Taking AWP in AVS3 as an example, the weight derivation mode has 56 modes, inverse binarization of which requires 5 to 6 bits. Taking AVS as an example, the intra prediction mode has 66 modes using two MPMs. If the intra prediction mode is an MPM, then inverse binarization requires 1 bits, otherwise 7 bits are required. This means that in AVS3, the above information requires an overhead of at most 6+7+7=20 bits.

To reduce aforementioned inverse binarization overhead and improve coding performance, in implementations of the disclosure, the decoder may use correlation between the intra prediction modes and weights for the current block to determine the above information. Specifically, there may be some correlation between the intra prediction modes and weights used for the current block. Using such correlation, the decoder may utilize weight information in decoding the intra prediction modes. Further, the decoder may utilize information of the weight derivation mode in decoding the intra prediction modes.

Further, in implementations of the disclosure, in the case that the weight matrix has two weight values, the positions where the weight values change form a straight light, or in the case that the weight matrix has multiple weight values, the positions where the weight values are the same in the blending area form a straight line. The boundary line itself also has an angle. This straight line may be called the boundary line. The angle horizontal to the right may be set to 0 degree, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a block, the corresponding texture is likely to show different characteristics on two sides of the boundary line, such as textures with two different angles on two sides of the boundary line, or an angular texture on one side of the boundary line, while a flat texture on the other side of the boundary line. Since the boundary line itself also has an angle, it may be assumed that the boundary line is obtained through intra angular prediction with a point, which may be close to some textures of the current block, so there is correlation between this straight line and the two intra prediction modes for the current block.

Specifically, in this disclosure, assuming that the boundary line is obtained through angular intra prediction with a point, at least one angular intra prediction mode may be found, which may be used to approximately create the boundary line. For example, a horizontal boundary line matches a horizontal intra prediction mode, such as mode 24 in AVS3. A vertical boundary line matches a vertical intra prediction mode, such as mode 12 in AVS3. A 45-degree boundary line may match a 45-degree intra prediction mode from bottom-left to upper-right, such as mode 30 in AVS3, or a 225-degree intra prediction mode from upper-right to bottom-left, such as mode 6 in AVS3. If the weight matrix has only one weight value, the weight matrix may match a mode without an obvious angle, such as DC, Planar, Bilinear, etc. Thus, the weight derivation mode may match some intra prediction modes, and the weight derivation mode may be used to assist in decoding of the intra prediction modes.

It should be noted that in this disclosure, the weight derivation mode may also be the index of the weight, for example, the 56 modes of AWP may be considered as 56 weight derivation modes.

By way of example, in this disclosure, a mapping table may be constructed to further represent the mapping relationship between weight derivation modes and angular intra prediction modes. Specifically, the boundary lines for multiple modes of AWP and GPM are at the same angle, for example, for AWP of AVS3, the boundary lines for every 8 modes are at the same angle. There are seven angles of the boundary lines for 56 AWP modes. The angle index of the boundary line may be obtained by taking the mode number of the weight derivation mode modulo 8 (%8). For example, Table 7 is a mapping table taking angular modes in AVS3 as an example. The indices 0 and 1 of boundary line angle correspond to two intra angular prediction modes respectively: one from upper right to bottom left and one from upper left to bottom right. In a specific implementation, another approximately corresponding intra angular prediction mode may be found for another boundary line angle index, or all indices of boundary line angle correspond to one intra angular prediction mode.

Furthermore, in this disclosure, it is observed that generally reference samples on the left and top sides of current block are used for intra prediction, and closer spatial distance between samples indicates stronger correlation while farther spatial distance indicates weaker correlation. Therefore, if only a part of samples in the current block is predicted by using one prediction mode, then positions of the part of samples will affect probability of intra prediction modes used for the part. That is, the position and angle of the boundary line mentioned above will affect selection of the two intra prediction modes for two sides of the boundary line. FIG. 15 is a schematic diagram illustrating intra prediction.

Further, in implementations of the disclosure, when determining the first intra prediction mode and/or the second intra prediction mode for the current block according to the weight derivation mode, the decoder may first determine a mode list (MPM list) by using the weight derivation mode. Then, based on the mode list, the encoder may further determine the first intra prediction mode and the second intra prediction mode.

Specifically, in implementations of the disclosure, when determining the first intra prediction mode and the second intra prediction mode using the correlation with the weight, the mode list may be constructed by using the weight derivation mode, or the MPM may be constructed using information about the weight derivation mode. The weight derivation mode may correspond to at least one intra prediction mode, so the decoder may add the intra prediction mode corresponding to the weight derivation mode determined for current block into the mode list or add several intra prediction modes related to the intra prediction mode corresponding to the weight derivation mode into the mode list.

Further, in implementations of the disclosure, when determining the mode list by using the weight derivation mode, the decoder may first determine an intra prediction mode corresponding to an adjacent block of the current block, and determine the intra prediction mode corresponding to the adjacent block as a mode to-be-added. After determining that the mode to-be-added meets a preset adding condition, the decoder may add the mode to-be-added to the mode list, that is, add the intra prediction mode corresponding to the adjacent block of the current block to the mode list. Next, if the mode list does not reach a preset list-length, the decoder may determine a related intra prediction mode corresponding to the weight derivation mode, and determine the related intra prediction mode corresponding to the weight derivation mode as the mode to-be-added. When determining that the mode to-be-added meets the preset adding condition, the decoder may add the mode to-be-added to the mode list, that is, add the related intra prediction mode corresponding to the weight derivation mode to the mode list.

It should be noted that in implementations of the disclosure, when adding the intra prediction mode corresponding to the adjacent block to the mode list, the decoder may first determine order parameters each corresponding to an adjacent block, and add the intra prediction modes corresponding to the adjacent blocks to the mode list sequentially according to the order parameters. The decoder may determine the corresponding order parameter according to the spatial distance between the adjacent block and the current block. For example, the closer the spatial distance between the adjacent block and the current block, the stronger the correlation between the adjacent block and the current block, and the earlier the addition process, that is, the smaller the order parameter. The farther the spatial distance between the adjacent block and the current block, the weaker the correlation, and the later the addition process, that is, the larger the order parameter.

Further, in implementations of the disclosure, for determining the related intra prediction mode corresponding to the weight derivation mode, the decoder may first determine an intra prediction mode corresponding to the weight derivation mode, and based on the intra prediction mode corresponding to the weight derivation mode, the decoder may determine the related intra prediction mode according to a first index interval.

For example, in implementations of this disclosure, when determining several intra prediction modes related to the intra prediction mode corresponding to the weight derivation mode, the decoder may select, according to the first index interval, a mode with an index number that differs by a certain value from the index number of the intra prediction mode corresponding to the weight derivation mode, for example, differs by 1 or 2. For example, assuming that an index number for the intra prediction mode corresponding to the weight derivation mode is 10 and the first index interval is 2, then two intra prediction modes with index numbers 8 and 12 may be determined as two intra prediction modes related to the intra prediction mode corresponding to the weight derivation mode.

It should be noted that in implementations of this disclosure, after the decoder adds the intra prediction mode corresponding to the adjacent block of the current block to the mode list, or adds the related intra prediction mode corresponding to the weight derivation mode to the mode list, if the mode list does not reach the preset list-length, that is, the mode list is not full, then the decoder may continue to determine a preset prediction mode as the mode to-be-added. When the mode to-be-added meets the preset adding condition, the decoder may add the mode to-be-added to the mode list, that is, add the preset prediction mode to the mode list.

It should be noted that the preset prediction mode in this disclosure includes one or more of different modes like a DC mode, a Bilinear mode, and a Planar mode.

Further, in implementations of this disclosure, after the decoder adds the intra prediction mode corresponding to the adjacent block of the current block, the related intra prediction mode corresponding to the weight derivation mode, and the preset prediction mode to the mode list, if the mode list does not reach the preset list-length, that is, the mode list is not full, then the decoder may determine an associated intra prediction mode using the prediction modes in the mode list, and determine the associated intra prediction mode as the mode to-be-added. When the mode to-be-added meets the preset adding condition, the decoder may add the mode to-be-added to the mode list, that is, add to the mode list the associated intra prediction mode corresponding to the mode list.

In other words, in this disclosure, after the the intra prediction mode corresponding to the adjacent block of the current block, the related intra prediction mode corresponding to the weight derivation mode, and the preset prediction mode are added to the mode list sequentially, if the mode list is not full, then the decoder may determine the associated intra prediction mode based on the existing prediction modes in the mode list, and then add the associated intra prediction mode to the mode list.

For example, in this disclosure, based on any one prediction mode in the mode list, the decoder may determine the associated intra prediction mode related to the one prediction mode according to a second index interval. The decoder may select, according to the second index interval, a mode with an index number that differs by a certain value from the index number of the one prediction mode, for example, differs by 1 or 2.

It should be noted that in implementations of this disclosure, regardless of whether the intra prediction mode corresponding to the adjacent block of the current block, the related intra prediction mode corresponding to the weight derivation mode, the preset prediction mode, or the associated intra prediction mode is taken as the mode to-be-added, the decoder needs to determine whether the mode to-be-added meets the preset addition condition. Specifically, if the mode to-be-added exists and is different from all prediction modes in the mode list, it is determined that the mode to-be-added meets the preset addition condition, and the mode to-be-added will be added to the mode list.

Correspondingly, if the mode to-be-added does not exists or is the same as (identical to) a prediction mode in the mode list, it is determined that the mode to-be-added does not meet the preset addition condition, and the mode to-be-added will not be added to the mode list. Instead, the mode to-be-added will be directly discarded.

It can be understood that in this disclosure, since two intra prediction modes are required for intra prediction of the current block, it is possible to refer to intra prediction modes for more positions when constructing the MPM list, or refer to more intra prediction modes for the adjacent blocks. Correspondingly, in this disclosure, the length of the mode list used for the current block may be different from a length of other mode list of intra prediction modes. Because the codeword for binarization of the MPM is shorter than the codeword for binarization of other modes, increasing the probability that the two intra prediction modes are MPMs can improve the coding efficiency.

It should be noted that in the disclosure, in order to ensure that the first intra prediction mode and the second intra prediction mode for current block are different, when constructing the mode list, the decoder should ensure that the intra prediction mode added to the mode list each time is not duplicated with any existing intra prediction mode in the mode list.

Further, in implementations of the disclosure, when determining the mode list by using the weight derivation mode, the decoder may first determine a list construction strategy corresponding to the weight derivation mode, and then determine the mode list according to the list construction strategy.

That is, in the disclosure, for different weights, that is, for different weight derivation modes, the decoder may construct the mode list by using different list construction strategies. For example, based on the list construction strategy, in a case that the boundary line of the weight is 0 degree or 90 degrees, that is, horizontal or vertical, the decoder may consider intra prediction modes corresponding to the weight for construction of the mode list. For other cases, the decoder may not consider the intra prediction modes corresponding to the weight.

Exemplarily, in this disclosure, assuming that the boundary line of the weight is 0 degree, such as modes 2, 10, etc. of AWP (counting from 0), the horizontal intra prediction mode 24 may be added to candidates of the mode list when constructing the mode list. Assuming that the boundary line of the weight is 90 degrees, such as modes 6, 14, etc. of AWP (counting from 0), the vertical intra prediction mode 12 may be added to the candidates of the mode list when constructing the mode list.

It is understood that in the present disclosure, it is also possible to add the horizontal intra prediction mode, or the horizontal intra prediction mode and similar intra prediction modes, to the candidates of the mode list when the boundary line of the weight is in a range around 0 degrees; and to add the vertical intra prediction mode, or the vertical intra prediction mode and similar intra prediction modes, to the candidates of the mode list when the boundary line of the weight is in a range around 90 degrees.

It can be understood that in the present disclosure, the two intra prediction modes used for intra prediction of the current block are not the same, i.e., the first intra prediction mode is not the same as the second intra prediction mode, so that the second intra prediction mode may exclude the possibility of the first intra prediction mode during decoding. In other words, the second intra prediction mode may be decoded using the information of the first intra prediction mode.

In implementations of the present disclosure, further, the decoder may set an alternate intra prediction mode during constructing the mode list. The alternate intra prediction mode is not the same as any intra prediction mode in the mode list.

Specifically, in the present disclosure, in order to ensure that the first intra prediction mode and the second intra prediction mode used for the current block are not the same, the second intra prediction mode may be determined depending on the first intra prediction mode. When determining the first intra prediction mode and/or the second intra prediction mode based on the mode list, the decoder may first determine one of the prediction modes in the mode list as the first intra prediction mode, and then determine the second intra prediction mode based on the first intra prediction mode and the mode list.

Further, in implementations of the present disclosure, after determining the prediction mode in the mode list as the first intra prediction mode, the decoder may remove the first prediction mode from the mode list and then add the alternate intra prediction mode to the mode list, so that an updated mode list may be obtained. A prediction mode may then be selected from the updated mode list and determined as the second intra prediction mode. Any selection method may be used.

In other words, in implementations of the present disclosure, if an MPM is selected for the first intra prediction mode, in order to ensure that the first intra prediction mode and the second intra prediction mode used for the current block are not the same, then the number of MPMs available for the second intra prediction mode is reduced by one. In order not to change the length of the mode list available for the first intra prediction mode and the second intra prediction mode, the decoder may add another MPM to the mode list after determining the first intra prediction mode. That is, the preset alternate intra prediction mode is added to the mode list. Therefore, the second intra prediction mode may be determined using the same number of MPMs as the first intra prediction mode.

Exemplarily, in this disclosure, assuming that the first intra prediction mode and the second intra prediction mode have N optional MPMs, when constructing the mode list, N MPMs and 1 alternate MPM may be constructed first. For the first intra prediction mode, the optional MPMs are the above-mentioned N MPMs. If one of the MPMs is selected for the first intra prediction mode, then for the second intra prediction mode, the MPM selected for the first intra prediction mode is removed, and then the alternate MPM is added to the mode list. In this way, the second intra prediction mode still has N optional MPMs.

In implementations of the present disclosure, furthermore, the decoder may set a length parameter of the mode list to be (N+1) during constructing the mode list, where N is a positive integer.

Specifically, in the present disclosure, the second intra prediction mode may be determined depending on the first intra prediction mode in order to ensure that the first intra prediction mode and the second intra prediction mode used for the current block are not the same. When determining the first intra prediction mode and/or the second intra prediction mode based on the mode list, the decoder may determine one of the first N prediction modes in the mode list as the first intra prediction mode if the first intra prediction mode is determined by using the mode list. Then the second intra prediction mode is determined based on the first intra prediction mode and the mode list.

Further, in implementations of the present disclosure, if the first intra prediction mode is determined by using the mode list, then the decoder determines the second intra prediction mode by using remaining N prediction modes in the mode list, other than the first intra prediction mode, after determining one of the first N prediction modes of the mode list as the first intra prediction mode.

It is noted that in implementations of the present disclosure, when determining the first intra prediction mode and/or the second intra prediction mode based on the mode list, if the mode list is not used to determine the first intra prediction mode, then the decoder may directly determine one of the first N prediction modes in the mode list as the second intra prediction mode.

That is, in the implementations of the present disclosure, assuming that the number of optional MPMs for the intra prediction mode are N. In order to ensure that the first intra prediction mode and the second intra prediction mode used for the current block are not the same, (N+1) MPMs may be constructed when constructing the mode list. For the first intra prediction mode, optional MPMs are the first N MPMs in the mode list. If no MPM is selected for the first intra prediction mode, then the MPMs available for the second intra prediction mode are the first N MPMs in the mode list. If one MPM is selected for the first intra prediction mode, then the MPMs available for the second intra prediction mode are the N MPMs in the mode list other than the first intra prediction mode.

Exemplarily, in this disclosure, assuming that N is 4, then the decoder may construct a mode list including 5 MPMs. MPM[x] represents the (x+1)-th MPM, i.e., MPM[0] represents the first MPM, since the count of the array starts from 0. The first intra prediction mode is mode0 and the second intra prediction mode is mode1. Assuming that both the first intra prediction mode and the second intra prediction mode are MPMs, and the index number of the first intra prediction mode in the optional MPMs is idx0 and the index number of the second intra prediction mode in the optional MPMs is idx1, then mode0=MPM[idx0]

mode1=MPM[idx1<idx0?idx1:idx1+1]

That is, if idx1<idx0, then mode1=MPM[idx1].
Otherwise, mode1=MPM[idx1+1].

It can be seen that the values of idx0 and idx1 both range from 0 to 3, and the value of mode1 is not only related to idx1, but also related to idx0.

Exemplarily, in implementations of the disclosure, at decoding side, the decoder may determine a variable intra_luma_pred_mode0 of the first intra prediction mode and a variable intra_luma_pred_mode1 of the second intra prediction mode by parsing the bitstream. Next, the decoder may determine the first intra prediction mode intraLumaPredMode0 according to intra_luma_pred_mode0 and determine the second intra prediction mode intraLumaPredMode1 according to intra_luma_pred_mode1.

In implementations of the disclosure, it is ensured that MPM[0]<MPM[1] when constructing the MPM list. If MPM[0]>MPM[1] initially, MPM[0] and MPM[1] may be exchanged. In order to correspond with steps 2 and 5 in the following, the encoder should use the same method of constructing the MPM list.

Specifically, the correspondence between the variables intra_luma_pred_mode0 and intra_luma_pred_mode1 and binary strings are illustrated in Table 11.

| intra_luma_pred_mode | binary string | | | | | | |
|---|---|---|---|---|---|---|---|
| 0 | 1 | 0 | 0 | | | | |
| 1 | 1 | 0 | 1 | | | | |
| 2 | 1 | 1 | 0 | | | | |
| 3 | 1 | 1 | 1 | | | | |
| 4 | 0 | 0 | 0 | 0 | 0 | 0 | |
| ... | | | | ... | | | |
| binIdx | 0 | 1 | 2 | 3 | 4 | 5 | 6 |

The first bit indicates whether it is an MPM, for example, "1" indicating being an MPM and "0" indicating being not an MPM. If the first intra prediction mode is an MPM, assuming that there are 4 MPMs in the mode list, then 2 bits may be used to indicate which MPM in the mode list is used, that is, "00, 01, 10, 11" indicating the first, second, third, and fourth MPMs in the mode list respectively.

Specifically, the decoder derives intraLumaPredMode0 and intraLumaPredMode1 according to intra_luma_pred_mode0 and intra_luma_pred_mode1 as follows:

1. If the value of intra_luma_pred_mode0 is 0, then IntraLumaPredMode0 is equal to MPM[0]; otherwise, if the value of intra_luma_pred_mode0 is 1, then IntraLumaPredMode0 is equal to MPM[1]; if the value of intra_luma_pred_mode0 has a value of 2, then IntraLumaPredMode0 is equal to MPM[2]; if the value of intra_luma_pred_mode0 is 3, then IntraLumaPredMode0 is equal to MPM[3].
2. Otherwise, make the value of IntraPredMode0 to be (intra_luma_pred_mode0+EipmPuFlag×32):
    if the value of IntraPredMode0 minus 4 is less than MPM[0], IntraLumaPredMode0 is equal to IntraPredMode0 minus 2;
    otherwise, if the value of IntraPredMode0 minus 3 is greater than MPM[0] and less than MPM[1], then IntraLumaPredMode0 is equal to IntraPredMode0 minus 1;
    otherwise, IntraLumaPredMode0 is equal to IntraPredMode0.
3. if the value of intra_luma_pred_mode0 is less than 4, the value of intra_luma_pred_mode1 is less than 4, and the value of intra_luma_pred_mode1 is greater than or equal to the value of intra_luma_pred_mode0, then mpmPlus=1, otherwise mpmPlus=0;
4. if the value of intra_luma_pred_mode1 is 0, then IntraLumaPredMode1 is equal to MPM[0+mpmPlus]; otherwise, if the value of intra_luma_pred_mode1 is 1, then IntraLumaPredMode1 is equal to MPM[1+mpmPlus]; if the value of intra_luma_pred_mode1 is 2, then IntraLumaPredMode1 is equal to MPM[2+mpmPlus]; if the value of intra_luma_pred_mode1 is 3, then IntraLumaPredMode1 is equal to MPM[3+mpmPlus];
5. otherwise, make the value of IntraPredMode1 to be (intra_luma_pred_mode1+EipmPuFlag×32):
    if the value of IntraPredMode1 minus 4 is less than MPM[0], IntraLumaPredMode1 is equal to IntraPredMode1 minus 2;
    otherwise, if the value of IntraPredMode1 minus 3 is greater than MPM[0] and less than MPM[1], then IntraLumaPredMode1 is equal to IntraPredMode1 minus 1;
    otherwise, IntraLumaPredMode1 is equal to IntraPredMode1.

In the above, the binary variable eipm_pu_flag is the intra luma prediction mode extension flag, exemplarily, a value "1" indicates that the intra luma prediction extension mode should be used, and a value "0" indicates that the intra luma prediction extension mode is not used. The value of EipmPuFlag is equal to the value of eipm_pu_flag. Specifically, if eipm_pu_flag does not exists in the bitstream, then the value of EipmPuFlag is equal to 0.

Optionally, in implementations of the present disclosure, if it is only ensured that the first intra prediction mode and the second intra prediction mode used for the current block are not the same, without limiting the number of MPMs that can be selected for the first intra prediction mode and the second intra prediction mode, then the decoder may also not set the alternate intra prediction mode, or, alternatively, may not increase the length of the mode list. In this case, the decoder needs to change the method for decoding the second intra prediction mode. In other words, if one MPM in the mode list is selected for the first intra prediction mode, one less MPM can be selected for the second intra prediction mode. Since there are fewer MPMs to select for the second intra prediction mode, the method for decoding the second intra prediction mode needs to be changed.

Exemplarily, in this disclosure, the number N of MPMs is equal to 4, and the first bit indicates whether a mode is an MPM. For example, "1" means the mode is an MPM and "0"

means the mode is not an MPM. If the first intra prediction mode is an MPM, since there are 4 MPMs, 2 bits are used to indicate which MPM first intra prediction mode is, i.e., "00, 01, 10, 11" representing the first, second, third and fourth MPMs respectively. If both the first intra prediction mode and the second intra prediction mode are MPMs, then there are only 3 MPMs available for the second intra prediction mode. In this case, 1 to 2 bits may be used to indicate which MPM the second intra prediction mode is, such as "00, 01, 10" representing the remaining first, second and third MPMs respectively. As can be seen, since one possibility is excluded, the inverse binarization method can be changed to save overhead.

Exemplarily, in this disclosure, assuming that N is 4, then a mode list including 4 MPMs is constructed. MPM[x] represents the (x+1)-th MPM, i.e., MPM[0] represents the first MPM, since the count of the array starts from 0. The first intra prediction mode is mode0 and the second intra prediction mode is mode1. Assuming that both the first intra prediction mode and the second intra prediction mode are MPMs, and the index number of the first intra prediction mode in the optional MPMs is idx0 and the index number of the second intra prediction mode in the optional MPMs is idx1, then mode0=MPM[idx0]

mode1=MPM[idx1<idx0?idx1:idx1+1]

That is, if idx1<idx0, then mode1=MPM[idx1].
Otherwise, mode1=MPM[idx1+1].
As can be seen, the value of idx0 ranges from 0 to 3 and the value of idx1 ranges from 0 to 2. The value of mode1 is not only related to idx1 but also related to idx0. 2-bit inverse binarization may be used for idx0, while 1 to 2-bit inverse binarization may be used for idx1.

Exemplarily, in implementations of the disclosure, at decoding side, the decoder may determine a variable intra_luma_pred_mode0 of the first intra prediction mode and a variable intra_luma_pred_mode1 of the second intra prediction mode by parsing the bitstream. Next, the decoder may determine the first intra prediction mode intraLumaPredMode0 according to intra_luma_pred_mode0 and determine the second intra prediction mode intraLumaPredMode1 according to intra_luma_pred_mode1.

In implementations of the disclosure, it is ensured that MPM[0]<MPM[1] when constructing the MPM list. If MPM[0]>MPM[1] initially, MPM[0] and MPM[1] may be exchanged. In order to correspond with steps 2 and 5 in the following, the encoder should use the same method of constructing the MPM list.

Specifically, the correspondence between the variables intra_luma_pred_mode0 and intra_luma_pred_mode1 and binary strings are illustrated in Table 12.

TABLE 12

| intra_luma_pred_mode | binary string | | | | | |
|---|---|---|---|---|---|---|
| 0 | 1 | 0 | 0 | | | |
| 1 | 1 | 0 | 1 | | | |
| 2 | 1 | 1 | 0 | | | |
| 3 | 1 | 1 | 1 | | | |
| 4 | 0 | 0 | 0 | 0 | 0 | 0 |
| ... | | | ... | | | |
| binIdx | 0 | 1 | 2 | 3 | 4 | 5 | 6 |

If the value of intra_luma_pred_mode0 is less than 4, then the correspondence between intra_luma_pred_mode1 and binary strings is illustrated in Table 13 below. Otherwise, intra_luma_pred_mode1 has a correspondence with binary strings the same as intra_luma_pred_mode0.

TABLE 13

| intra_luma_pred_mode | binary string | | | | | |
|---|---|---|---|---|---|---|
| 0 | 1 | 0 | | | | |
| 1 | 1 | 1 | 0 | | | |
| 2 | 1 | 1 | 1 | | | |
| 3 | | | | | | |
| 4 | 0 | 0 | 0 | 0 | 0 | 0 |
| ... | | | ... | | | |
| binIdx | 0 | 1 | 2 | 3 | 4 | 5 | 6 |

Specifically, the decoder derives intraLumaPredMode0 and intraLumaPredMode1 according to intra_luma_pred_mode0 and intra_luma_pred_mode1 respectively as follows.

1. If the value of intra_luma_pred_mode0 is 0, then IntraLumaPredMode0 is equal to MPM[0]; otherwise, if the value of intra_luma_pred_mode0 is 1, then IntraLumaPredMode0 is equal to MPM[1]; if the value of intra_luma_pred_mode0 has a value of 2, then IntraLumaPredMode0 is equal to MPM[2]; if intra_luma_pred_mode0 has a value of 3, then IntraLumaPredMode0 is equal to MPM[3];

2. otherwise, make the value of IntraPredMode0 to be (intra_luma_pred_mode0+EipmPuFlag×32):
    if the value of IntraPredMode0 minus 4 is less than MPM[0], then IntraLumaPredMode0 is equal to IntraPredMode0 minus 2;
    otherwise, if the value of IntraPredMode0 minus 3 is greater than MPM[0] and less than MPM[1], then IntraLumaPredMode0 is equal to IntraPredMode0 minus 1;
    otherwise, IntraLumaPredMode0 is equal to IntraPredMode0.

3. if the value of intra_luma_pred_mode0 is less than 4, the value of intra_luma_pred_mode1 is less than 4, and the value of intra_luma_pred_mode1 is greater than or equal to the value of intra_luma_pred_mode0, then mpmPlus=1, otherwise mpmPlus=0;

4. If the value of intra_luma_pred_mode1 is 0, then IntraLumaPredMode1 is equal to MPM[0+mpmPlus]; otherwise if the value of intra_luma_pred_mode1 is 1, then IntraLumaPredMode1 is equal to MPM[1+mpmPlus]; if the value of intra_luma_pred_mode1 is 2, then IntraLumaPredMode1 is equal to MPM[2+mpmPlus]; if the value of intra_luma_pred_mode1 is 3, then IntraLumaPredMode1 is equal to MPM[3+mpmPlus].

5. Otherwise, make the value of IntraPredMode1 to be (intra_luma_pred_mode1+EipmPuFlag×32):
    IntraLumaPredMode1 is equal to IntraPredMode1 minus 2 if the value of IntraPredMode1 minus 4 is less than MPM[0].
    otherwise, if the value of IntraPredMode1 minus 3 is greater than MPM[0] and less than MPM[1], then IntraLumaPredMode1 is equal to IntraPredMode1 minus 1.

Otherwise, IntraLumaPredMode1 is equal to IntraPredMode1.

In the above, the binary variable eipm_pu_flag is the intra luma prediction mode extension flag, exemplarily, a value "1" indicates that the intra luma prediction extension mode should be used, and a value "0" indicates that the intra luma prediction extension mode is not used. The value of Eipm- PuFlag is equal to the value of eipm_pu_flag. Specifically, if eipm_pu_flag does not exist in the bitstream, the value of EipmPuFlag is equal to 0.

In implementations of the present disclosure, further, when determining the first intra prediction mode and/or the second intra prediction mode for the current block based on the weight derivation mode, the decoder may also sort the intra prediction mode(s) corresponding to the adjacent block(s) of the current block, the related intra prediction mode(s) corresponding to the weight derivation mode, and the preset prediction mode, so as to obtain a candidate list of prediction modes. The preset prediction modes include one or more of various prediction modes such as DC mode, Bilinear mode, Planar mode, etc. Then, the decoder may determine the first intra prediction mode and/or the second intra prediction mode based on the candidate list of prediction modes.

Specifically, in implementations of the present disclosure, when determining the first intra prediction mode and/or the second intra prediction mode by using the correlation with the weights, it is also possible to give the intra prediction mode corresponding to the weight derivation mode or several intra prediction modes related thereto a codeword shorter than common intra prediction modes, or a codeword shorter than the longest possible codeword for the intra prediction modes, i.e., a non-longest codeword. This is because the intra prediction mode corresponding to the weight derivation mode or the several intra prediction modes related thereto are considered having a higher probability of being selected than the other modes.

That is, in the implementations of the present disclosure, the first intra prediction mode and the second intra prediction mode may also be determined without MPM. A candidate list of prediction modes may be generated by sorting all the possible intra prediction modes for the first intra prediction mode and the second intra prediction mode, where the top-ranked intra prediction modes in the candidate list of prediction modes are assigned shorter codewords and the bottom-ranked intra prediction modes in the candidate list of prediction modes are assigned longer codewords. The sorting process may consider the intra prediction modes for adjacent blocks of the current block, and may also consider the weight derivation mode for the current block.

Further, in implementations of the present disclosure, when determining the first intra prediction mode and/or the second intra prediction mode for the current block based on the weight derivation mode, the decoder may also establish a reference set of first intra prediction modes corresponding to the weight derivation mode and a reference set of second intra prediction modes corresponding to the weight derivation mode. Then the first intra prediction mode may be determined based on the reference set of first intra prediction modes, and the second intra prediction mode may be determined based on the reference set of second intra prediction modes.

That is, in the implementations of the present disclosure, for the weight derivation mode for the current block, the decoder may sort all possible intra prediction modes of the first intra prediction mode corresponding to the weight derivation mode to generate the reference set of first intra prediction modes, and at the same time, may also sort all possible intra prediction modes of the second intra prediction mode corresponding to the weight derivation mode to generate the reference set of second intra prediction modes. In this way, the first intra prediction mode may be determined from the reference set of first intra prediction modes, and the second intra prediction mode may be determined from the reference set of second intra prediction modes.

Further, in implementations of the present disclosure, in order to reduce the complexity, the lookup table as in Table 8 above may be narrowed down by clustering. For example, the weight derivation modes can be classified to determine the types corresponding to the weight derivation modes, and one type of weight derivation modes corresponds to the same ranking of all possible intra prediction modes for the first intra prediction mode, and corresponds to the same ranking of all possible intra prediction modes for the second intra prediction mode.

Further, in implementations of the present disclosure, in order to reduce the complexity, the lookup table as in Table 8 above may be narrowed down by clustering. For example, the intra prediction modes may be classified to determine the types corresponding to the intra prediction modes. For example, DC, Planar, Bilinear, and other non-angular modes are classified into one type, and the angular modes may be classified according to some range of degrees, such as every 45 degrees, i.e. ⅛ circle, for one type, or every 22.5 degrees, i.e. 1/16 circle, for one type. Specifically, the angular modes may also be divided into several unequal intervals.

In implementations of the present disclosure, further, since the intra prediction method proposed in the present disclosure requires the use of the two different intra prediction modes and the weight to determine the prediction value, in order to reduce the overhead, in the present disclosure, the number of bits may be reduced by limiting the two intra prediction modes for the current block, and the number of bits may be reduced by limiting the weight derivation mode for the current block.

Exemplarily, in this disclosure, since the first 33 prediction modes in AVS3 already cover almost the entire angle range, using only the first 33 prediction modes in AVS3 can ensure better performance, and only needs an adjustment to not use EIPM during decoding. Further, the number of possible intra prediction modes for the current block may be further compressed and limited, to allow only 5 bits used for decoding, thus further reducing the overhead and achieving better performance.

Optionally, in the present disclosure, the overhead of encoding the weight derivation mode may be reduced by reducing the number of weight derivation modes that can be used for the current block. For example, in AVS3, if 56 weight derivation modes are used, up to 6 bits are required to decode the weight derivation mode, while if only 32 weight derivation modes are used, up to 5 bits are required to decode the weight derivation mode. Further, the number of weight derivation modes that can be used for the current block may be further compressed and limited, such as using only 16 weight derivation modes, ultimately achieving only 4 bits for decoding, thus further reducing the overhead and achieving better performance.

It should be noted that in the implementation of the present disclosure, when limiting the number of weight derivation modes, it is possible to either directly limit the number of weight derivation modes for all prediction values, or use different limiting methods for different sizes of current blocks with reference to a size parameter of the current block.

Exemplarily, in this disclosure, for a block with a large size parameter, such as a 64×64 or 32×32 block, it is possible to use all weight derivation modes for determining the weight derivation mode for the current block, while for a block with a small size parameter, such as a 8×8 block, it is possible to use a part of weight derivation modes for determining the weight derivation mode for the current block, i.e., the number of possible weight derivation modes for the current block is limited. This is because for the block with the small size parameter, the impact of minor angular differences is not significant.

It is understood that in the present disclosure, a size threshold, such as a first size threshold, may be set first. If the size parameter of the current block is smaller than the first size threshold, then it can be assumed that minor angular differences will not cause a large impact, and thus the number of weight derivation modes that can be selected for the current block may be limited. Specifically, the limitation on the number of weight derivation modes can be achieved by limiting the index numbers of the weight derivation modes in the current block.

Exemplarily, in the present disclosure, if the size parameter of the current block is smaller than the first size threshold, then it is possible to determine the weight derivation mode based on the first mode index range. The first mode index range is used to limit the index number of the weight derivation mode. Specifically, the first mode index range may include a first lower threshold and a first upper threshold, and it is possible to may compare the index number of the weight derivation mode with the first lower threshold and the first upper threshold, respectively. If the index number of the weight derivation mode is smaller than the first lower threshold, then the index number of the weight derivation mode may be set to the first lower threshold. If the index number of the weight derivation mode is larger than the first upper threshold, then the index number of the weight derivation mode can be set to the first upper threshold.

That is, in the present disclosure, the limitation of the number of weight derivation modes can be achieved by limiting the index numbers of weight derivation modes for the current block by the first mode index range.

For example, in AVS3, the first mode index range can be 0~32, i.e., the index number of the weight derivation mode may be limited to 0~32 by the first mode index range, so the current block may use the first 33 weight derivation modes for the determination of the weight derivation mode for the current block.

Optionally, in the present disclosure, it is possible to reduce the overhead of decoding two intra prediction modes by reducing the number of intra prediction modes that can be used in the current block. For example, in AVS3, if 66 intra prediction modes are used, up to 7 bits are needed to decode one intra prediction mode, while if only 33 intra prediction modes are used and no PCM mode is used, up to 6 bits are needed to decode one intra prediction mode.

It should be noted that in the implementation of the present disclosure, when limiting the number of intra prediction modes, it is possible to either directly limit the number of intra prediction modes for all prediction values, or use different limiting methods for different sizes of current blocks with reference to the size parameter of the current block.

Exemplarily, in this disclosure, for a blocks with a large size parameter, such as a 64×64 or 32×32 size block, it is possible to use all of the intra prediction modes for the determination of two intra prediction modes for the current block, while for a blocks with a small size parameter, such as a 8×8 size block, it is possible to use some of the intra prediction modes for the determination of two intra prediction modes for the current block, i.e., the number of possible intra prediction modes for the current block is limited. This is because the impact of small angular differences is not significant for small blocks.

It is understood that in the present disclosure, a size threshold, such as a second size threshold, may be set first. If the size parameter of the current block is smaller than the second size threshold, then it can be assumed that minor angular differences will not have a large impact, and therefore the number of intra prediction modes that can be selected for the current block can be limited. Specifically, the limitation on the number of intra prediction modes can be achieved by limiting the index numbers of the two intra prediction modes in the current block.

Exemplarily, in the present disclosure, if the size parameter of the current block is less than the second size threshold, then it is possible to determine the first intra prediction mode and the second intra prediction mode based on a second mode index range. The second mode index range is used to limit the index numbers of the intra prediction modes. Specifically, the second mode index range may include a second lower threshold and a second upper threshold. It is possible to first determine a first index number of the first intra prediction mode and may also determine a second index number of the second intra prediction mode, and then set both the first index number and the second index number to be greater than the second lower threshold and less than the second upper threshold.

In other words, in this disclosure, the limitation on the number of intra prediction modes can be achieved by limiting the index number of the first intra prediction mode and the index number of the second intra prediction mode for the current block by the second mode index range.

For example, in AVS3, the second mode index range may be 0~32, i.e., the index number of the first intra prediction mode and the index number of the second intra prediction mode can be limited to 0~32 by the second mode index range. Thus the first 33 prediction modes can be used for determination of the first intra prediction mode and/or the second intra prediction mode for the current block.

It is understood that in the present disclosure, the first size threshold and the second size threshold may be the same or different, and the first mode index range and the second mode index range may be the same or different.

At 604, based on the first intra prediction mode, the second intra prediction mode, and the weight, the prediction value is determined.

In implementations of the present disclosure, after the decoder determines the first intra prediction mode and/or the second intra prediction mode for the current block based on the weight derivation mode, and also determines the weight for the current block based on the weight derivation mode, the decoder may further determine the prediction value based on the first intra prediction mode, the second intra prediction mode, and the weight.

It is understood that in the implementation of the present disclosure, when determining the prediction value based on the first intra prediction mode, the second intra prediction mode, and the weight, the decoder may first determine the first prediction value based on the first intra prediction mode and the second prediction value based on the second intra prediction mode. Then the weight may be used to calculate a weighted average of the first prediction value and the second prediction value, so as to obtain the final prediction value Further, in the implementation of the present disclosure, if the intra prediction mode parameter indicates that the SAWP mode is used for determining the intra prediction value of the current block, the decoder may decode as follows.

A first initial mode and a second initial mode are determined for the current block according to the mode list.

In implementations of the present disclosure, after the intra prediction mode parameter of the current block is determined, if the intra prediction mode parameter indicates that the SAWP mode is used to determine the intra prediction value of the current block, the decoder may further determine the mode list (MPM list) used for the current block. The first initial mode and the second initial mode for the current block may then be determined from the mode list.

It is noted that in the present disclosure, the mode list is used to determine the intra prediction modes used for the current block. Specifically, the decoder may construct the mode list using several highly probable intra prediction modes, so that two intra prediction modes for the current block may be determined based on the mode list.

As can be appreciated, in the implementation of the present disclosure, the decoder may determine the mode list using a common manner of constructing the MPM list, such as constructing the MPM list using the prediction modes for adjacent blocks, or using the method of constructing the mode list involved in the intra prediction method proposed in the present disclosure, i.e., constructing the mode list using the weight derivation mode for the current block.

That is, in the present disclosure, the method of constructing the mode list may be the method of constructing the mode list proposed in operations at 1302 of the above-mentioned implementations, or may be other methods of constructing the MPM list, which is not limited in the present disclosure.

Further, in implementations of the present disclosure, the decoder, after determining the mode list used for the current block, may determine the first initial mode and the second initial mode for the current block based on the mode list.

Exemplarily, in this disclosure, the decoder constructs the mode list with N MPMs. If N is equal to 2n, then n bits (mpm_idx) may be used to indicate which MPM in the mode list is selected, i.e., to determine the first initial mode and the second initial mode, and then one more bit (offset_needed) may be used to indicate whether an offset is required. For example, for a mode list containing 4 MPMs, when selecting the intra prediction mode in the mode list, 2 bits (mpm_idx) are required to indicate which MPM in the mode list is selected as the initial mode. The correspondence between the values of mpm_idx and the bin strings as illustrated in Table 9 can be used to determine the prediction mode.

An offset mode parameter is determined, and an offset parameter for the current block is determined when the offset mode parameter indicates that an offset process is to be performed.

In implementations of the present disclosure, the decoder may further determine the offset mode parameter, where the offset mode parameter is used to determine whether offsetting is required. Specifically, the decoder may further determine the offset parameter for the current block when the offset mode parameter indicates performing the offset process.

It is noted that in the implementations of the present disclosure, it is possible to use a bit (offset_needed) to indicate whether offsetting is needed, i.e., the decoder may determine whether the prediction mode (first initial mode or second initial mode) for the current block requires an offset by parsing the bitstream to determine the offset mode parameter.

Further, in implementations of the present disclosure, the decoder may further parsing the bitstream to determine the offset parameter for the current block if the offset mode parameter indicates that the offset process is to be performed. The offset parameter may include an offset manner and an offset amount. In other words, by the determination of the offset parameter, the decoder may determine whether the first initial mode or the second initial mode for the current block should be offset.

It is noted that in implementations of the present disclosure, the decoder may also parsing the bitstream to determine the offset manner and offset amount in the offset parameter. For example, a bit (sign) indicates whether the offset manner is "+" or "−", and some bits (offset) indicate the offset amount.

Optionally, in this disclosure, it is also possible to preset the offset manner and the offset amount. For example, a default offset amount may be set, such as 1 or 2 or 4, etc.

The first intra prediction mode for the current block is determined according to the first initial mode and the offset parameter, and the second intra prediction mode for the current block is determined according to the second initial mode and the offset parameter.

In implementations of the present disclosure, after determining the offset parameter of the current block, the decoder may determine the first intra prediction mode for the current block according to the first initial mode and the offset parameter, and determine the second intra prediction mode for the current block according to the second initial mode and the offset parameter.

Further, in implementations of the present disclosure, when determining the first intra prediction mode and/or the second intra prediction mode for the current block based on the mode list and the offset parameter, the decoder may offset the first initial mode in accordance with the offset manner and the offset amount, so as to determine the first intra prediction mode. The decoder may also offset the second initial mode in accordance with the offset manner and the offset amount, so as to determine the second intra prediction mode.

That is, in the implementations of the present disclosure, the decoder may first parse the bitstream to determine which prediction mode from the mode list to use, i.e., the initial mode is first determined from the mode list. Then the initial mode is offset according to the offset parameter, and finally the intra prediction mode used for the current block can be determined.

It is understood that in the implementations of the present disclosure, it is possible to use the same offset parameter for the first initial mode and the second initial mode, i.e., the offset process is performed according to the same offset manner and offset amount based on the first initial mode and the second initial mode. Accordingly, it is possible to use different offset parameters for the first initial mode and the second initial mode, i.e., the offset process is performed on the first initial mode using one offset manner, while the offset processing is performed on the second initial mode using another offset manner, where the offset manners and the offset amounts corresponding to the two offset manners may not be identical.

That is, in this disclosure, the offset manner and offset amount for the offset process of the first initial mode may be the same as or different from the offset manner and offset amount for the offset process of the second initial mode.

Optionally, in the present disclosure, the offset mode parameter corresponding to the first initial mode and the offset mode parameter corresponding to the second initial mode may also be different. That is, several different processes may be achieved by setting the offset mode parameter separately for the first initial mode and the second initial mode. In an example, both the first initial mode and the second initial mode are offset. In an example, none of the first initial mode and the second initial mode is offset. In an example, the first initial mode is offset and the second initial mode is not offset. In an example, the first initial mode is not offset and the second initial mode is offset.

Further, in implementations of the present disclosure, if the offset mode parameter indicates that no offset process is to be performed, then the decoder may determine the first intra prediction mode and/or the second intra prediction mode directly according to the mode list.

Based on the first intra prediction mode and/or the second intra prediction mode, the prediction value is determined.

In implementations of the present disclosure, after the decoder determines the first intra prediction mode and/or the second intra prediction mode for the current block based on the mode list and the offset parameter, the decoder may further determine the prediction value based on the first intra prediction mode and the second intra prediction mode.

It should be noted that in the implementation of the present disclosure, during prediction, the decoder may first determine the first prediction value based on the first intra prediction mode, and at the same time determine the second prediction value based on the second intra prediction mode. Then the weighted average of the first and second prediction values may be calculated using the weight of the current block to finally obtain the prediction value.

In implementations of the present disclosure, further, in the intra prediction method above, the decoder may first select the prediction mode from the mode list, then determine whether the offset is required based on that prediction mode. If the offset is required, the encoder further determines the offset manner and the offset amount, where the offset amount may be understood as a mode index number to be offset.

It should be noted that in the implementations of the present disclosure, the method of determining the prediction mode for the current block after the offset process of the mode list can be applied to the SAWP mode in the implementations of the present disclosure, to other intra prediction modes, and to any inter prediction mode, which are not limited in the present disclosure.

Exemplarily, in this disclosure, providing that 4 MPMs are constructed, then 2 bits may be used to determine which prediction mode is selected and 1 bit may be used to determine if the offset process is performed. If the selected intra prediction mode is one of the MPMs, 2 bits (mpm_idx) are needed to indicate which MPM it is and 1 bit (offset_needed) to indicate that no offset is needed, for a total of 3 bits.

Further, in implementations of the present disclosure, if the offset mode parameter indicates that the offset process is performed, then the offset parameter may be further determined, where the offset parameter may include a bit (sign) indicating the offset manner and may also include some bits (offset) indicating the offset amount.

That is, in this disclosure, if an offset is required, then a bit (sign) may be used to indicate whether the offset manner is "+" or "−". Further, the offset may be set to a certain default amount, such as 1 or 2 or 4, etc., or alternatively, some overhead may be used to indicate the offset amount. For example, assuming that there are two optional offset amounts, such as 2 and 4, then one bit may be used to indicate whether the offset amount is 2 or 4. Assuming that there are multiple optional offset amounts, then some bits (offset) may be used to indicate the offset amount. The correspondence between the values of offset and the binary strings as illustrated in Table 10 may be used to determine the offset amount. Exemplarily, at decoding side, the decoder parses the bitstream to determine the initial mode (mpm_idx) for the current block and determine the offset mode parameter (offset_needed). If the offset mode parameter offset_needed indicates performing an offset process, the decoder may further determine the offset manner (sign) and offset amount (offset). For example, the decoding method of the intra prediction mode is illustrated in Table 14.

TABLE 14 mpm_idx
offset_needed
If(offset_needed){
    sign
    offset
}

In the above, the orders of sign and offset can be exchanged. If offset has only one possible case, there is no offset in the above table.

Specifically, assume that the mode number of the intra prediction mode is intra_pred_mode, and the values of variables offset_value, offset_value are 0. If offset_needed is equal to 1, the value of offset_value is equal to the value of offset; if sign is equal to 1, the value of offset_value value is equal to the value of −offset_value; the value of intra_pred_mode is equal to the value of MPM[mpm_idx] plus the value of offset_value.

Further, in this disclosure, it is possible to set the intra prediction mode to use only MPM, such that only mpm_idx needs to be parsed when decoding the intra prediction mode, and the value of intra_pred_mode is equal to the value of MPM[mpm_idx].

The implementations of the present disclosure provide the prediction method in which the decoder may determine two different prediction values of the current block using two different intra prediction modes, and combine the two prediction values using diverse weights to finally obtain the more complex prediction value, improving the accuracy of the prediction. Additionally, the coder may also construct the MPM list by using the correlation between the weights and the prediction modes, which can greatly reduce the complexity without transmission of the prediction modes in the bitstream, thereby reducing overhead of the bitstream. In other words, the prediction method proposed in this disclosure can improve the intra prediction quality while reducing the complexity and overhead of the bitstream, thus improving the compression performance.

The process of determining the first and second prediction modes and the weight based on the weight derivation mode and determining the prediction value based on the first prediction mode, the second prediction mode and the weight, as involved in the implementations of the present disclosure, is described above. The following describes the process of determining a first prediction mode and a second prediction mode based on a prediction list and determining a prediction value based on the first prediction mode and the second prediction mode, as involved in implementations of the present disclosure.

Figure 22:
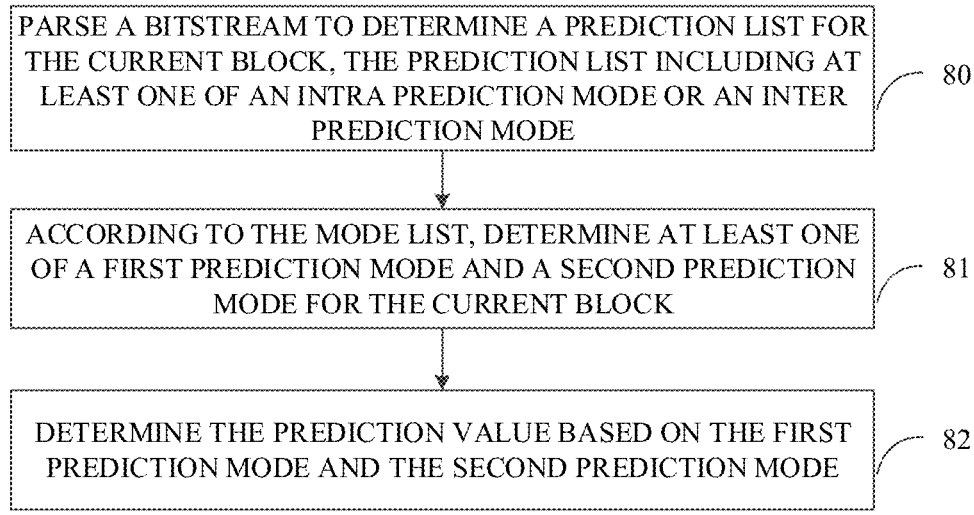
FIG. 22 is a schematic implementation flowchart of a prediction method.

Based on the above implementations, further implementations of the present disclosure proposes an intra prediction method which is applied to the decoder. FIG. 22 is a schematic implementation flowchart of an intra prediction method. As illustrated in FIG. 22, the intra prediction method performed by the decoder may include the following.

At 80, a bitstream is parsed to determine a prediction list for the current block, the prediction list including at least one of an intra prediction mode or an inter prediction mode.

In implementations of the present disclosure, the decoder may first determine the prediction list for the current block after determining that the SAWP mode is used for the current block to determine the prediction value.

The prediction list includes at least one of an intra prediction mode and an inter prediction mode.

Exemplarily, the prediction list includes at least one intra prediction mode. In this case, the prediction list may be referred to as an intra mode list (MPM).

Exemplarily, the prediction list includes at least one inter prediction mode.

Exemplarily, the prediction list includes at least one intra prediction mode and at least one inter-picture prediction mode.

Optionally, if the prediction list includes an inter prediction mode, the inter prediction mode may be predetermined, or may be a most probable inter prediction mode, an inter prediction mode determined in other way, such as an inter prediction mode with the lowest loss cost, or an inter prediction mode with the best prediction result, etc.

Optionally, the prediction list may also include other prediction modes, such as IBC prediction mode or palette prediction mode, etc.

In some implementations, the inter prediction mode includes the skip, merge, basic inter prediction modes, etc.

In some implementations, the intra prediction mode includes unidirectional prediction, bidirectional prediction, or multi-hypothesis prediction, etc.

In some implementations, the intra prediction mode includes weighted prediction, decoder side motion vector refinement (DMVR), decoder side motion vector derivation (DMVD), bidirectional optical flow (BDOF), and other intra prediction techniques.

In some implementations, in the present disclosure, the decoder may first determine a size parameter of the current block, and then determine whether the SAWP mode is used for the current block based on the size parameter. Specifically, if the width is greater than a first threshold and the height is greater than a second threshold, it is determined that the SAWP mode is used for the current block. Optionally, if the width is less than a third threshold and the height is greater than a fourth threshold, it is determined that the SAWP mode is used for the current block.

Optionally, in this disclosure, the decoder may first determine a sample parameter of the current block, and then determine whether the SAWP mode is used for the current block based on the sample parameter and a fifth threshold value.

Optionally, in this disclosure, the decoder may first determine a prediction mode parameter of the current block, and then determine whether the SAWP mode is used for the current block based on the intra prediction mode parameter.

At 81, according to the mode list, at least one of a first prediction mode or a second prediction mode for the current block is determined.

The at least one of the first prediction mode or the second prediction mode in this implementation is an intra prediction mode or an inter prediction mode.

For example, the first prediction mode is an intra prediction mode and the second prediction mode is an inter prediction mode. Optionally, the first prediction mode is an inter prediction mode and the second prediction mode is an intra prediction mode. Optionally, the first prediction mode and the second prediction mode are both inter prediction modes. Optionally, the first prediction mode and the second prediction mode are both intra prediction modes. Implementations of the present disclosure do not limit the specific types of the first prediction mode and the second prediction mode.

In one example, the first prediction mode and the second prediction mode described above may default to one of the prediction modes in the prediction list. For example, the first prediction mode is default to an intra prediction mode in the prediction list, and the second prediction mode is default to an inter prediction mode in the prediction list.

In some implementations, types of the first prediction mode and the second prediction mode are indicated by a first flag. In this case, prior to operations at 81, the method in this implementation of the present disclosure further includes the following.

The first flag is obtained by parsing the bitstream, where the first flag indicates whether the first prediction mode and the second prediction mode are intra prediction modes.

According to the first flag, the types of the first prediction mode and the second prediction mode are determined.

That is, in this disclosure, the bitstream carries the first flag, and the decoder parses the bitstream to obtain the first flag, where the first flag indicates the types of the first prediction mode and the second prediction mode.

Exemplarily, the first flag with a first value indicates that both the first prediction mode and the second prediction mode are inter prediction modes. In this case, mode0IsInter is equal to 1 and mode1IsInter is equal to 1, where mode0IsInter indicates whether the first prediction mode is an inter prediction mode and mode1IsInter indicates whether the second prediction mode is an inter prediction mode. mode0IsInter is equal to 1 when the first prediction mode is an inter prediction mode, and mode1IsInter is equal to 1 when the second prediction mode is an inter prediction mode.

Exemplarily, the first flag with a second value indicates that the first prediction mode is an intra prediction mode and the second prediction mode is an inter prediction mode. In this case, mode0IsInter is equal to 0 and mode1IsInter is equal to 1.

Exemplarily, the first flag with a third value indicates that the first prediction mode is an inter prediction mode and the second prediction mode is an intra prediction mode. In this case, mode0IsInter is equal to 1 and mode1IsInter is equal to 0.

Exemplarily, the first flag with a fourth value indicates that both the first prediction mode and the second prediction mode are intra prediction modes. In this case, mode0IsInter is equal to 0 and mode1IsInter is equal to 0.

This disclosure does not limit the specific values of the first, second, third and fourth values mentioned above.

Optionally, the first value is 0.
Optionally, the second value is 1.
Optionally, the third value is 2.
Optionally, the fourth value is 3.

In one example, the field intra_mode_idx may be used to represent the first flag.

In this disclosure, after the decoder determines the types of the first prediction mode and the second prediction mode based on the first flag, operations at 81 are performed. In this case, operations at 81 includes the following.

According to the types of the first prediction mode and the second prediction mode, at least one of the first prediction mode or the second prediction mode is determined based on the prediction list.

For example, when the first prediction mode is an intra prediction mode, one of the intra prediction modes in the prediction list is selected as the first prediction mode. For example, the intra prediction mode with the lowest coding cost in the prediction list is determined as the first prediction mode.

For example, if the second prediction mode is an inter prediction mode, one of the inter prediction modes in the prediction list is selected as the second prediction mode. For example, the inter prediction mode with the lowest coding cost in the prediction list is determined as the second prediction mode.

At 82, the prediction value is determined based on the first prediction mode and the second prediction mode.

In implementations of the present disclosure, after determining the first prediction mode and/or the second prediction mode for the current block based on the prediction list, the decoder may then determine the prediction value based on the first prediction mode and the second prediction mode. Specific reference may be made to the specific description for operations at 12 in FIG. 11 above, which will not be repeated here.

It is understood that in the implementations of the present disclosure, when determining the prediction value based on the first prediction mode and the second prediction mode, the decoder may first determine a first prediction value based on the first prediction mode and determine a second prediction value based on the second prediction mode, and then the decoder may calculate a weighted average of the first prediction value and the second prediction value to finally obtain the prediction value. For example, the decoder may calculate the weighted average of the first prediction value and the second prediction value using the weight to obtain the prediction value.

Figure 23:
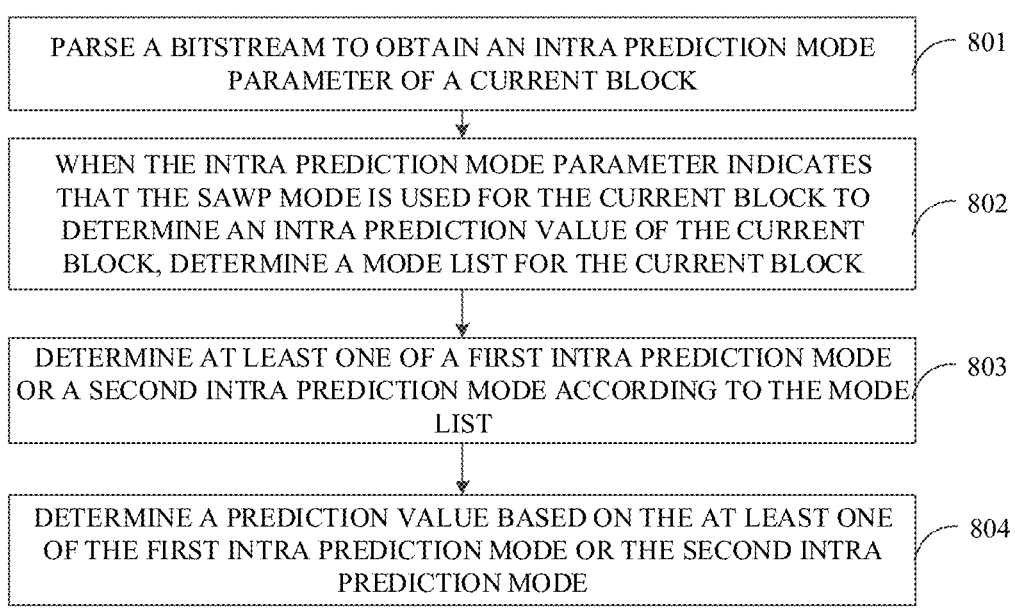
FIG. 23 is a schematic implementation flowchart of a prediction method.

The method in implementations of this disclosure is described below in conjunction with FIG. 23, with an example that the first prediction mode is a first intra prediction mode, the second prediction mode is a second intra prediction mode, and the prediction list includes a mode list.

Based on the above implementations, a prediction method is provided in further implementations of the disclosure. The prediction method is applied to the decoder. FIG. 23 is a schematic implementation flowchart of the prediction method. As illustrated in FIG. 23, the prediction method performed by the decoder may include the following.

At 801, a bitstream is parsed to obtain an intra prediction mode parameter of a current block.

At 802, when the intra prediction mode parameter indicates that the SAWP mode is used for the current block to determine an intra prediction value of the current block, a mode list for the current block is determined.

At 803, at least one of a first intra prediction mode or a second intra prediction mode is determined according to the mode list.

At 804, a prediction value is determined based on the at least one of the first intra prediction mode or the second intra prediction mode.

In implementations of the present disclosure, after the decoder determines the intra prediction mode parameter of the current block by parsing the bitstream, if intra prediction mode parameter indicates that the SAWP mode is used for the current block to determine the intra prediction value for the current block, the decoder the may further determine the mode list for the current block.

It should be noted that in the implementations of the disclosure, the SAWP mode is a type of intra prediction method. Specifically, in the SAWP mode, two different intra prediction modes are determined for the current block, and then two prediction values are determined based on these two different intra prediction modes. Then a weight is determined to combine the two prediction values according to the weight, resulting in a new prediction value, which is the prediction value of the current block.

Optionally, in the present disclosure, the decoder may first determine a size parameter of the current block; and then determine whether the SAWP mode is used for the current block based on the size parameter. Specifically, if the width is greater than a first threshold and the height is greater than a second threshold, it is determined that the SAWP mode is used for the current block. Optionally, if the width is less than a third threshold and the height is greater than a fourth threshold, it is determined that the SAWP mode is used for the current block.

Optionally, in this disclosure, the decoder may first determine a sample parameter of the current block, and then determine whether the SAWP mode is used for the current block based on the sample parameter and a fifth threshold value.

Optionally, in this disclosure, the decoder may first determine an intra prediction mode parameter for the current block, and then determine whether the SAWP mode is used for the current block based on the intra prediction mode parameter.

It is noted that in the present disclosure, the weight derivation mode is used to determine the weight used for the current block. Specifically, the weight derivation mode may be a mode for deriving the weights. For a block of a given length and width, each weight derivation mode may be used to derive a weight matrix. For blocks of the same size, different weight matrices may be derived from different weight derivation modes.

Exemplarily, in this disclosure, there are 56 weight derivation modes for AWP in AVS3 and 64 weight derivation modes for GPM in VVC.

Further, in implementations of the disclosure, when determining the mode list by using the weight derivation mode, the decoder may first determine an intra prediction mode corresponding to an adjacent block of the current block, and determine the intra prediction mode corresponding to the adjacent block as a mode to-be-added. After determining that the mode to-be-added meets a preset adding condition, the decoder may add the mode to-be-added to the mode list, that is, add the intra prediction mode corresponding to the adjacent block of the current block to the mode list. Next, if the mode list does not reach a preset list-length, the decoder may determine a weight derivation mode for the current block, and determine a related intra prediction mode corresponding to the weight derivation mode as the mode to-be-added. When determining that the mode to-be-added meets the preset adding condition, the decoder may add the mode to-be-added to the mode list, that is, add the related intra prediction mode corresponding to the weight derivation mode to the mode list.

It should be noted that in implementations of this disclosure, after the decoder adds the intra prediction mode corresponding to the adjacent block of the current block to the mode list, or adds the related intra prediction mode corresponding to the weight derivation mode to the mode list, if the mode list does not reach the preset list-length, that is, the mode list is not full, then the decoder may continue to determine a preset prediction mode as the mode to-be-added, and when the mode to-be-added meets the preset adding condition, add the mode to-be-added to the mode list, that is, add the preset prediction mode to the mode list.

It should be noted that the preset prediction mode in this disclosure includes one or more of different modes like a DC mode, a Bilinear mode, and a Planar mode.

Further, in implementations of this disclosure, after the decoder adds the intra prediction mode corresponding to the adjacent block of the current block, the related intra prediction mode corresponding to the weight derivation mode, and the preset prediction mode to the mode list, if the mode list does not reach the preset list-length, that is, the mode list is not full, then the decoder may determine an associated intra prediction mode using the prediction modes in the mode list, and determine the associated intra prediction mode as the mode to-be-added. When the mode to-be-added meets the preset adding condition, the decoder adds the mode to-be-added to the mode list, that is, add to the mode list the associated intra prediction mode corresponding to the mode list.

In other words, in this disclosure, after the the intra prediction mode corresponding to the adjacent block of the current block, the related intra prediction mode corresponding to the weight derivation mode, and the preset prediction mode are added to the mode list sequentially, if the mode list is not full, then the decoder may determine the associated intra prediction mode based on the existing prediction modes in the mode list, and then add the associated intra prediction mode to the mode list.

It should be noted that in implementations of this disclosure, regardless of whether the intra prediction mode corresponding to the adjacent block of the current block, the related intra prediction mode corresponding to the weight derivation mode, the preset prediction mode, or the associated intra prediction mode is taken as the mode to-be-added, the decoder needs to determine whether the mode to-be-added meets the preset addition condition. Specifically, if the mode to-be-added exists and is different from all prediction modes in the mode list, it is determined that the mode to-be-added meets the preset addition condition, and the mode to-be-added will be added to the mode list.

Correspondingly, if the mode to-be-added does not exists or is the same as (identical to) a prediction mode in the mode list, it is determined that the mode to-be-added does not meet the preset addition condition, and the mode to-be-added will not be added to the mode list. Instead, the mode to-be-added will be directly discarded.

It can be understood that in this disclosure, since two intra prediction modes are required for intra prediction of the current block, it is possible to refer to intra prediction modes for more positions when constructing the MPM list, or refer to more intra prediction modes for the adjacent blocks. Correspondingly, in this disclosure, the length of the mode list used for the current block may be different from a length of other mode list of intra prediction modes. Because the codeword for binarization of the MPM is shorter than the codeword for binarization of other modes, increasing the probability that the two intra prediction modes are MPMs can improve the coding efficiency.

Further, in implementations of the disclosure, when determining the mode list by using the weight derivation mode, the decoder may first determine a list construction strategy corresponding to the weight derivation mode, and then determine the mode list according to the list construction strategy.

That is, in the disclosure, for different weights, that is, for different weight derivation modes, the decoder may construct the mode list by using different list construction strategies. For example, based on the list construction strategy, in a case that the boundary line of the weight is 0 degree or 90 degrees, that is, horizontal or vertical, the decoder may consider intra prediction modes corresponding to the weight for construction of the mode list. For other cases, the decoder may not consider the intra prediction modes corresponding to the weight.

In implementations of the present disclosure, after constructing the mode list for the current block, the decoder may then determine the first intra prediction mode and/or the second intra prediction mode for the current block based on the mode list.

It can be understood that in the present disclosure, the two intra prediction modes used for intra prediction of the current block are not the same, i.e., the first intra prediction mode is not the same as the second intra prediction mode, so that the second intra prediction mode may exclude the possibility of the first intra prediction mode during decoding. In other words, the second intra prediction mode may be decoded using the information of the first intra prediction mode.

In implementations of the present disclosure, further, the decoder may set an alternate intra prediction mode during constructing the mode list. The alternate intra prediction mode is not the same as any intra prediction mode in the mode list.

Specifically, in the present disclosure, in order to ensure that the first intra prediction mode and the second intra prediction mode used for the current block are not the same, the second intra prediction mode may be determined depending on the first intra prediction mode. When determining the first intra prediction mode and the second intra prediction mode based on the mode list, the decoder may first determine one of the prediction modes in the mode list as the first intra prediction mode, and then determine the second intra prediction mode based on the first intra prediction mode and the mode list.

Further, in implementations of the present disclosure, after determining the prediction mode in the mode list as the first intra prediction mode, the decoder may remove the prediction mode from the mode list and then add the alternate intra prediction mode to the mode list, so that an updated mode list may be obtained. A prediction mode may then be selected from the updated mode list and determined as the second intra prediction mode. Any selection method may be used.

Exemplarily, in this disclosure, assuming that the first intra prediction mode and the second intra prediction mode have N optional MPMs, when constructing the mode list, N MPMs and 1 alternate MPM may be constructed first. For the first intra prediction mode, the optional MPMs are the above-mentioned N MPMs. If one of the MPMs is selected for the first intra prediction mode, then for the second intra prediction mode, the MPM selected for the first intra prediction mode is removed, and then the alternate MPM is added to the mode list. In this way, the second intra prediction mode still has N optional MPMs.

In implementations of the present disclosure, furthermore, the decoder may set a length parameter of the mode list to be (N+1) during constructing the mode list, where N is a positive integer.

Specifically, in the present disclosure, the second intra prediction mode may be determined depending on the first intra prediction mode in order to ensure that the first intra prediction mode and the second intra prediction mode used for the current block are not the same. When determining the first intra prediction mode and the second intra prediction mode based on the mode list, the decoder may determine one of the first N prediction modes in the mode list as the first intra prediction mode if the first intra prediction mode is determined by using the mode list. Then the second intra prediction mode is determined based on the first intra prediction mode and the mode list.

Further, in implementations of the present disclosure, if the first intra prediction mode is determined by using the mode list, then the decoder determines the second intra prediction mode by using the remaining N prediction modes in the mode list, other than the first intra prediction mode, after determining one of the first N prediction modes of the mode list as the first intra prediction mode.

It is noted that in implementations of the present disclosure, when determining the first intra prediction mode and the second intra prediction mode based on the mode list, if the mode list is not used to determine the first intra prediction mode, then the decoder may directly determine one of the first N prediction modes of the mode list as the second intra prediction mode.

Optionally, in implementations of the present disclosure, if it is only ensured that the first intra prediction mode and the second intra prediction mode used for the current block are not the same, without limiting the number of MPMs that can be selected for the first intra prediction mode and the second intra prediction mode, then it is possible to not set the alternate intra prediction mode, or, alternatively, not increase the length of the mode list.

Exemplarily, in this disclosure, the number N of MPMs is equal to 4, and the first bit indicates whether a mode is an MPM. For example, "1" means the mode is an MPM and "0" means the mode is not an MPM. If the first intra prediction mode is an MPM, since there are 4 MPMs, 2 bits are used to indicate which MPM first intra prediction mode is, i.e., "00, 01, 10, 11" representing the first, second, third and fourth MPMs respectively. If both the first intra prediction mode and the second intra prediction mode are MPMs, then there are only 3 MPMs available for the second intra prediction mode. In this case, 1 to 2 bits may be used to indicate which MPM the second intra prediction mode is, such as "00, 01, 10" representing the remaining first, second and third MPMs respectively. As can be seen, the inverse binarization method, can be changed to save overhead since one possibility is excluded.

In implementations of the present disclosure, after the decoder determines the first intra prediction mode and/or the second intra prediction mode for the current block according to the weight derivation mode, the decoder may further determine the prediction value based on the first intra prediction mode and the second intra prediction mode.

It is understood that in the implementation of the present disclosure, when determining the prediction value based on the first intra prediction mode and the second intra prediction mode, the decoder may first determine a first prediction value according to the first intra prediction mode and a second prediction value according to the second intra prediction mode. Then a weighted average of the first prediction value and the second prediction value may be calculated, so as to obtain the final prediction value. For example, the decoder may use a weight to calculate the weighted average of the first prediction value and the second prediction value, so as to obtain the prediction value.

In implementations of the present disclosure, further, after determining the mode list of the current block, the decoder may also determine a first initial mode and a second initial mode for the current block based on the mode list, and then determine an offset mode parameter. When the offset mode parameter indicates performing an offset process, the decoder determines an offset parameter of the current block, and then determines the first intra prediction mode for the current block based on the first initial mode and the offset parameter and determines the second intra prediction mode for the current block based on the second initial mode and the offset parameter. Finally, based on the first intra prediction mode and the second intra prediction mode, the prediction value may be determined.

As can be appreciated, in implementations of the present disclosure, the decoder may determine the mode list using a common manner of constructing the MPM list, such as constructing the MPM list using the prediction modes for adjacent blocks, or using the method of constructing the mode list involved in the intra prediction method proposed in the present disclosure, i.e., constructing the mode list using the weight derivation mode for the current block.

That is, in the present disclosure, the method of constructing the mode list may be the method of constructing the mode list proposed in the above-mentioned implementations, or may be other methods of constructing the MPM list, which is not limited in the present disclosure.

Further, in implementations of the present disclosure, the decoder, after determining the mode list used for the current block, may determine the first initial mode and the second initial mode for the current block based on the mode list.

Exemplarily, in this disclosure, the decoder constructs the mode list with N MPMs. If N is equal to 2n, then n bits (mpm_idx) may be used to indicate which MPM in the mode list is selected, i.e., to determine the first initial mode and the second initial mode, and then one more bit (offset_needed) may be used to indicate whether an offset is required. For example, for a mode list containing 4 MPMs, when selecting the intra prediction mode in the mode list, 2 bits (mpm_idx) are required to indicate which MPM in the mode list is selected as the initial mode. The correspondence between the values of mpm_idx and the bin strings as illustrated in Table 9 can be used to determine the prediction mode.

It is noted that in the implementations of the present disclosure, the decoder may use a bit (offset_needed) to indicate whether offsetting is needed, i.e., the decoder may determine whether the prediction mode (first initial mode or second initial mode) for the current block requires an offset by setting the offset mode parameter.

Further, in implementations of the present disclosure, the decoder may further determine the offset parameter for the current block if the offset mode parameter indicates that the offset process is to be performed. The offset parameter may include an offset manner and an offset amount. In other words, by the determination of the offset parameter, the decoder may determine whether the first initial mode or the second initial mode for the current block should be offset.

It is noted that in implementations of the present disclosure, the bits obtained by the decoder parsing the bitstream may indicate the offset manner and offset amount in the offset parameter. For example, a bit (sign) indicates whether the offset manner is "+" or "−", and some bits (offset) indicate the offset amount.

Optionally, in this disclosure, the decoder may also preset the offset manner and the offset amount. For example, the decoder may set a default offset amount, such as 1 or 2 or 4, etc.

Further, in implementations of the present disclosure, when determining the first intra prediction mode and/or the second intra prediction mode for the current block based on the mode list and the offset parameter, the decoder may offset the first initial mode in accordance with the offset manner and the offset amount, so as to determine the first intra prediction mode. The decoder may also offset the second initial mode in accordance with the offset manner and the offset amount, so as to determine the second intra prediction mode.

That is, in the implementations of the present disclosure, the decoder may determine which prediction mode from the mode list to use according to some bits obtained by parsing, i.e., the initial mode is first determined from the mode list. Then the initial mode is offset according to the offset parameter, and finally the intra prediction mode used for the current block can be determined.

It is understood that in the implementations of the present disclosure, the decoder may use the same offset parameter for the first initial mode and the second initial mode, i.e., the offset process is performed according to the same offset manner and offset amount based on the first initial mode and the second initial mode. Accordingly, the decoder may also use different offset parameters for the first initial mode and the second initial mode, i.e., the offset processing is performed on the first initial mode using an offset manner, while the offset process is performed on the second initial mode using another offset manner, where the offset manners and the offset amounts corresponding to the two offset manners may not be identical.

That is, in this disclosure, the offset manner and offset amount for the offset process of the first initial mode may be the same as or different from the offset manner and offset amount for the offset process of the second initial mode.

Optionally, in the present disclosure, the offset mode parameter corresponding to the first initial mode and the offset mode parameter corresponding to the second initial mode may also be different. That is, the decoder achieves several different processes by setting the offset mode parameter separately for the first initial mode and the second initial mode. In an example, both the first initial mode and the second initial mode are offset. In an example, none of the first initial mode and the second initial mode is offset. In an example, the first initial mode is offset and the second initial mode is not offset. In an example, the first initial mode is not offset and the second initial mode is offset.

Further, in implementations of the present disclosure, if the offset mode parameter indicates that no offset process is to be performed, then the decoder may determine the first intra prediction mode and the second intra prediction mode directly from the mode list.

It should be noted that in the implementation of the present disclosure, during prediction, the decoder may first determine the first prediction value based on the first intra prediction mode, and at the same time determine the second prediction value based on the second intra prediction mode. Then the weighted average of the first and second prediction values may be calculated to finally obtain the prediction value.

The implementations of the present disclosure provide the prediction method in which the coder may determine two different prediction values of the current block by using two different prediction modes, and the two prediction values may be combined using diverse weights to finally obtain a more complex prediction value, improving the accuracy of the prediction. Additionally, the coder may also construct the prediction list by using the correlation between the weights and the prediction modes, which can greatly reduce the complexity without transmission of the prediction modes in the bitstream, thereby reducing overhead of the bitstream. In other words, the intra prediction method proposed in this disclosure can improve the prediction quality while reducing the complexity and bitstream overhead, thus improving the compression performance.

Figure 24:
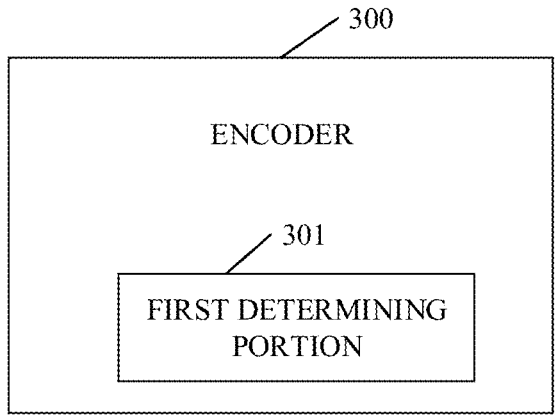
FIG. 24 is a schematic structural diagram of an encoder provided in implementations of the disclosure.

Based on the above implementations, in further implementations of the present disclosure, FIG. 24 is a schematic block diagram of an encoder provided in the present disclosure. As illustrated in FIG. 24, the encoder 300 provided in the present disclosure may include a first determining portion 301.

The first determining portion 301 is configured to determine a weight derivation mode for a current block, determine at least one of a first prediction mode or a second prediction mode for the current block according to the weight derivation mode, determine a weight according to the weight derivation mode, and determine a prediction value based on the first prediction mode, the second prediction mode, and the weight.

The first determining portion 301 is further configured to determine a prediction list for a current block, the prediction list containing at least one of an intra prediction mode or an inter prediction mode, determine at least one of a first prediction mode or a second prediction mode for the current block according to the prediction list, and determine a prediction value based on the first prediction mode and the second prediction mode.

Figure 25:
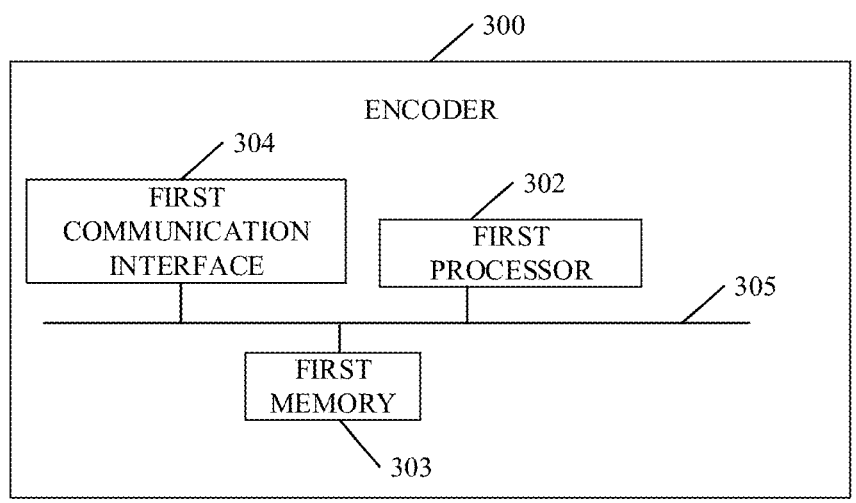
FIG. 25 is a schematic structural diagram of an encoder provided in implementations of the disclosure.

FIG. 25 is a schematic block diagram of an encoder provided in this disclosure. As illustrated in FIG. 25, the encoder 300 provided in this disclosure may include a first processor 302, a first memory 303 storing instructions executable by the first processor 302, a first communication interface 304, and a first bus 305 for connecting the first processor 302, the first memory 303, and the first communication interface 304.

Further, in implementations of the disclosure, the first processor 302 is configured to determine a weight derivation mode for a current block, determine at least one of a first prediction mode or a second prediction mode for the current block according to the weight derivation mode, determine a weight according to the weight derivation mode, and determine a prediction value based on the first prediction mode, the second prediction mode, and the weight.

The first processor 302 is further configured to determine a prediction list for a current block, the prediction list containing at least one of an intra prediction mode or an inter prediction mode, determine at least one of a first prediction mode or a second prediction mode for the current block according to the prediction list, and determine a prediction value based on the first prediction mode and the second prediction mode.

Figure 26:
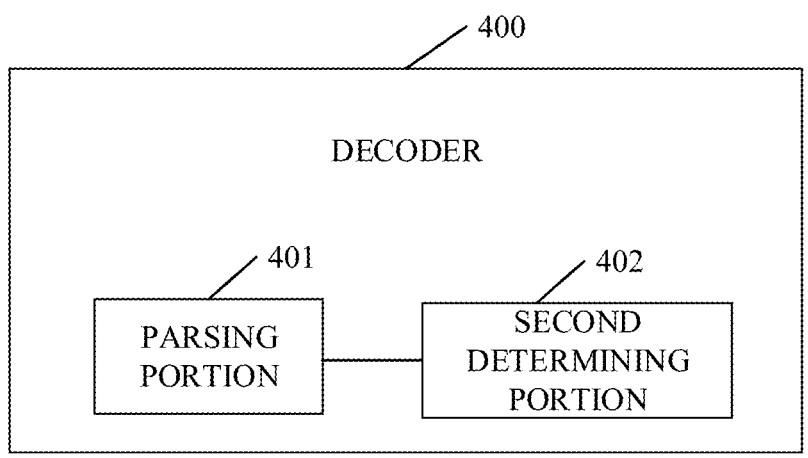
FIG. 26 is a schematic structural diagram of a decoder provided in implementations of the disclosure.

FIG. 26 is a schematic block diagram of a decoder provided in this disclosure. As illustrated in FIG. 26, the decoder 400 provided in this disclosure may include a parsing portion 401 and a second determining portion 402.

The parsing portion 401 is configured to parse a bitstream.

The second determining portion 402 is configured to determine a weight derivation mode for a current block; determine at least one of a first prediction mode or a second prediction mode for the current block according to the weight derivation mode; determine a weight according to the weight derivation mode; and determine a prediction value based on the first prediction mode, the second prediction mode, and the weight.

The second determining portion 402 is further configured to determine a prediction list for a current block, the prediction list containing at least one of an intra prediction mode or an inter prediction mode; determine at least one of a first prediction mode or a second prediction mode for the current block according to the prediction list; and determine a prediction value based on the first prediction mode and the second prediction mode.

Figure 27:
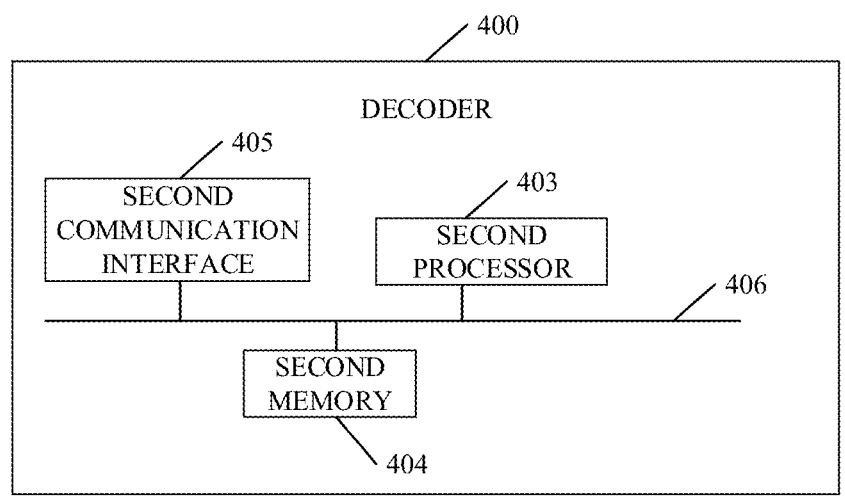
FIG. 27 is a schematic structural diagram of a decoder provided in implementations of the disclosure.

FIG. 27 is a schematic block diagram of a decoder provided in this disclosure. As illustrated in FIG. 27, the decoder 400 provided in this disclosure may include a second processor 403, a second memory 404 storing instructions executable by the second processor 403, a second communication interface 405, and a second bus 406 for connecting the second processor 403, the second memory 404, and the second communication interface 405.

Further, in implementations of the disclosure, the second processor 403 is configured to parse a bitstream to determine a weight derivation mode for a current block; determine at least one of a first prediction mode or a second prediction mode for the current block according to the weight derivation mode; determine a weight according to the weight derivation mode; and determine a prediction value based on the first prediction mode, the second prediction mode, and the weight.

The second processor 403 is further configured to parse a bitstream to determine a prediction list for a current block, the prediction list containing at least one of an intra prediction mode or an inter prediction mode; determine at least one of a first prediction mode or a second prediction mode for the current block according to the prediction list; and determine a prediction value based on the first prediction mode and the second prediction mode.

Further, each functional module in the implementations can be integrated in a processing unit, or each unit can be physically present separately, or two or more units can be integrated in a single unit. The above integrated units can be implemented either in the form of hardware or in the form of software functional modules.

The integrated unit, when implemented as a software function module and not sold or used as a stand-alone product, may be stored in a computer-readable storage medium, based on the understanding that the technical solution of the present disclosure, or that part or all or part of the technical solution that essentially contributes to the prior art, may be embodied in the form of a software product that is stored in a storage medium including a number of instructions to enable a computer device (which may be a personal computer, server, or network device, etc.) or processor to perform all or some of the steps of the method of this disclosure. The aforementioned storage media includes: USB flash drives, removable hard drives, read only memory (ROM), random access memory (RAM), disks or CD-ROMs, and other media that can store program codes.

The present implementation provides the prediction method, the encoder, the decoder, and the storage medium. On the one hand, the weight derivation mode for the current block is determined; at least one of the first prediction mode or the second prediction mode for the current block is determined based on the weight derivation mode, the weight is determined based on the weight derivation mode, and the prediction value is determined based on the first prediction mode, the second prediction mode, and the weight. On the other hand, the prediction list for the current block is determined, the prediction list including at least one of an intra prediction mode and an inter prediction mode, the first prediction mode and the second prediction mode for the current block are determined based on the prediction list, and the prediction value is determined based on the first prediction mode and the second prediction mode. In other words, in the implementations, the encoder and decoder can determine two different prediction values for the current block using two different prediction modes, and the two different prediction values can be combined using various weight matrices to obtain more complex prediction values, thus improving prediction accuracy. Additionally, the encoder and decoder can construct the prediction list based on the correlation between weights and prediction modes, which can greatly reduce complexity and bitrate overhead without transmitting the prediction modes in the bitstream, thereby reducing bitrate overhead. Therefore, the proposed prediction method can improve compression performance by enhancing prediction quality while simultaneously reducing complexity and bitstream overhead.

Implementations of the disclosure provide a computer-readable storage medium with a program stored thereon. When the program is executed by a processor, the method described in the above implementations is implemented.

Specifically, program instructions corresponding to the prediction method in this implementation may be stored on the storage medium such as a CD-ROM, a hard disk, a USB flash drive, etc. When the program instructions corresponding to the prediction method in the storage medium are read or executed by an electronic device, the operations include the following are performed.

A weight derivation mode for a current block is determined. At least one of a first prediction mode or a second prediction mode for the current block is determined according to the weight derivation mode. A weight is determined according to the weight derivation mode. A prediction value is determined based on the first prediction mode, the second prediction mode, and the weight.

Further, the operations include the following are performed.

A prediction list for a current block is determined, the prediction list containing at least one of an intra prediction mode or an inter prediction mode. At least one of a first prediction mode or a second prediction mode for the current block is determined according to the prediction list. A prediction value is determined based on the first prediction mode and the second prediction mode.

Further, the operations include the following are performed.

A bitstream is parsed to determine a weight derivation mode for a current block. At least one of a first prediction mode or a second prediction mode for the current block is determined according to the weight derivation mode. A weight is determined according to the weight derivation mode. A prediction value is determined based on the first prediction mode, the second prediction mode, and the weight.

Further, the operations include the following are performed.

A bitstream is parsed to determine a prediction list for a current block, the prediction list containing at least one of an intra prediction mode or an inter prediction mode. At least one of a first prediction mode or a second prediction mode for the current block is determined according to the prediction list. A prediction value is determined based on the first prediction mode and the second prediction mode.

Those skilled in the art should understand that implementations of the present disclosure may be provided as methods, systems, or computer program products. Accordingly, the present disclosure may take the form of a hardware implementation, a software implementation, or an implementation of a combination of software and hardware aspects. Further, the present disclosure may take the form of a computer program product implemented on one or more computer-usable storage media (including, but not limited to, disk memory and optical memory, etc.) that contain computer-usable program codes therein.

The present disclosure is described with reference to schematic flowcharts and/or block diagrams of methods, devices (systems), and computer program products according to implementations of the present disclosure. It should be understood that each of the processes and/or blocks in the process schematic and/or block diagram, and the combination of the processes and/or blocks in the process schematic and/or block diagram may be implemented by computer program instructions. These computer program instructions may be provided to a processor of a general purpose computer, a specialized computer, an embedded processor, or other programmable data processing device to produce a machine, such that the instructions executed by the processor of the computer or other programmable data processing device produce a device, where the device performs the function specified in one or more processes in the implementation flowcharts and/or one or more blocks in the block diagrams.

These computer program instructions may also be stored in a computer-readable memory capable of directing a computer or other programmable data processing device to operate in a particular manner, such that the instructions stored in such computer-readable memory produce an article of manufacture including an instruction device, where the instruction device performs the function specified in one or more processes in the implementation flowcharts and/or one or more blocks in the block diagrams.

These computer program instructions may also be loaded onto a computer or other programmable data processing device such that a series of operational steps are performed on the computer or other programmable device to produce computer-implemented processing, such that the instructions executed on the computer or other programmable device provide instructions for implementing the process or processes of the function specified in one or more processes in the implementation flowcharts and/or one or more blocks in the block diagrams.

The above is only some implementations of the present disclosure, and is not intended to limit the scope of protection of the present disclosure.

The following numbered clauses, describing aspects of the invention, are part of the description.

1. A prediction method, applied to an encoder and comprising: determining a weight derivation mode for a current block; determining at least one of a first prediction mode or a second prediction mode for the current block according to the weight derivation mode; determining a weight according to the weight derivation mode; and determining a prediction value based on the first prediction mode, the second prediction mode, and the weight.

2. The method of clause 1, wherein at least one of the first prediction mode or the second prediction mode is an intra prediction mode or an inter prediction mode.

3. The method of clause 2, further comprising: obtaining a first flag, the first flag indicating whether the first prediction mode and the second prediction mode belong to an intra prediction mode; and determining a type of each of the first prediction mode and the second prediction mode according to the first flag, and determining at least one of the first prediction mode or the second prediction mode for the current block according to the weight derivation mode comprises: when at least one of the first prediction mode or the second prediction mode is an intra prediction mode, determining at least one of the first prediction mode or the second prediction mode based on the weight derivation mode.

4. The method of clause 3, wherein when at least one of the first prediction mode or the second prediction mode is an intra prediction mode, determining at least one of the first prediction mode or the second prediction mode based on the weight derivation mode comprises: when the first prediction mode or the second prediction mode is an intra prediction mode, determining an angle index according to the weight derivation mode, the angle index indicating an angle index of a boundary line of the weight; and determining an intra prediction mode corresponding to the angle index as the first prediction mode or the second prediction mode.

5. The method of clause 3, wherein when at least one of the first prediction mode or the second prediction mode is an intra prediction mode, determining at least one of the first prediction mode or the second prediction mode based on the weight derivation mode comprises: when the first prediction mode and/or the second prediction mode is an intra prediction mode, obtaining an intra prediction mode corresponding to the weight derivation mode; and determining the first prediction mode and/or the second prediction mode according to the intra prediction mode corresponding to the weight derivation mode.

6. The method of clause 5, wherein the intra prediction mode corresponding to the weight derivation mode comprises at least one of: an intra prediction mode parallel to the boundary line of the weight, an intra prediction mode perpendicular to the boundary line, or a planar mode.

7. The method of clause 5 or 6, wherein determining the first prediction mode and/or the second prediction mode according to the intra prediction mode corresponding to the weight derivation mode comprises: when the first prediction mode is an intra prediction mode, obtaining a second flag and determining an intra prediction mode corresponding to the second flag in the intra prediction modes corresponding to the weight derivation mode as the first prediction mode, wherein the second flag indicates a correspondence between the first prediction mode and the intra prediction modes corresponding to the weight derivation mode; and/or when the second prediction mode is an intra prediction mode, obtaining a third flag and determining the intra prediction mode corresponding to the third flag in the intra prediction modes corresponding to the weight derivation mode as the second prediction mode, wherein the third flag indicates a correspondence between the second prediction mode and the intra prediction modes corresponding to the weight derivation mode.

8. The method of clause 7, wherein when both the first prediction mode and the second prediction mode are intra prediction modes, the second flag and the third flag have different values.

9. The method of clause 3, further comprising: signalling the first flag into a bitstream.

10. The method of clause 7, further comprising: signalling the second flag and/or the third flag into a bitstream.

11. The method of clause 3, wherein when at least one of the first prediction mode or the second prediction mode is an intra prediction mode, determining at least one of the first prediction mode or the second prediction mode based on the weight derivation mode comprises: when the first prediction mode is a first intra prediction mode and/or the second prediction mode is a second intra prediction mode, determining at least one of the first intra prediction mode or the second intra prediction mode according to the weight derivation mode.

12. The method of clause 11, wherein determining at least one of the first intra prediction mode or the second intra prediction mode according to the weight derivation mode comprises: determining a mode list by using the weight derivation mode; and determining the first intra prediction mode and/or the second intra prediction mode based on the mode list.

13. The method of clause 12, wherein determining the mode list by using the weight derivation mode comprises: determining an intra prediction mode corresponding to an adjacent block of the current block and determining the intra prediction mode corresponding to the adjacent block as a mode to-be-added; when the mode to-be-added meets a preset adding condition, adding the mode to-be-added to the mode list; when the mode list does not reach a preset list-length, determining a related intra prediction mode corresponding to the weight derivation mode and determining the related intra prediction mode corresponding to the weight derivation mode as the mode to-be-added; when the mode to-be-added meets the preset adding condition, adding the mode to-be-added to the mode list.

14. The method of clause 13, further comprising: determining order parameters each corresponding to an adjacent block; adding the intra prediction modes corresponding to the adjacent blocks to the mode list sequentially according to the order parameters.

15. The method of clause 13, wherein determining the related intra prediction mode corresponding to the weight derivation mode comprises: determining an intra prediction mode corresponding to the weight derivation mode; and determining the related intra prediction mode according to a first index interval based on the intra prediction mode corresponding to the weight derivation mode.

16. The method of clause 13, further comprising: when the mode list does not reach the preset list-length, determining a preset prediction mode as the mode to-be-added, wherein the preset prediction mode comprises one or more of a DC mode, a Bilinear mode, and a Planar mode; when the mode to-be-added meets the preset adding condition, adding the mode to-be-added to the mode list.

17. The method of clause 13, further comprising: when the mode list does not reach the preset list-length, determining an associated intra prediction mode corresponding to the mode list and determining the associated intra prediction mode as the mode to-be-added; and when the mode to-be-added meets the preset adding condition, adding the mode to-be-added to the mode list.

18. The method of clause 17, wherein determining the associated intra prediction mode corresponding to the mode list comprises: determining the associated intra prediction mode according to a second index interval based on any prediction mode in the mode list.

19. The method according to any of clauses 13-18, further comprising: when the mode to-be-added exists and is different from all prediction modes in the mode list, determining that the mode to-be-added meets the preset adding condition.

20. The method of clause 12, wherein determining the mode list by using the weight derivation mode comprises: determining a list construction strategy corresponding to the weight derivation mode; and determining the mode list according to the list construction strategy.

21. The method of clause 12, further comprising: setting an alternative intra prediction mode.

22. The method of clause 21, wherein determining at least one of the first intra prediction mode or the second intra prediction mode based on the mode list comprises: determining one prediction mode in the mode list as the first intra prediction mode; and/or determining the second intra prediction mode according to the first intra prediction mode and the mode list.

23. The method of clause 22, wherein determining the second intra prediction mode according to the first intra prediction mode and the mode list comprises: removing the one prediction mode from the mode list and adding the alternate intra prediction mode to the mode list to obtain an updated mode list; and selecting one prediction mode from the updated mode list as the second intra prediction mode.

24. The method of clause 12, further comprising: setting a length parameter of the mode list as (N+1), where N is a positive integer.

25. The method of clause 24, wherein determining the first intra prediction mode and/or the second intra prediction mode based on the mode list comprises: when the first intra prediction mode is determined using the mode list, determining one prediction mode from first N prediction modes in the mode list as the first intra prediction mode; and/or determining the second intra prediction mode according to the first intra prediction mode and the mode list.

26. The method of clause 25, wherein determining the second intra prediction mode according to the first intra prediction mode and the mode list comprises: determining the second intra prediction mode using remaining N prediction modes in the mode list except for the first intra prediction mode.

27. The method of clause 24, wherein determining the first intra prediction mode and/or the second intra prediction mode based on the mode list comprises: when the first intra prediction mode is determined without using the mode list, determining one prediction mode from first N prediction modes in the mode list as the second intra prediction mode.

28. The method of clause 11, wherein determining at least one of the first intra prediction mode or the second intra prediction mode according to the weight derivation mode comprises: sorting an intra prediction mode corresponding to an adjacent block of the current block, a related intra prediction mode corresponding to the weight derivation mode, and a preset prediction mode to obtain a candidate list of prediction modes, wherein the preset prediction mode comprises one or more of a DC mode, a Bilinear mode, and a Planar mode; and determining the first intra prediction mode and/or the second intra prediction mode according to the candidate list of prediction modes.

29. The method of clause 11, wherein determining at least one of the first intra prediction mode or the second intra prediction mode according to the weight derivation mode comprises: establishing a reference set of first intra prediction modes corresponding to the weight derivation mode, and determining the first intra prediction mode based on the reference set of first intra prediction modes; and/or establishing a reference set of second intra prediction modes corresponding to the weight derivation mode, and determining the second intra prediction mode based on the reference set of second intra prediction modes.

30. The method of clause 11, further comprising: determining the weight derivation mode according to a first mode index range, wherein the first mode index range limits an index number of the weight derivation mode.

31. The method of clause 11, further comprising: when a size parameter of the current block is less than a first size threshold, determining the weight derivation mode according to a first mode index range, wherein the first mode index range limits an index number of the weight derivation mode.

32. The method of clause 30 or 31, wherein the first mode index range comprises a first lower threshold and a first upper threshold, and the method further comprises: when the index number of the weight derivation mode is less than the first lower threshold, setting the index number of the weight derivation mode to the first lower threshold; and when the index number of the weight derivation mode is greater than the first upper threshold, setting the index number of the weight derivation mode to the first upper threshold.

33. The method of clause 11, further comprising: determining the first intra prediction mode and the second intra prediction mode according to a second mode index range, wherein the second mode index range limits index numbers of the intra prediction modes.

34. The method of clause 11, further comprising: when a size parameter of the current block is less than a second size threshold, determining the first intra prediction mode and the second intra prediction mode according to a second mode index range, wherein the second mode index range limits index numbers of the intra prediction modes.

35. The method of clause 33 or 34, wherein the second mode index range comprises a second lower threshold and a second upper threshold, and the method further comprises: determining a first index number of the first intra prediction mode and a second index number of the second intra prediction mode; setting both the first index number and the second index number to be greater than the second lower threshold; and setting both the first index number and the second index number to be less than the second upper threshold.

36. The method of clause 11, further comprising: determining a first initial mode and a second initial mode for the current block according to the mode list; determining an offset mode parameter, and determining an offset parameter of the current block when the offset mode parameter indicates performing an offset process; determining the first intra prediction mode for the current block according to the first initial mode and the offset parameter, and determining the second intra prediction mode for the current block according to the second initial mode and the offset parameter; and determining the prediction value based on the first intra prediction mode and the second intra prediction mode.

37. The method of clause 36, wherein the offset parameter comprises an offset manner and an offset amount, and determining the first intra prediction mode for the current block according to the first initial mode and the offset parameter and determining the second intra prediction mode for the current block according to the second initial mode and the offset parameter comprises: determining the first intra prediction mode by offsetting the first initial mode according to the offset manner and the offset amount; and determining the second intra prediction mode by offsetting the second initial mode according to the offset manner and the offset amount.

38. The method of clause 36, further comprising: when the offset mode parameter indicates not performing an offset process, determining the first intra prediction mode and the second intra prediction mode according to the mode list.

39. The method of clause 11, wherein determining the prediction value based on the first intra prediction mode, the second intra prediction mode, and the weight comprises: determining a first prediction value according to the first intra prediction mode; determining a second prediction value according to the second intra prediction mode; and obtaining the prediction value by calculating a weighted average of the first prediction value and the second prediction value using the weight.

40. The method of clause 11, further comprising: determining a size parameter of the current block; and determining, according to the size parameter, whether a SAWP mode is used for the current block.

41. The method of clause 40, wherein the size parameter comprises a width and a height, and the method further comprises: when the width is greater than a first threshold and the height is greater than a second threshold, determining that the SAWP mode is used for the current block; or when the width is less than a third threshold and the height is greater than a fourth threshold, determining that the SAWP mode is used for the current block.

42. The method of clause 11, further comprising: determining a sample parameter of the current block; and determining, according to the sample parameter and a fifth threshold, whether a SAWP mode is used for the current block.

43. The method of clause 11, further comprising: determining an intra prediction mode parameter of the current block; and determining, according to the intra prediction mode parameter, whether a SAWP mode is used for the current block.

44. A prediction method, applied to an encoder and comprising: determining a prediction list for a current block, the prediction list containing at least one of an intra prediction mode or an inter prediction mode; determining at least one of a first prediction mode or a second prediction mode for the current block according to the prediction list; and determining a prediction value based on the first prediction mode and the second prediction mode.

45. The method of clause 44, wherein at least one of the first prediction mode or the second prediction mode is an intra prediction mode or an inter prediction mode.

46. The method of clause 45, further comprising: obtaining a first flag, the first flag indicating whether the first prediction mode and the second prediction mode belong to an intra prediction mode; and determining a type of each of the first prediction mode and the second prediction mode according to the first flag, and determining at least one of the first prediction mode or the second prediction mode for the current block according to the prediction list comprises: determining, according to the type of each of the first prediction mode and the second prediction mode, at least one of the first prediction mode or the second prediction mode based on the prediction list.

47. The method of clause 46, further comprising: signalling the first flag into a bitstream.

48. The method of clause 44, wherein when the first prediction mode is a first intra prediction mode and/or the second prediction mode is a second intra prediction mode, the prediction list comprises a mode list for the current block, and determining the prediction list for the current block comprises: determining the mode list for the current block, the mode list containing at least one intra prediction mode; and determining at least one of the first prediction mode or the second prediction mode for the current block according to the prediction list comprises: determining at least one of the first prediction mode or the second prediction mode for the current block according to the mode list for the current block.

49. The method of clause 48, wherein determining the mode list for the current block comprises: determining an intra prediction mode corresponding to an adjacent block of the current block and determining the intra prediction mode corresponding to the adjacent block as a mode to-be-added; when the mode to-be-added meets a preset adding condition, adding the mode to-be-added to the mode list; when the mode list does not reach a preset list-length, determining a weight derivation mode for the current block, determining a related intra prediction mode corresponding to the weight derivation mode, and determining the related intra prediction mode corresponding to the weight derivation mode as the mode to-be-added; and when the mode to-be-added meets the preset adding condition, adding the mode to-be-added to the mode list.

50. The method of clause 49, wherein determining the mode list for the current block comprises: determining the mode list by using the weight derivation mode.

51. The method of clause 50, wherein determining the mode list by using the weight derivation mode comprises: determining a list construction strategy corresponding to the weight derivation mode; and determining the mode list according to the list construction strategy.

52. The method of clause 48, further comprising: setting an alternate intra prediction mode.

53. The method of clause 52, wherein determining at least one of the first intra prediction mode or the second intra prediction mode according to the mode list comprises: determining one prediction mode in the mode list as the first intra prediction mode; and/or determining the second intra prediction mode according to the first intra prediction mode and the mode list.

54. The method of clause 53, wherein determining the second intra prediction mode according to the first intra prediction mode and the mode list comprises: removing the one prediction mode from the mode list and adding the alternate intra prediction mode to the mode list to obtain an updated mode list; and selecting one prediction mode from the updated mode list as the second intra prediction mode.

55. The method of clause 48, further comprising: setting a length parameter of the mode list as (N+1), where N is a positive integer.

56. The method of clause 55, wherein determining at least one of the first intra prediction mode or the second intra prediction mode for the current block according to the mode list comprises: when the first intra prediction mode is determined using the mode list, determining one prediction mode from first N prediction modes in the mode list as the first intra prediction mode; and/or determining the second intra prediction mode according to the first intra prediction mode and the mode list.

57. The method of clause 56, wherein determining the second intra prediction mode according to the first intra prediction mode and the mode list comprises: determining the second intra prediction mode using remaining N prediction modes in the mode list except for the first intra prediction mode.

58. The method of clause 55, wherein determining at least one of the first intra prediction mode or the second intra prediction mode for the current block according to the mode list comprises: when the first intra prediction mode is determined without using the mode list, determining one prediction mode from first N prediction modes in the mode list as the second intra prediction mode.

59. The method of clause 49, further comprising: sorting the intra prediction mode corresponding to the adjacent block of the current block, the related intra prediction mode corresponding to the weight derivation mode, and a preset prediction mode to obtain a candidate list of prediction modes, wherein the preset prediction mode comprises one or more of a DC mode, a Bilinear mode, and a Planar mode; and determining the first intra prediction mode and/or the second intra prediction mode according to the candidate list of prediction modes.

60. The method of clause 49, further comprising: establishing a reference set of first intra prediction modes corresponding to the weight derivation mode, and determining the first intra prediction mode based on the reference set of first intra prediction modes; and/or establishing a reference set of second intra prediction modes corresponding to the weight derivation mode, and determining the second intra prediction mode based on the reference set of second intra prediction modes.

61. The method of clause 49, further comprising: determining the weight derivation mode according to a first mode index range, wherein the first mode index range limits an index number of the weight derivation mode.

62. The method of clause 49, further comprising: when a size parameter of the current block is less than a first size threshold, determining the weight derivation mode according to a first mode index range, wherein the first mode index range limits an index number of the weight derivation mode.

63. The method of clause 61 or 62, wherein the first mode index range comprises a first lower threshold and a first upper threshold, and the method further comprises: when the index number of the weight derivation mode is less than the first lower threshold, setting the index number of the weight derivation mode to the first lower threshold; and when the index number of the weight derivation mode is greater than the first upper threshold, setting the index number of the weight derivation mode to the first upper threshold.

64. The method of clause 48, further comprising: determining the first intra prediction mode and the second intra prediction mode according to a second mode index range, wherein the second mode index range limits index numbers of the intra prediction modes.

64(1). The method of clause 48, further comprising: when a size parameter of the current block is less than a second size threshold, determining the first intra prediction mode and the second intra prediction mode according to a second mode index range, wherein the second mode index range limits index numbers of the intra prediction modes.

65. The method of clause 64 or 64(1), wherein the second mode index range comprises a second lower threshold and a second upper threshold, and the method further comprises: determining a first index number of the first intra prediction mode and a second index number of the second intra prediction mode; setting both the first index number and the second index number to be greater than the second lower threshold; and setting both the first index number and the second index number to be less than the second upper threshold.

66. The method of clause 48, further comprising: determining a first initial mode and a second initial mode for the current block according to the mode list; determining an offset mode parameter, and determining an offset parameter of the current block when the offset mode parameter indicates performing an offset process; determining the first intra prediction mode for the current block according to the first initial mode and the offset parameter, and determining the second intra prediction mode for the current block according to the second initial mode and the offset parameter; and determining the prediction value based on the first intra prediction mode and the second intra prediction mode.

67. The method of clause 48, wherein determining the prediction value based on the first intra prediction mode and the second intra prediction mode comprises: determining a first prediction value according to the first intra prediction mode; determining a second prediction value according to the second intra prediction mode; and obtaining the prediction value by calculating a weighted average of the first prediction value and the second prediction value.

68. A prediction method, applied to a decoder and comprising: parsing a bitstream to determine a weight derivation mode for a current block; determining at least one of a first prediction mode or a second prediction mode for the current block according to the weight derivation mode; determining a weight according to the weight derivation mode; and determining a prediction value based on the first prediction mode, the second prediction mode, and the weight.

69. The method of clause 68, wherein at least one of the first prediction mode or the second prediction mode is an intra prediction mode or an inter prediction mode.

70. The method of clause 69, further comprising: parsing the bitstream to obtain a first flag, the first flag indicating whether the first prediction mode and the second prediction mode belong to an intra prediction mode; and determining a type of each of the first prediction mode and the second prediction mode according to the first flag, and determining at least one of the first prediction mode or the second prediction mode for the current block according to the weight derivation mode comprises: when at least one of the first prediction mode or the second prediction mode is an intra prediction mode, determining at least one of the first prediction mode or the second prediction mode based on the weight derivation mode.

71. The method of clause 70, wherein when at least one of the first prediction mode or the second prediction mode is an intra prediction mode, determining at least one of the first prediction mode or the second prediction mode based on the weight derivation mode comprises: when the first prediction mode or the second prediction mode is an intra prediction mode, determining an angle index according to the weight derivation mode, the angle index indicating an angle index of a boundary line of the weight; and determining an intra prediction mode corresponding to the angle index as the first prediction mode or the second prediction mode.

72. The method of clause 70, wherein when at least one of the first prediction mode or the second prediction mode is an intra prediction mode, determining at least one of the first prediction mode or the second prediction mode based on the weight derivation mode comprises: when the first prediction mode and/or the second prediction mode is an intra prediction mode, obtaining an intra prediction mode corresponding to the weight derivation mode; and determining the first prediction mode and/or the second prediction mode according to the intra prediction mode corresponding to the weight derivation mode.

73. The method of clause 72, wherein the intra prediction mode corresponding to the weight derivation mode comprises at least one of: an intra prediction mode parallel to the boundary line of the weight, an intra prediction mode perpendicular to the boundary line, or a planar mode.

74. The method of clause 73, wherein determining the first prediction mode and/or the second prediction mode according to the intra prediction mode corresponding to the weight derivation mode comprises: when the first prediction mode is an intra prediction mode, parsing the bitstream to obtain a second flag and determining an intra prediction mode corresponding to the second flag in the intra prediction modes corresponding to the weight derivation mode as the first prediction mode, wherein the second flag indicates a correspondence between the first prediction mode and the intra prediction modes corresponding to the weight derivation mode; and/or when the second prediction mode is an intra prediction mode, parsing the bitstream to obtain a third flag and determining the intra prediction mode corresponding to the third flag in the intra prediction modes corresponding to the weight derivation mode as the second prediction mode, wherein the third flag indicates a correspondence between the second prediction mode and the intra prediction modes corresponding to the weight derivation mode.

75. The method of clause 74, wherein when both the first prediction mode and the second prediction mode are intra prediction modes, the second flag and the third flag have different values.

76. The method of clause 70, wherein when at least one of the first prediction mode or the second prediction mode is an intra prediction mode, determining at least one of the first prediction mode or the second prediction mode based on the weight derivation mode comprises: when the first prediction mode is a first intra prediction mode and/or the second prediction mode is a second intra prediction mode, determining at least one of the first intra prediction mode or the second intra prediction mode according to the weight derivation mode.

77. The method of clause 76, wherein determining at least one of the first intra prediction mode or the second intra prediction mode according to the weight derivation mode comprises: determining a mode list by using the weight derivation mode; and determining the first intra prediction mode and/or the second intra prediction mode based on the mode list.

78. The method of clause 77, wherein determining the mode list by using the weight derivation mode comprises: determining an intra prediction mode corresponding to an adjacent block of the current block and determining the intra prediction mode corresponding to the adjacent block as a mode to-be-added; when the mode to-be-added meets a preset adding condition, adding the mode to-be-added to the mode list; when the mode list does not reach a preset list-length, determining a related intra prediction mode corresponding to the weight derivation mode and determining the related intra prediction mode corresponding to the weight derivation mode as the mode to-be-added; when the mode to-be-added meets the preset adding condition, adding the mode to-be-added to the mode list.

79. The method of clause 78, further comprising: determining order parameters each corresponding to an adjacent block; adding the intra prediction modes corresponding to the adjacent blocks to the mode list sequentially according to the order parameters.

80. The method of clause 78, wherein determining the related intra prediction mode corresponding to the weight derivation mode comprises: determining an intra prediction mode corresponding to the weight derivation mode; and determining the related intra prediction mode according to a first index interval based on the intra prediction mode corresponding to the weight derivation mode.

81. The method of clause 78, further comprising: when the mode list does not reach the preset list-length, determining a preset prediction mode as the mode to-be-added, wherein the preset prediction mode comprises one or more of a DC mode, a Bilinear mode, and a Planar mode; when the mode to-be-added meets the preset adding condition, adding the mode to-be-added to the mode list.

82. The method of clause 78, further comprising: when the mode list does not reach the preset list-length, determining an associated intra prediction mode corresponding to the mode list and determining the associated intra prediction mode as the mode to-be-added; and when the mode to-be-added meets the preset adding condition, adding the mode to-be-added to the mode list.

83. The method of clause 82, wherein determining the associated intra prediction mode corresponding to the mode list comprises: determining the associated intra prediction mode according to a second index interval based on any prediction mode in the mode list.

84. The method according to any of clauses 78-83, further comprising: when the mode to-be-added exists and is different from all prediction modes in the mode list, determining that the mode to-be-added meets the preset adding condition.

85. The method of clause 77, wherein determining the mode list by using the weight derivation mode comprises: determining a list construction strategy corresponding to the weight derivation mode; and determining the mode list according to the list construction strategy.

86. The method of clause 77, further comprising: setting an alternate intra prediction mode.

87. The method of clause 86, wherein determining the first intra prediction mode and/or the second intra prediction mode based on the mode list comprises: determining one prediction mode in the mode list as the first intra prediction mode; and/or determining the second intra prediction mode according to the first intra prediction mode and the mode list.

88. The method of clause 86, wherein determining the second intra prediction mode according to the first intra prediction mode and the mode list comprises: removing the one prediction mode from the mode list and adding the alternate intra prediction mode to the mode list to obtain an updated mode list; and selecting one prediction mode from the updated mode list as the second intra prediction mode.

89. The method of clause 77, further comprising: setting a length parameter of the mode list as (N+1), where N is a positive integer.

90. The method of clause 89, wherein determining the first intra prediction mode and/or the second intra prediction mode based on the mode list comprises: when the first intra prediction mode is determined using the mode list, determining one prediction mode from first N prediction modes in the mode list as the first intra prediction mode; and/or determining the second intra prediction mode according to the first intra prediction mode and the mode list.

91. The method of clause 90, wherein determining the second intra prediction mode according to the first intra prediction mode and the mode list comprises: determining the second intra prediction mode using remaining N prediction modes in the mode list except for the first intra prediction mode.

92. The method of clause 88, wherein determining the first intra prediction mode and/or the second intra prediction mode based on the mode list comprises: when the first intra prediction mode is determined without using the mode list, determining one prediction mode from first N prediction modes in the mode list as the second intra prediction mode.

93. The method of clause 76, wherein determining at least one of the first intra prediction mode and the second intra prediction mode according to the weight derivation mode comprises: sorting an intra prediction mode corresponding to an adjacent block of the current block, a related intra prediction mode corresponding to the weight derivation mode, and a preset prediction mode to obtain a candidate list of prediction modes, wherein the preset prediction mode comprises one or more of a DC mode, a Bilinear mode, and a Planar mode; and determining the first intra prediction mode and/or the second intra prediction mode according to the candidate list of prediction modes.

94. The method of clause 76, wherein determining at least one of the first intra prediction mode or the second intra prediction mode according to the weight derivation mode comprises: establishing a reference set of first intra prediction modes corresponding to the weight derivation mode, and determining the first intra prediction mode based on the reference set of first intra prediction modes; and/or establishing a reference set of second intra prediction modes corresponding to the weight derivation mode, and determining the second intra prediction mode based on the reference set of second intra prediction modes.

95. The method of clause 76, further comprising: determining the weight derivation mode according to a first mode index range, wherein the first mode index range limits an index number of the weight derivation mode.

96. The method of clause 76, further comprising: when a size parameter of the current block is less than a first size threshold, determining the weight derivation mode according to a first mode index range, wherein the first mode index range limits an index number of the weight derivation mode.

97. The method of clause 95 or 96, wherein the first mode index range comprises a first lower threshold and a first upper threshold, and the method further comprises: when the index number of the weight derivation mode is less than the first lower threshold, setting the index number of the weight derivation mode to the first lower threshold; and when the index number of the weight derivation mode is greater than the first upper threshold, setting the index number of the weight derivation mode to the first upper threshold.

98. The method of clause 76, further comprising: determining the first intra prediction mode and the second intra prediction mode according to a second mode index range, wherein the second mode index range limits index numbers of the intra prediction modes.

99. The method of clause 76, further comprising: when a size parameter of the current block is less than a second size threshold, determining the first intra prediction mode and the second intra prediction mode according to a second mode index range, wherein the second mode index range limits index numbers of the intra prediction modes.

100. The method of clause 98 or 99, wherein the second mode index range comprises a second lower threshold and a second upper threshold, and the method further comprises: determining a first index number of the first intra prediction mode and a second index number of the second intra prediction mode; setting both the first index number and the second index number to be greater than the second lower threshold; and setting both the first index number and the second index number to be less than the second upper threshold.

101. The method of clause 76, further comprising: determining a first initial mode and a second initial mode for the current block according to the mode list; determining an offset mode parameter, and determining an offset parameter of the current block when the offset mode parameter indicates performing an offset process; determining the first intra prediction mode for the current block according to the first initial mode and the offset parameter, and determining the second intra prediction mode for the current block according to the second initial mode and the offset parameter; and determining the prediction value based on the first intra prediction mode and the second intra prediction mode.

102. The method of clause 101, wherein the offset parameter comprises an offset manner and an offset amount, and determining the first intra prediction mode for the current block according to the first initial mode and the offset parameter and determining the second intra prediction mode for the current block according to the second initial mode and the offset parameter comprises: determining the first intra prediction mode by offsetting the first initial mode according to the offset manner and the offset amount; and determining the second intra prediction mode by offsetting the second initial mode according to the offset manner and the offset amount.

103. The method of clause 101, further comprising: when the offset mode parameter indicates not performing an offset process, determining the first intra prediction mode and the second intra prediction mode according to the mode list.

104. The method of clause 76, wherein determining the prediction value based on the first intra prediction mode, the second intra prediction mode, and the weight comprises: determining a first prediction value according to the first intra prediction mode; determining a second prediction value according to the second intra prediction mode; and obtaining the prediction value by calculating a weighted average of the first prediction value and the second prediction value using the weight.

105. The method of clause 76, further comprising: determining a size parameter of the current block; and determining, according to the size parameter, whether a SAWP mode is used for the current block.

106. The method of clause 105, wherein the size parameter comprises a width and a height, and the method further comprises: when the width is greater than a first threshold and the height is greater than a second threshold, determining that the SAWP mode is used for the current block; or when the width is less than a third threshold and the height is greater than a fourth threshold, determining that the SAWP mode is used for the current block.

107. The method of clause 76, further comprising: determining a sample parameter of the current block; and determining, according to the sample parameter and a fifth threshold, whether a SAWP mode is used for the current block.

108. The method of clause 76, further comprising: determining an intra prediction mode parameter of the current block; and determining, according to the intra prediction mode parameter, whether a SAWP mode is used for the current block.

109. An intra prediction method, applied to a decoder and comprising: parsing a bitstream to determine a prediction list for a current block, the prediction list containing at least one of an intra prediction mode or an inter prediction mode; determining at least one of a first prediction mode or a second prediction mode for the current block according to the prediction list; and determining a prediction value based on the first prediction mode and the second prediction mode.

110. The method of clause 109, wherein at least one of the first prediction mode or the second prediction mode is an intra prediction mode or an inter prediction mode.

111. The method of clause 110, further comprising: parsing the bitstream to obtain a first flag, the first flag indicating whether the first prediction mode and the second prediction mode belong to an intra prediction mode; and determining a type of each of the first prediction mode and the second prediction mode according to the first flag, and determining at least one of the first prediction mode or the second prediction mode for the current block according to the prediction list comprises: determining, according to the type of each of the first prediction mode and the second prediction mode, at least one of the first prediction mode or the second prediction mode based on the prediction list.

112. The method of clause 109, wherein when the first prediction mode is a first intra prediction mode and/or the second prediction mode is a second intra prediction mode, the prediction list comprises a mode list for the current block, and determining the prediction list for the current block comprises: determining the mode list for the current block, the mode list containing at least one intra prediction mode; and determining at least one of the first prediction mode or the second prediction mode for the current block according to the prediction list comprises: determining at least one of the first prediction mode or the second prediction mode for the current block according to the mode list for the current block.

113. The method of clause 112, wherein determining the mode list for the current block comprises: determining an intra prediction mode corresponding to an adjacent block of the current block and determining the intra prediction mode corresponding to the adjacent block as a mode to-be-added; when the mode to-be-added meets a preset adding condition, adding the mode to-be-added to the mode list; when the mode list does not reach a preset list-length, determining a weight derivation mode for the current block, determining a related intra prediction mode corresponding to the weight derivation mode, and determining the related intra prediction mode corresponding to the weight derivation mode as the mode to-be-added; and when the mode to-be-added meets the preset adding condition, adding the mode to-be-added to the mode list.

114. The method of clause 113, wherein determining the mode list by using the weight derivation mode comprises: determining a list construction strategy corresponding to the weight derivation mode; and determining the mode list according to the list construction strategy.

115. The method of clause 112, further comprising: setting an alternate intra prediction mode.

116. The method of clause 115, wherein determining the first intra prediction mode and the second intra prediction mode according to the mode list comprises: determining one prediction mode in the mode list as the first intra prediction mode; and determining the second intra prediction mode according to the first intra prediction mode and the mode list.

117. The method of clause 116, wherein determining the second intra prediction mode according to the first intra prediction mode and the mode list comprises: removing the one prediction mode from the mode list and adding the alternate intra prediction mode to the mode list to obtain an updated mode list; and selecting one prediction mode from the updated mode list as the second intra prediction mode.

118. The method of clause 112, further comprising: setting a length parameter of the mode list as (N+1), where N is a positive integer.

119. The method of clause 118, wherein determining at least one of the first intra prediction mode or the second intra prediction mode for the current block according to the mode list comprises: when the first intra prediction mode is determined using the mode list, determining one prediction mode from first N prediction modes in the mode list as the first intra prediction mode; and/or determining the second intra prediction mode according to the first intra prediction mode and the mode list.

120. The method of clause 119, wherein determining the second intra prediction mode according to the first intra prediction mode and the mode list comprises: determining the second intra prediction mode using remaining N prediction modes in the mode list except for the first intra prediction mode.

121. The method of clause 118, wherein determining at least one of the first intra prediction mode or the second intra prediction mode for the current block according to the mode list comprises: when the first intra prediction mode is determined without using the mode list, determining one prediction mode from first N prediction modes in the mode list as the second intra prediction mode.

122. The method of clause 113, further comprising: sorting the intra prediction mode corresponding to the adjacent block of the current block, the related intra prediction mode corresponding to the weight derivation mode, and a preset prediction mode to obtain a candidate list of prediction modes, wherein the preset prediction mode comprises one or more of a DC mode, a Bilinear mode, and a Planar mode; and determining the first intra prediction mode and/or the second intra prediction mode according to the candidate list of prediction modes.

123. The method of clause 113, further comprising: establishing a reference set of first intra prediction modes corresponding to the weight derivation mode, and determining the first intra prediction mode based on the reference set of first intra prediction modes; and/or establishing a reference set of second intra prediction modes corresponding to the weight derivation mode, and determining the second intra prediction mode based on the reference set of second intra prediction modes.

124. The method of clause 113, further comprising: determining the weight derivation mode according to a first mode index range, wherein the first mode index range limits an index number of the weight derivation mode.

125. The method of clause 113, further comprising: when a size parameter of the current block is less than a first size threshold, determining the weight derivation mode according to a first mode index range, wherein the first mode index range limits an index number of the weight derivation mode.

126. The method of clause 124 or 125, wherein the first mode index range comprises a first lower threshold and a first upper threshold, and the method further comprises: when the index number of the weight derivation mode is less than the first lower threshold, setting the index number of the weight derivation mode to the first lower threshold; and when the index number of the weight derivation mode is greater than the first upper threshold, setting the index number of the weight derivation mode to the first upper threshold.

127. The method of clause 112, further comprising: determining the first intra prediction mode and the second intra prediction mode according to a second mode index range, wherein the second mode index range limits index numbers of the intra prediction modes.

128. The method of clause 112, further comprising: when a size parameter of the current block is less than a second size threshold, determining the first intra prediction mode and the second intra prediction mode according to a second mode index range, wherein the second mode index range limits index numbers of the intra prediction modes.

129. The method of clause 127 or 128, wherein the second mode index range comprises a second lower threshold and a second upper threshold, and the method further comprises: determining a first index number of the first intra prediction mode and a second index number of the second intra prediction mode; setting both the first index number and the second index number to be greater than the second lower threshold; and setting both the first index number and the second index number to be less than the second upper threshold.

130. The method of clause 112, further comprising: determining a first initial mode and a second initial mode for the current block according to the mode list; determining an offset mode parameter, and determining an offset parameter of the current block when the offset mode parameter indicates performing an offset process; determining the first intra prediction mode for the current block according to the first initial mode and the offset parameter, and determining the second intra prediction mode for the current block according to the second initial mode and the offset parameter; and determining the prediction value based on the first intra prediction mode and the second intra prediction mode.

131. The method of clause 112, wherein determining the prediction value based on the first intra prediction mode and the second intra prediction mode comprises: determining a first prediction value according to the first intra prediction mode; determining a second prediction value according to the second intra prediction mode; and obtaining the prediction value by calculating a weighted average of the first prediction value and the second prediction value.

132. An encoder, comprising a first determining portion, wherein the first determining portion is configured to determine a weight derivation mode for a current block; determine at least one of a first prediction mode or a second prediction mode for the current block according to the weight derivation mode; determine a weight according to the weight derivation mode; and determine a prediction value based on the first prediction mode, the second prediction mode, and the weight; and the first determining portion is further configured to: determine a prediction list for a current block, the prediction list containing at least one of an intra prediction mode or an inter prediction mode; determine at least one of a first prediction mode or a second prediction mode for the current block according to the prediction list; and determine a prediction value based on the first prediction mode and the second prediction mode.

133. An encoder, comprising a first processor and a first memory storing instructions executable by the first processor, wherein when the instructions are executed by the first processor, the first processor performs the method of any of clauses 1-43 or clauses 44-67.

134. A decoder, comprising a parsing portion and a second determining portion, wherein the parsing portion is configured to parse a bitstream; and the second determining portion is configured to determine a weight derivation mode for a current block; determine at least one of a first prediction mode or a second prediction mode for the current block according to the weight derivation mode; determine a weight according to the weight derivation mode; and determine a prediction value based on the first prediction mode, the second prediction mode, and the weight; and the second determining portion is further configured to determine a prediction list for a current block, the prediction list containing at least one of an intra prediction mode or an inter prediction mode; determine at least one of a first prediction mode or a second prediction mode for the current block according to the prediction list; and determine a prediction value based on the first prediction mode and the second prediction mode.

135. A decoder, comprising a second processor and a second memory storing instructions executable by the second processor, when the instructions are executed by the second processor, the second processor performs the method of any of clauses 68-108 or clauses 109-131.

136. A computer storage medium storing a computer program, wherein when the computer program is executed by a first processor, the first processor performs the method of any of clauses 1-43 or clauses 44-67, or, when the computer program is executed by a second processor, the second processor performs the method of any of claims 68-108 or claims 109-131.

INDUSTRIAL PRACTICALITY

The present implementations provide the prediction method, the encoder, the decoder, and the storage medium.

On the one hand, the weight derivation mode for the current block is determined; at least one of the first prediction mode or the second prediction mode for the current block is determined based on the weight derivation mode, the weight is determined based on the weight derivation mode, and the prediction value is determined based on the first prediction mode, the second prediction mode, and the weight. On the other hand, the prediction list for the current block is determined, the prediction list including at least one of an intra prediction mode and an inter prediction mode, the first prediction mode and the second prediction mode for the current block are determined based on the prediction list, and the prediction value is determined based on the first prediction mode and the second prediction mode. In other words, in the implementations, the encoder and decoder can determine two different prediction values for the current block using two different prediction modes, and the two different prediction values can be combined using various weight matrices to obtain more complex prediction values, thus improving prediction accuracy. Additionally, the encoder and decoder can construct the MPM list based on the correlation between weights and prediction modes, which can greatly reduce complexity and bitrate overhead without transmitting the prediction modes in the bitstream, thereby reducing bitrate overhead. Therefore, the proposed prediction method can improve compression performance by enhancing prediction quality while simultaneously reducing complexity and bitstream overhead.

What is claimed is:

1. A prediction method, applied to a decoder, the method comprising:
parsing a bitstream to determine a weight derivation mode for a current block;
parsing the bitstream to obtain a first flag, the first flag indicating whether at least one of a first prediction mode or a second prediction mode belongs to an intra prediction mode, wherein at least one of the first prediction mode or the second prediction mode is an intra prediction mode or an inter prediction mode;
determining a type of each of the first prediction mode and the second prediction mode according to the first flag;
when at least one of the first prediction mode or the second prediction mode is an intra prediction mode, determining at least one of the first prediction mode or the second prediction mode based on the weight derivation mode;
determining a weight according to the weight derivation mode; and
determining a prediction value based on the first prediction mode, the second prediction mode, and the weight.

2. The method of claim 1, wherein when at least one of the first prediction mode or the second prediction mode is an intra prediction mode, determining at least one of the first prediction mode or the second prediction mode based on the weight derivation mode comprises:
when at least one of the first prediction mode or the second prediction mode is an intra corresponding prediction mode, obtaining an intra prediction mode corresponding to the weight derivation mode; and
determining at least one of the first prediction mode or the second prediction mode according to the intra prediction mode corresponding to the weight derivation mode, wherein the intra prediction mode corresponding to the weight derivation mode comprises at least one of:
an intra prediction mode parallel to a boundary line of the weight, an intra prediction mode perpendicular to the boundary line, or a planar mode.

3. The method of claim 2, wherein determining at least one of the first prediction mode or the second prediction mode according to the intra prediction mode corresponding to the weight derivation mode comprises at least one of:
when the first prediction mode is an intra prediction mode, parsing the bitstream to obtain a second flag and determining an intra prediction mode corresponding to the second flag in the intra prediction modes corresponding to the weight derivation mode as the first prediction mode, wherein the second flag indicates a correspondence between the first prediction mode and the intra prediction modes corresponding to the weight derivation mode; or
when the second prediction mode is an intra prediction mode, parsing the bitstream to obtain a third flag and determining an intra prediction mode corresponding to the third flag in the intra prediction modes corresponding to the weight derivation mode as the second prediction mode, wherein the third flag indicates a correspondence between the second prediction mode and the intra prediction modes corresponding to the weight derivation mode.

4. The method of claim 1, wherein the first prediction mode is a first intra prediction mode and/or the second prediction mode is a second intra prediction mode, and determining at least one of the first prediction mode or the second prediction mode based on the weight derivation mode comprises:
determining at least one of the first intra prediction mode or the second intra prediction mode according to the weight derivation mode.

5. The method of claim 4, wherein determining at least one of the first intra prediction mode or the second intra prediction mode according to the weight derivation mode comprises:
determining a mode list by using the weight derivation mode; and
determining at least one of the first intra prediction mode or the second intra prediction mode based on the mode list.

6. The method of claim 5, wherein determining the mode list by using the weight derivation mode comprises:
determining an intra prediction mode corresponding to an adjacent block of the current block and determining the intra prediction mode corresponding to the adjacent block as a mode to-be-added;
when the mode to-be-added meets a preset adding condition, adding the mode to-be-added to the mode list;
when the mode list does not reach a preset list-length, determining a related intra prediction mode corresponding to the weight derivation mode and determining the related intra prediction mode corresponding to the weight derivation mode as the mode to-be-added;
when the mode to-be-added meets the preset adding condition, adding the mode to-be-added to the mode list.

7. The method of claim 6, wherein determining the related intra prediction mode corresponding to the weight derivation mode comprises:
determining an intra prediction mode corresponding to the weight derivation mode; and
determining the related intra prediction mode according to a first index interval based on the intra prediction mode corresponding to the weight derivation mode.

8. The method of claim 6, further comprising:
when the mode list does not reach the preset list-length, determining an associated intra prediction mode corresponding to the mode list according to a second index interval based on any prediction mode in the mode list, and determining the associated intra prediction mode as the mode to-be-added; and when the mode to-be-added meets the preset adding condition, adding the mode to-be-added to the mode list.

9. The method of claim 5, further comprising:
setting an alternate intra prediction mode; and
determining at least one of the first intra prediction mode or the second intra prediction mode based on the mode list comprises:
  determining one prediction mode in the mode list as the first intra prediction mode; and/or
  removing the one prediction mode from the mode list and adding the alternate intra prediction mode to the mode list to obtain an updated mode list; and
  selecting one prediction mode from the updated mode list as the second intra prediction mode.

10. The method of claim 5, further comprising:
setting a length parameter of the mode list as (N+1), where N is a positive integer, and
determining at least one of the first intra prediction mode or the second intra prediction mode based on the mode list comprises:
  when the first intra prediction mode is determined using the mode list, determining one prediction mode from first N prediction modes in the mode list as the first intra prediction mode; and/or
  determining the second intra prediction mode using remaining N prediction modes in the mode list except for the first intra prediction mode; and
  when the first intra prediction mode is determined without using the mode list, determining one prediction mode from first N prediction modes in the mode list as the second intra prediction mode.

11. The method of claim 4, wherein determining at least one of the first intra prediction mode or the second intra prediction mode according to the weight derivation mode comprises at least one of:
  establishing a reference set of first intra prediction modes corresponding to the weight derivation mode, and determining the first intra prediction mode based on the reference set of first intra prediction modes; or
  establishing a reference set of second intra prediction modes corresponding to the weight derivation mode, and determining the second intra prediction mode based on the reference set of second intra prediction modes.

12. The method of claim 4, further comprising:
when a size parameter of the current block is less than a first size threshold, determining the weight derivation mode according to a first mode index range, wherein the first mode index range limits an index number of the weight derivation mode, and the first mode index range comprises a first lower threshold and a first upper threshold;
when the index number of the weight derivation mode is less than the first lower threshold, setting the index number of the weight derivation mode to the first lower threshold; and
when the index number of the weight derivation mode is greater than the first upper threshold, setting the index number of the weight derivation mode to the first upper threshold.

13. The method of claim 4, further comprising:
when a size parameter of the current block is less than a second size threshold, determining the first intra prediction mode and the second intra prediction mode according to a second mode index range, wherein the second mode index range limits index numbers of the intra prediction modes, and the second mode index range comprises a second lower threshold and a second upper threshold;
determining a first index number of the first intra prediction mode and a second index number of the second intra prediction mode;
setting both the first index number and the second index number to be greater than the second lower threshold; and
setting both the first index number and the second index number to be less than the second upper threshold.

14. The method of claim 4, wherein when the second prediction mode is the second intra prediction mode, the method further comprises:
determining a first initial mode and a second initial mode for the current block according to a mode list for the current block;
determining an offset mode parameter;
when the offset mode parameter indicates performing an offset process:
  determining an offset parameter of the current block, wherein the offset parameter comprises an offset manner and an offset amount;
  determining the first intra prediction mode by offsetting the first initial mode according to the offset manner and the offset amount, and determining the second intra prediction mode by offsetting the second initial mode according to the offset manner and the offset amount; and
when the offset mode parameter indicates not performing an offset process:
  determining the first intra prediction mode and the second intra prediction mode according to the mode list; and
determining the prediction value based on the first intra prediction mode and the second intra prediction mode.

15. A prediction method, applied to an encoder, the method comprising:
determining a weight derivation mode for a current block;
obtaining a first flag, the first flag indicating whether at least one of a first prediction mode or a second prediction mode belongs to an intra prediction mode, wherein at least one of the first prediction mode or the second prediction mode is an intra prediction mode or an inter prediction mode;
determining a type of each of the first prediction mode and the second prediction mode according to the first flag;
when at least one of the first prediction mode or the second prediction mode is an intra prediction mode, determining at least one of the first prediction mode or the second prediction mode based on the weight derivation mode;
determining a weight according to the weight derivation mode; and
determining a prediction value based on the first prediction mode, the second prediction mode, and the weight.

* * * * *